(12) United States Patent  
Spillane et al.

(10) Patent No.: US 7,805,031 B2
(45) Date of Patent: Sep. 28, 2010

(54) METHODS FOR FABRICATING COLOR-CENTER-BASED QUANTUM COMPUTER ARCHITECTURES

(75) Inventors: Sean M. Spillane, Mountain View, CA (US); Raymond G. Beausoleil, Redmond, WA (US); Charles Santori, Sunnyvale, CA (US); Marco Fiorentino, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/476,723

(22) Filed: Jun. 2, 2009

(65) Prior Publication Data

US 2009/0238528 A1 Sep. 24, 2009

Related U.S. Application Data

(62) Division of application No. 11/517,501, filed on Sep. 7, 2006, now Pat. No. 7,546,000.

(51) Int. Cl.
*G02B 6/12* (2006.01)

(52) U.S. Cl. .............................. 385/14; 385/24; 385/129

(58) Field of Classification Search ............... 385/14, 385/24, 129
See application file for complete search history.

(56) References Cited

U.S. PATENT DOCUMENTS

| 3,647,959 | A | 3/1972 | Schlesinger |
| 4,761,832 | A | 8/1988 | Gade |
| 6,075,631 | A | 6/2000 | Bala |
| 7,271,877 | B2 * | 9/2007 | Fries ......................... 355/67 |
| 2007/0172235 | A1 | 7/2007 | Snider |
| 2008/0219311 | A1 * | 9/2008 | Bratkovski et al. ..... 372/45.011 |

* cited by examiner

*Primary Examiner*—Jennifer Doan

(57) ABSTRACT

Various embodiments of the present invention are directed to color-center-based quantum computer architectures that are both scalable and defect tolerant and to methods for fabricating color-center-based quantum computer architectures. In one embodiment of the present invention, a node of a quantum computer architecture comprises a first photonic device configured to transmit electromagnetic waves, a color center embedded in diamond and coupled to the first photonic device, and a switch located between the first photonic device and a bus waveguide. The switch can be configured to selectively control transmission of electromagnetic waves between the bus waveguide and the color center.

25 Claims, 48 Drawing Sheets

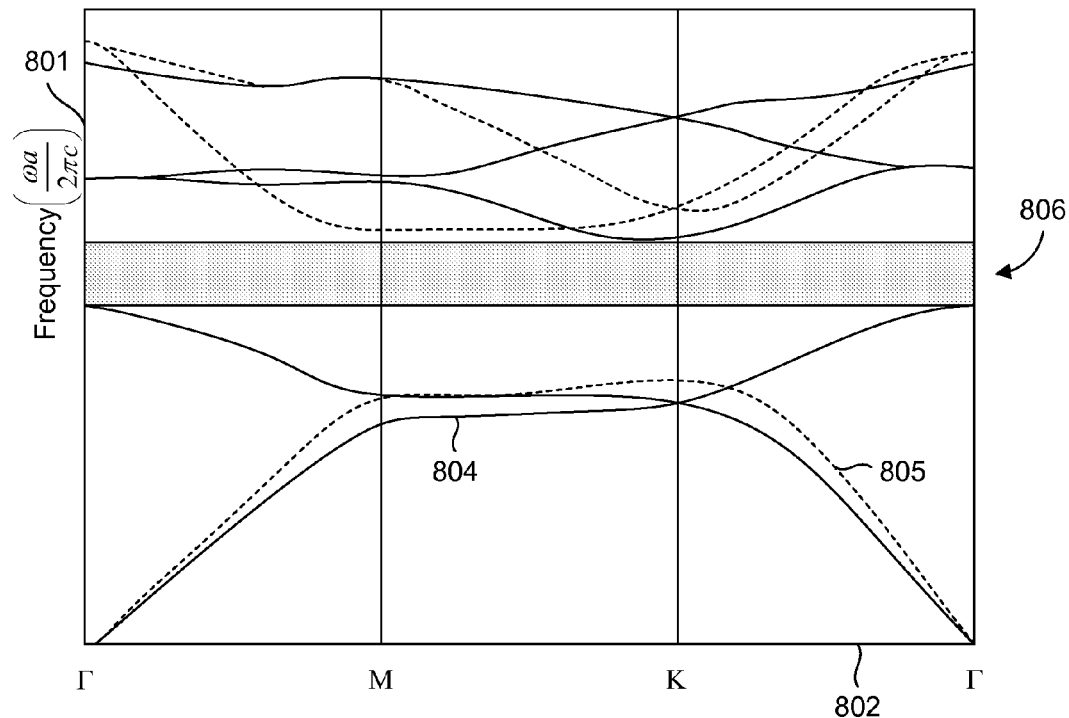
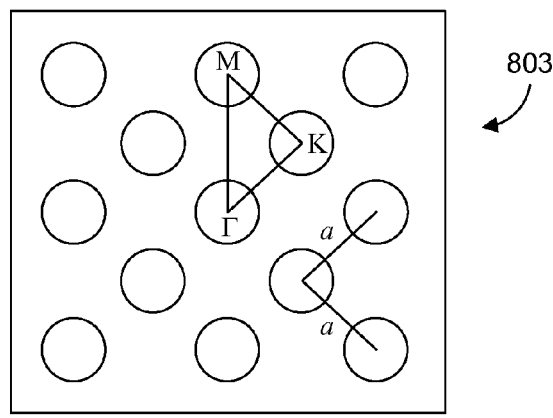
Figure 8

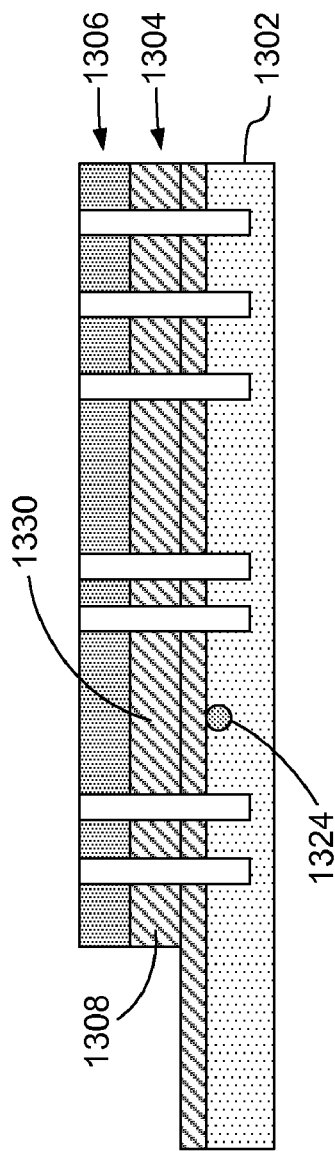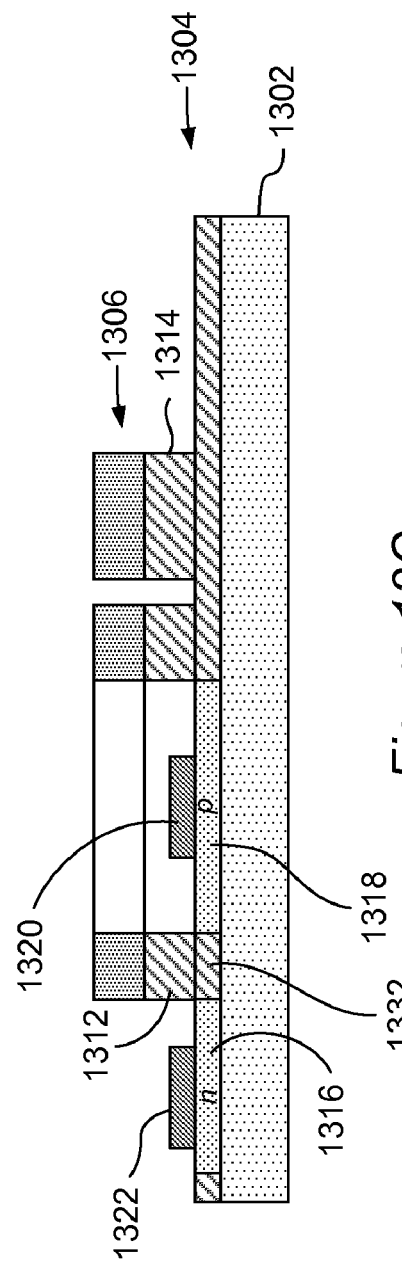
Figure 13B
Figure 13C

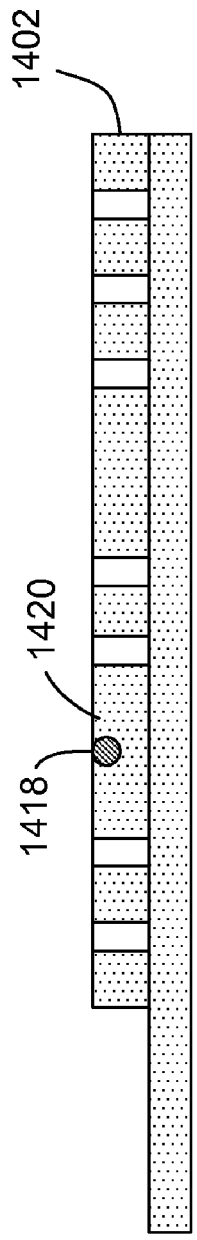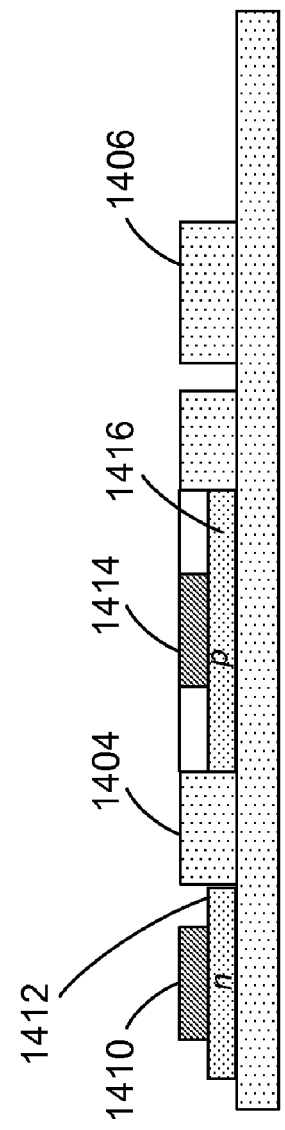

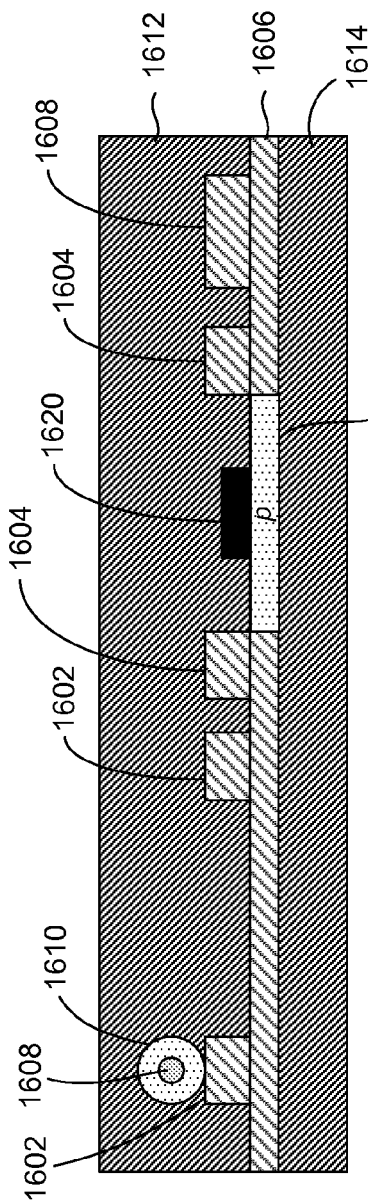
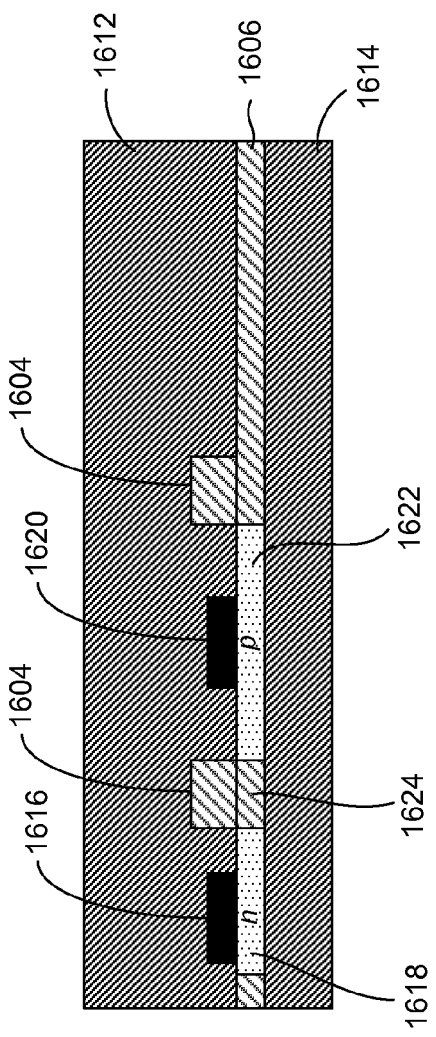

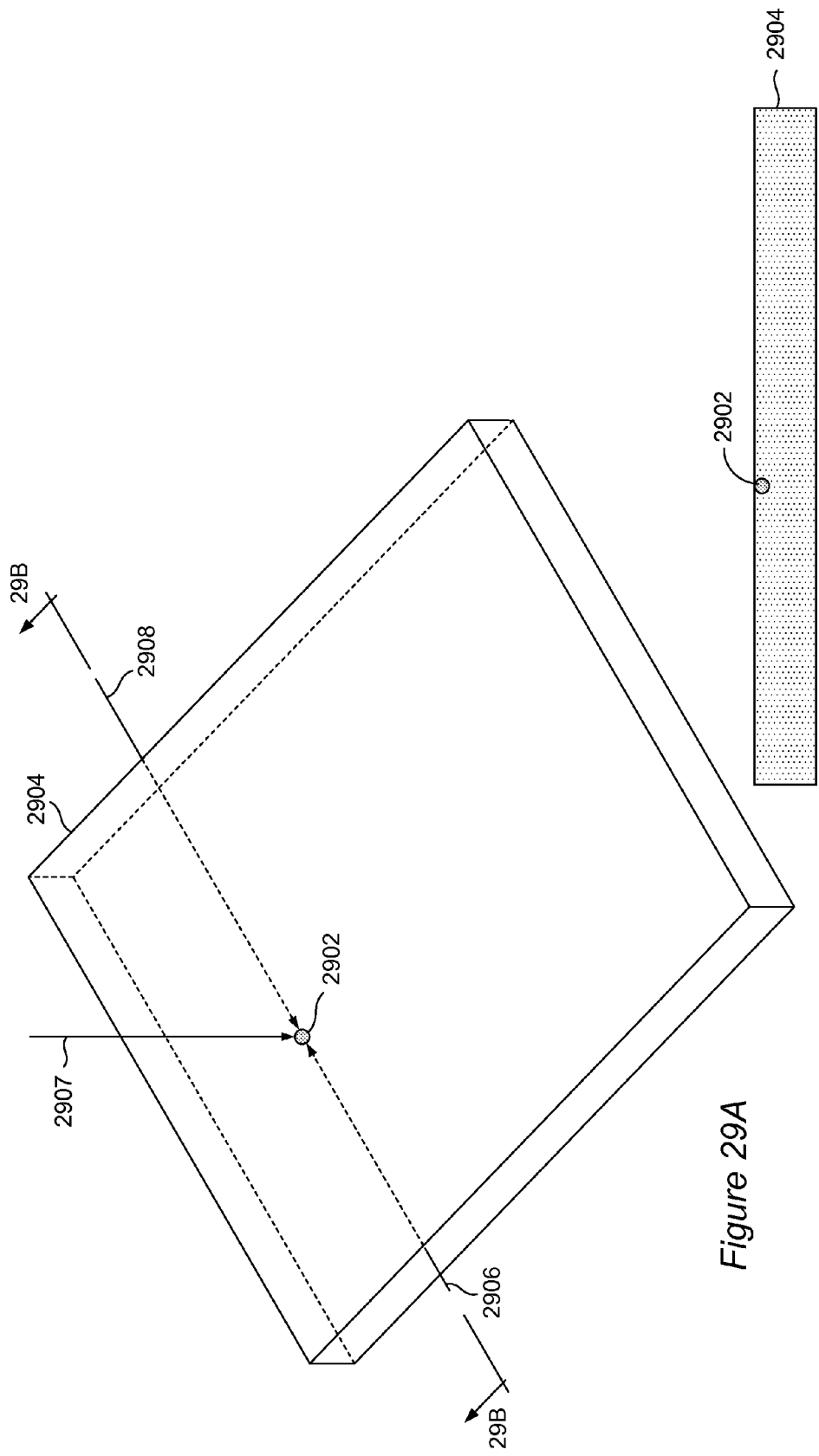

METHODS FOR FABRICATING COLOR-CENTER-BASED QUANTUM COMPUTER ARCHITECTURES

CROSS-REFERENCE TO RELATED APPLICATION

The present application is a divisional application of application Ser. No. 11/517,501, filed Sep. 7, 2006, now U.S. Pat. No. 7,546,000, the contents of which are hereby incorporated herein by reference in their entireties.

STATEMENT OF GOVERNMENT INTEREST

This invention has been made with Government support under grant number EIT FA9550-05-C-0017, awarded by the DARPA. The government has certain rights in the invention.

TECHNICAL FIELD

The present invention relates to quantum computer architectures, and in particular, to color-center-based quantum computer architectures that are both scalable and defect tolerant and methods for fabricating quantum computer architectures that are color center based.

BACKGROUND OF THE INVENTION

Advancements in disciplines ranging from atomic physics to various branches of condensed matter physics are being employed to fabricate a variety of different diamond-based materials for use in many different technological applications. Diamond has a crystal lattice structure comprising two interpenetrating face-centered cubic lattices of carbon atoms. FIG. 1A shows a unit cell 100 of a diamond-crystal lattice. In FIG. 1A, each carbon atom, represented by a sphere, is covalently bonded to four adjacent carbon atoms, each covalent bond is represented by a rod connecting two spheres. As shown in FIG. 1A, a carbon atom 102 is covalently bonded to four carbon atoms 103-106. In general, diamond has a number of potentially useful properties. For example, diamond is transparent from the ultraviolet to the far infrared of the electromagnetic spectrum and has a relatively high refractive index of about 2.42. Diamond may also be a suitable replacement for silicon in silicon-based semiconductor devices. For example, silicon has an electronic bandgap of about 1.12 eV and starts to show signs of thermal stress at about 100° C., while diamond has a larger electronic bandgap ranging from about 5 eV to about 7 eV and a high Debye temperature ranging from about 1550° C. to about 1930° C.

Certain atomic-vacancy systems, called "color centers," embedded in diamond may have potential applications in quantum computing and quantum information processing. For example, a nitrogen-vacancy ("NV") center embedded in diamond is a type of color center that may be used to store a quantum bit of information. FIG. 1B shows an NV center embedded in a diamond-crystal lattice 110. The NV-center comprises a nitrogen atom 112 next to a carbon vacancy 114. The nitrogen atom 112 is covalently bonded to three carbon atoms 116-118. The nitrogen atom 112 can also be located within the diamond-crystal lattice 110 at the positions occupied by carbons 116-118. NV centers can be created in a nitrogen rich diamond by irradiation and subsequent annealing at temperatures above 550° C. The radiation creates vacancies in the diamond and subsequent annealing causes the vacancies to migrate towards nitrogen atoms to produce an NV center. Alternatively, NV centers can be created in diamond using $N^+$ ion implantation.

When an electromagnetic field interacts with an NV center, there is a periodic exchange, or oscillation, of energy between the electromagnetic field and the electronic energy levels of the NV center. Such oscillations, which are called "Rabi oscillations," are associated with oscillations of the NV center electronic energy level populations and quantum-mechanical probability amplitudes of the NV center electronic energy states. Rabi oscillations can be interpreted as an oscillation between absorption and stimulated emission of photons. The Rabi frequency, denoted by $\Omega$, represents the number of times these oscillations occur per unit time (multiplied by the quantity $2\pi$).

FIG. 1C illustrates an energy-level diagram of electronic states of a negatively charged NV center. The energy-level diagram has a $\Lambda$-shaped configuration comprising three ground states coupled to a common excited state. The three ground $^3A_2$ states comprise a first ground state $|1\rangle$ with a lowest energy level 122, and a pair of nearly degenerate ground states $|2\rangle$ and $|3\rangle$ with energy levels 124 and 126, respectively. The excited $^3E$ state $|4\rangle$ has a number of different energy levels 128. Note that the exact structure of the $^3E$ state depends on the strain or mechanical effects in the diamond crystal. A parameter $\delta_1$ is the laser frequency detuning for a $|1\rangle\rightarrow|4\rangle$ transition, a parameter $\delta_2$ is the laser frequency detuning for a $|2\rangle\rightarrow|4\rangle$ transition, a parameter $\delta_{23}$ is the $|2\rangle$-$|3\rangle$ energy splitting, and $\Omega_i$ represent Rabi frequencies, which are proportional to the square root of the laser intensities. For a description of experimental investigations of NV centers, see "The nitrogen-vacancy center in diamond re-visted," by N. B. Manson et al., preprint: http://arxiv.org/abs/cond-mat/0601360; "Coherent population trapping with a single spin in diamond," by Charles Santori et al., preprint: http://arxiv.org/abs/quant-ph/0607147; and "Coherent population trapping in Diamond N-V centers at zero magnetic field," by Charles Santori et al., preprint: http://arxiv.org/abs/cond-mat/0602573.

When spontaneous emission is taken into consideration, the state of the NV center is, in general, represented by a linear superposition of states:

$$|\psi\rangle = a_1|1\rangle + a_2|2\rangle + a_3|3\rangle$$

where $a_1$, $a_2$, and $a_3$ are probability amplitudes. In other words, only linear superpositions of states with zero probability amplitude ($a_4=0$) in the excited state $|4\rangle$ are stable. These stable linear superposition of states are also called "dark states." When $\delta_1$ equals $\delta_2$, the state of the NV center is in a dark state represented by:

$$|\psi_1\rangle = \frac{\Omega_2|1\rangle - \Omega_1|2\rangle}{\sqrt{\Omega_1^2 + \Omega_2^2}},$$

Beginning with the NV center in the state $|1\rangle$, the Rabi frequency $\Omega_2$ is finite and the Rabi frequency $\Omega_1$ is zero. However, turning off the electromagnetic field associated with the Rabi frequency $\Omega_2$ while turning on the electromagnetic field associated with the Rabi frequency $\Omega_1$ places the NV center in the state $|2\rangle$. When $\delta_1$ equals $\delta_2 + \delta_{23}$, the state of the NV center is in a dark state represented by:

$$|\psi_2\rangle = \frac{\Omega_3|1\rangle - \Omega_1|3\rangle}{\sqrt{\Omega_1^2 + \Omega_3^2}}$$

Likewise, beginning with the NV center in the state $|1\rangle$, $\Omega_3$ is finite and $\Omega_1$ is zero. Turning off the electromagnetic field associated with the Rabi frequency $\Omega_3$ while turning on the electromagnetic field associated with the Rabi frequency $\Omega_1$ places the NV center in the state $|3\rangle$. For the degenerate case of $\delta_{23}$ equal to 0, $\Omega_2$ equals $\Omega_3$ and the state of the NV center can be in a dark state represented by either $|\psi_1\rangle$ or $|\psi_2\rangle$. The dark states $|\psi_1\rangle$ and $|\psi_2\rangle$ have a number of potential applications in quantum information processing because either dark state of an NV center can be used to store a quantum bit of information.

The NV centers are appealing for quantum information processing because the NV center has a relatively long-lived spin coherence time and a possibility of large-scale integration into semiconductor processing technology. For example, an NV center electron spin coherence time of 58 µs has been observed at room temperature. See "Long coherence times at 300K for nitrogen-vacancy center spins in diamond grown by chemical vapor deposition," by A. Kennedy et al., *App. Phys. Lett.* 83, 4190-4192 (2003). NV centers may have relatively long-lived spin coherence because the lattice comprises primarily $^{12}C$, which has zero nuclear spin. In addition, a single photon can be generated from an NV center at room temperature, which has established NV centers as potential photon sources in quantum computing and quantum communications. See "Stable solid-state source of single photons," by C. Kurtsiefer et al., *Phys. Rev. Lett.* 85, 290-293 (2000) and "Room temperature stable single photon source," by A. Beveratos et al., *Eur. Phys. J. D* 18, 191-196 (2002). Physicists, computer scientists, and engineers have, therefore, recognized a need for color-center-based quantum computing systems that can be used in a variety of quantum-based applications, such as quantum computing, quantum information processing, and quantum communications.

SUMMARY OF THE INVENTION

Various embodiments of the present invention are directed to color-center-based quantum computer architectures that are both scalable and defect tolerant and to methods for fabricating color-center-based quantum computer architectures. In one embodiment of the present invention, a node of a quantum computer architecture comprises a first photonic device configured to transmit electromagnetic waves, a color center embedded in diamond and coupled to the first photonic device, and a switch located between the first photonic device and a bus waveguide. The switch can be configured to selectively control transmission of electromagnetic waves between the bus waveguide and the color center.

BRIEF DESCRIPTION OF THE DRAWINGS

FIG. 8 illustrates a photonic band structure of transverse electric field and magnetic field modes propagating in the two-dimensional photonic crystal shown in FIG. 5.

FIG. 13B illustrates a first cross-sectional view of the photonic-chip node shown in FIG. 13A that represents an embodiment of the present invention.

FIG. 13C illustrates a second cross-sectional view of the photonic-chip node shown in FIG. 13A that represents an embodiment of the present invention.

FIG. 14B illustrates a first cross-sectional view of the photonic-chip node shown in FIG. 14A that represents an embodiment of the present invention.

FIG. 14C illustrates a second cross-sectional view of the photonic-chip node shown in FIG. 14A that represents an embodiment of the present invention.

FIG. 16B illustrates a first cross-sectional view of the photonic-chip node shown in FIG. 16A that represents an embodiment of the present invention.

FIG. 16C illustrates a second cross-sectional view of the photonic-chip node shown in FIG. 16A that represents an embodiment of the present invention.

FIG. 29A illustrates a perspective view of a color center at a predefined location in a high-quality, single, bulk diamond layer that represents an embodiment of the present invention.

FIG. 29B illustrates a cross-sectional view of the color center and diamond layer shown in FIG. 29A that represents an embodiment of the present invention.

DETAILED DESCRIPTION OF THE INVENTION

Various embodiments of the present invention are directed to color-center-based quantum computer architectures that are both scalable and defect tolerant and to methods for fabricating color-center-based quantum computer architectures. Each of the quantum computer architectures of the present invention includes a network of photonic devices, such as microdisks, microrings, ridge waveguides, and/or resonant cavities in photonic crystals. The quantum computer architectures also include atomic-vacancy centers that can be used to store a quantum bit of information. The architectures can then be used as processors, memory arrays and can be incorporated into devices that are used for quantum computing, quantum information processing, and storing quantum information. For readers that are unfamiliar with certain properties of photonic crystals, an overview of photonic crystals, waveguides, and resonant cavities is provided in a first subsection. Various embodiments of the present invention are described in a second subsection.

An Overview of Photonic Crystals, Waveguides, and Resonant Cavities

Figure 2:
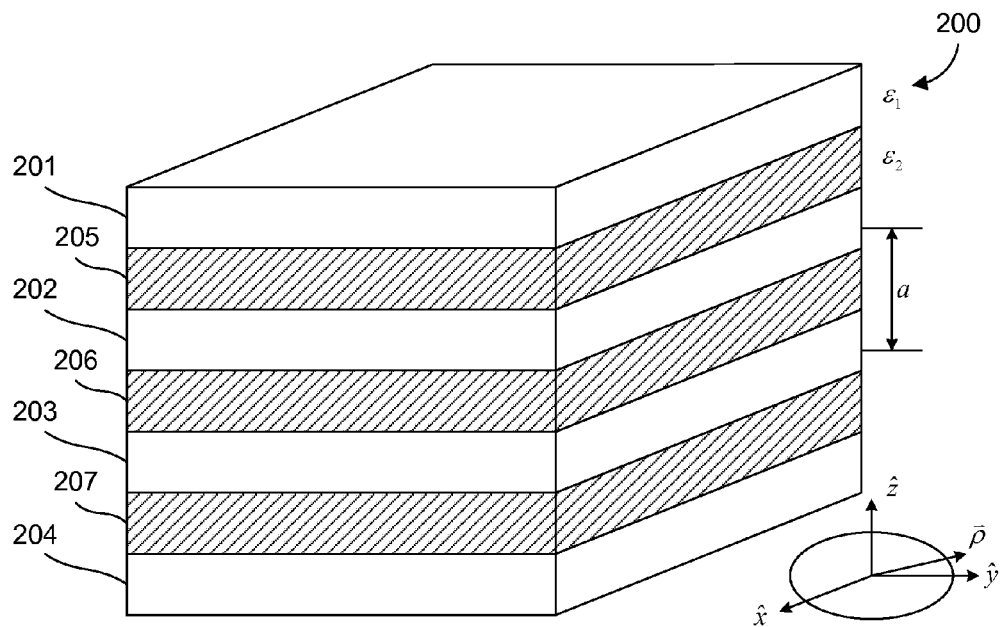
FIG. 2 illustrates an example of a one-dimensional photonic crystal.
Figure 3:
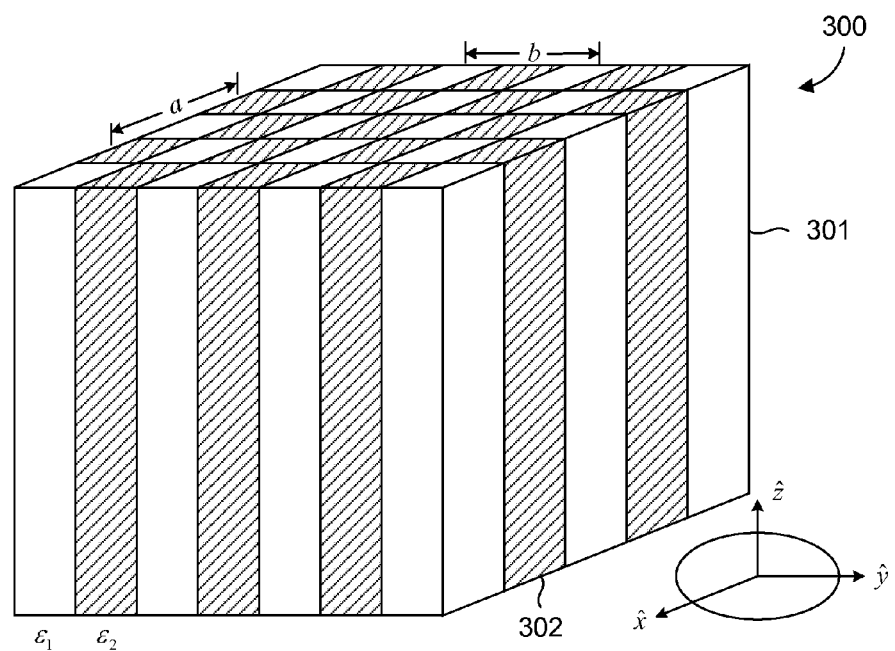
FIG. 3 illustrates an example of a two-dimensional photonic crystal.

Photonic crystals are optical devices composed of two or more different materials with dielectric properties that, when combined together in a regular pattern, can modify the propagation characteristics of electromagnetic radiation ("ER"). FIGS. 2 and 3 illustrate two of many different possible patterns in which two different materials with different dielectric properties can be combined to form a photonic crystal. Photonic crystals are typically identified by the number of directions in which the dielectric pattern is periodic. For example, FIG. 2 illustrates an example of a one-dimensional photonic crystal. In FIG. 2, a photonic crystal 200 is composed of seven layers of two different dielectrics that alternate periodically in the z-direction. Unshaded layers 201-204 are composed of a first dielectric having a dielectric constant $\in_1$, and hash-marked layers 205-207 are composed of a second dielectric having a different dielectric constant $\in_2$. The layers are regularly spaced with a repeat distance called a "lattice constant," in the case of the lattice constant shown in FIG. 2, lattice constant a. FIG. 3 illustrates an example of a two-dimensional photonic crystal. The two-dimensional photonic crystal 300 comprises alternating layers of two different dielectrics, and is periodic in both the x-direction and the y-direction with two lattice constants a and b. Unshaded regions, such as region 301, are composed of a first dielectric having dielectric constant $\in_1$, and hash-marked regions, such as region 302, are composed of a second dielectric having a different dielectric constant $\in_2$. Photonic crystals can also be fabricated with repeating patterns in three dimensions. Three-dimensional photonic crystals can be fabricated using spheres, tubes, or other solid shapes comprising a first dielectric embedded in a slab comprising a second dielectric.

ER propagating in a dielectric can be characterized by electromagnetic waves comprising oscillating, orthogonal electric fields, $\vec{E}$, and magnetic fields, $\vec{H}$, and a direction of propagation, $\vec{K}$. The electric and magnetic fields are related by Maxwell's equations:

$$\nabla \cdot \vec{H}(\vec{r}, t) = 0 \qquad \text{Equation 1}$$

$$\nabla \cdot \varepsilon(\vec{r})\vec{E}(\vec{r}, t) = 0 \qquad \text{Equation 2}$$

$$\nabla \times \vec{E}(\vec{r}, t) = -\frac{\partial \vec{H}(\vec{r}, t)}{\partial t} \qquad \text{Equation 3}$$

$$\nabla \times \vec{H}(\vec{r}, t) = \varepsilon(\vec{r})\frac{\partial \vec{E}(\vec{r}, t)}{\partial t} \qquad \text{Equation 4}$$

where $\vec{r}$ is spatial displacement of an electromagnetic wave in the dielectric, t is time, and $\in(\vec{r})$ is a dielectric constant.

Because dielectrics do not generally support free charges or free currents, Equations 1-4 do not include a charge density term or a volume current density term. Equations 3 and 4, the curl equations, are linear differential equations. In both equations, the left sides express the dependence of a field on the independent spatial displacement $\vec{r}$, and the right sides express the dependence of a field on t. The only way for a differential quantity that varies with respect to $\vec{r}$ to remain equal to a quantity that varies with respect to t, is for the differential quantities to equal the same constant value. Both sides of Equations 3 and 4 are equal to a constant, and the method of separation of variables can be applied to obtain:

$$\vec{H}(\vec{r},t)=\vec{H}(\vec{r})\exp(i\omega t)$$

$$\vec{E}(\vec{r},t)=\vec{E}(\vec{r})\exp(i\omega t)$$

where $\omega$ is the angular frequency of an electromagnetic wave propagating in a dielectric.

Maxwell's curl Equations 3 and 4 can be decoupled by dividing Equation 4 by the dielectric constant $\in(\vec{r})$, applying the curl operator, and substituting Equation 3 for the curl of the electric field to give:

$$\Theta \vec{H}(\vec{r})=\omega^2 \vec{H}(\vec{r}) \qquad \text{Equation 5:}$$

where $$\Theta = \nabla \times \left(\frac{1}{\varepsilon(r)} \nabla \times \right)$$

is a differential operator.

Equation 5 is an eigenvalue equation, where the eigenvalues are $\omega^2$, and the eigenfunctions are the corresponding magnetic fields $\vec{H}(\vec{r})$. After the magnetic fields $\vec{H}(\vec{r})$ are determined according to Equation 5, the electric field $\vec{E}(\vec{r})$ can be obtained by substituting $\vec{H}(\vec{r},t)$ into Equation 3 and solving for $\vec{E}(\vec{r})$.

Figure 1A:
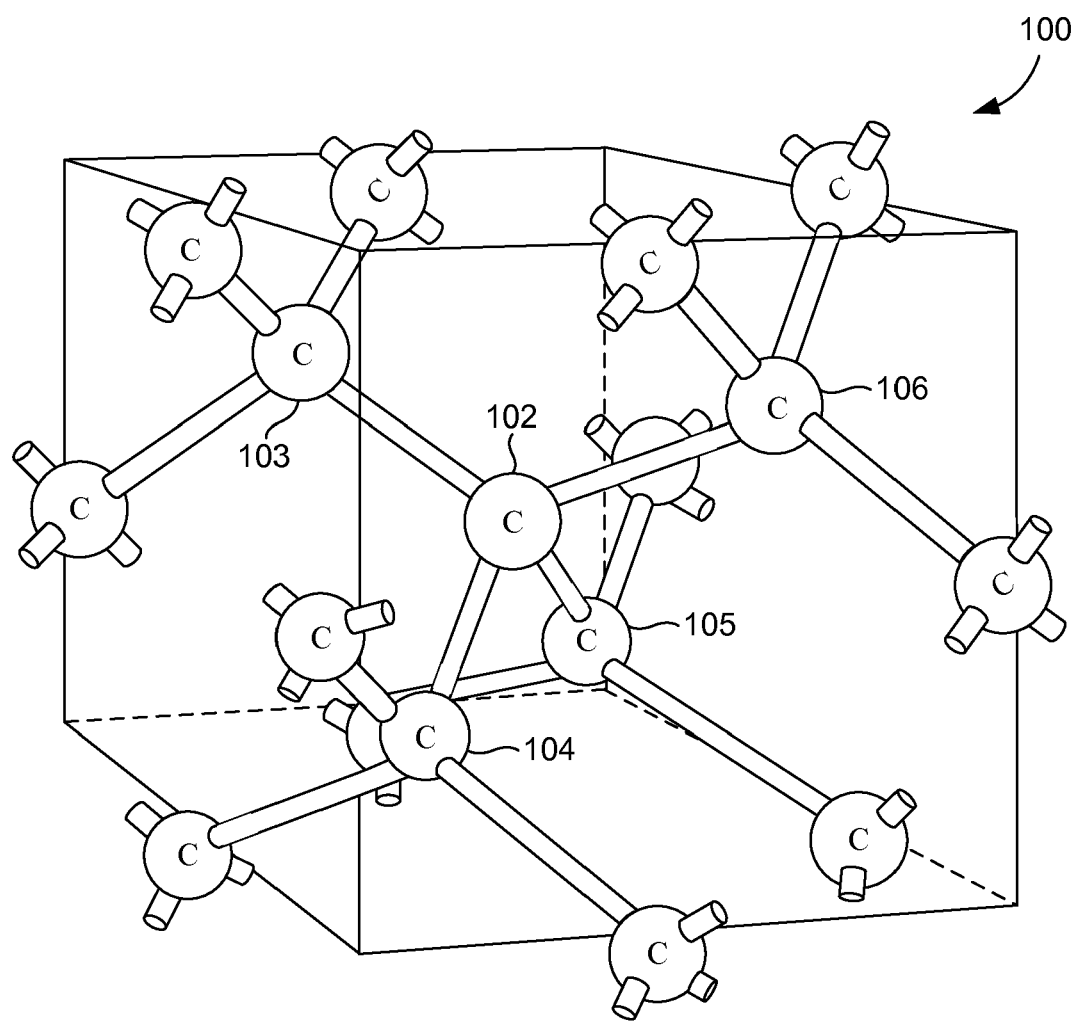
FIG. 1A shows a unit cell of a diamond-crystal lattice.
Figure 1B:
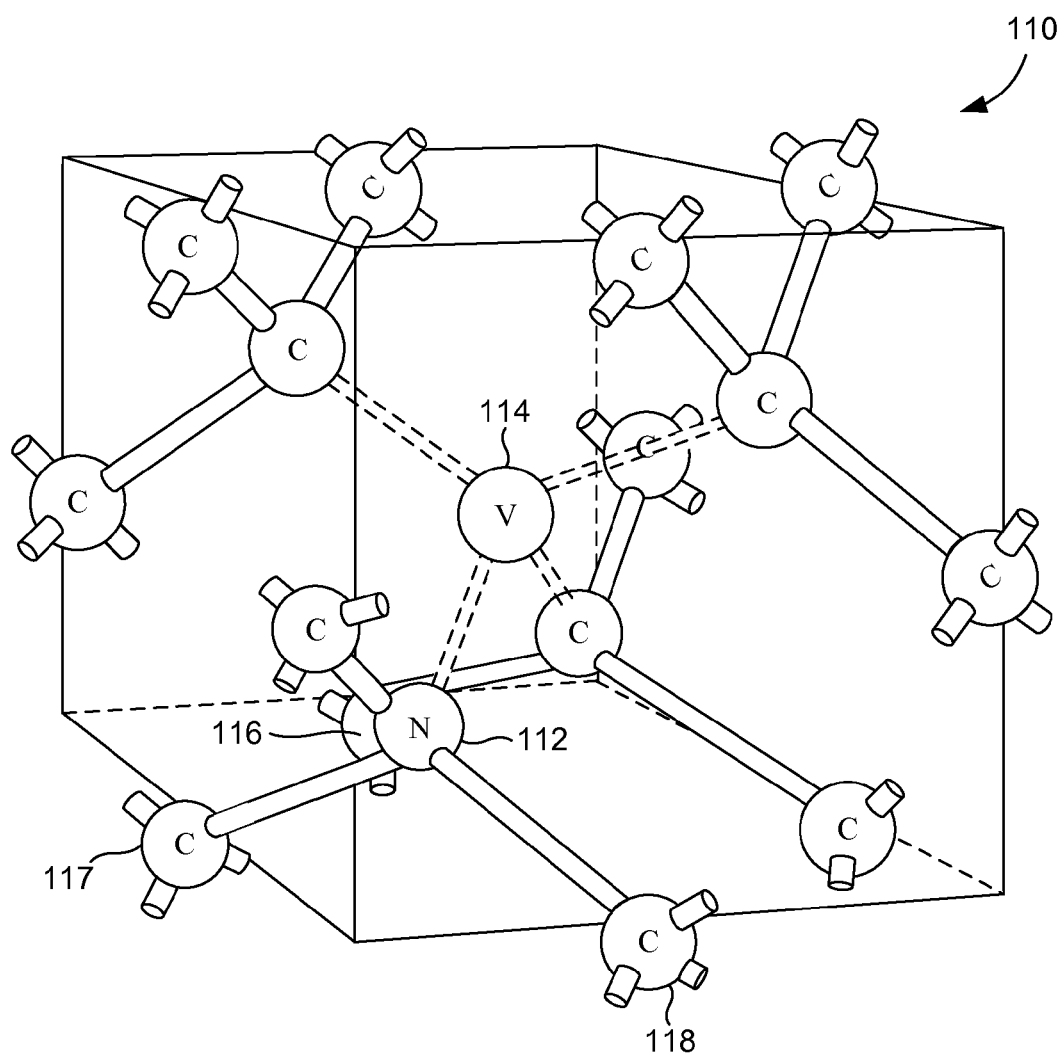
FIG. 1B shows a nitrogen-vacancy center surrounded by a diamond-crystal lattice.
Figure 1C:
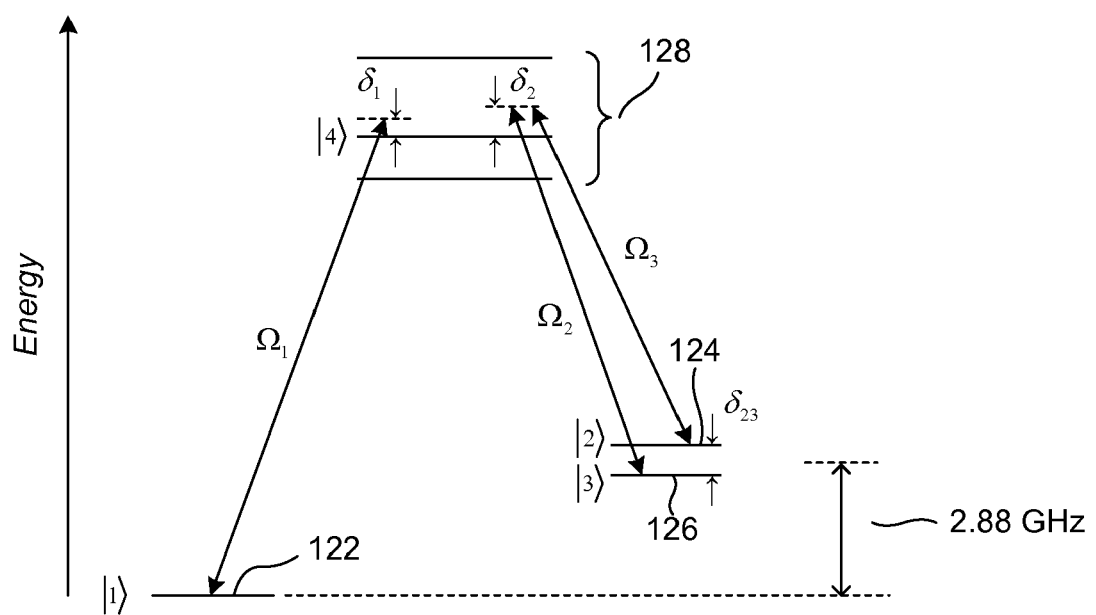
FIG. 1C illustrates an energy-level diagram of a negatively charged nitrogen-vacancy center.

For finite dimensional photonic crystals, such as the photonic crystals shown in FIGS. 1 and 2, the eigenvalues and eigenfunctions of Equations 5 are quantized to give:

$$\Theta \vec{H}_j(\vec{r})=\omega_j^2 \vec{H}_j(\vec{r})$$

where j is a non-negative integer value called the "band index" that labels the harmonic modes of the magnetic field $\vec{H}(\vec{r})$ in order of increasing angular frequency.

The translational symmetry of the photonic crystal can be used to determine the functional form of the magnetic fields $\vec{H}_j(\vec{r})$. For example, the functional form of the magnetic fields $\vec{H}_j(\vec{r})$ propagating in the photonic crystal 200 are given by the following:

$$\vec{H}_{j,\vec{k}_\parallel,k_z}(\vec{r})=\exp(i\vec{k}_\parallel \cdot \vec{p})\exp(ik_z z)\vec{u}_{j,\vec{k}_\parallel,k_z}(z) \qquad \text{Equation 6:}$$

where $\vec{p}$ is an xy-plane vector, $\vec{k}_\parallel$ is an xy-plane wave vector, $k_z$ is a z-direction wave vector component, and $\vec{u}_{n,\vec{k}_\parallel,k_z}(z)$ is a periodic function in the z-direction. The exponential term $\exp(i\vec{k}_\parallel \cdot \vec{p})$ in Equation 6 arises from the continuous translational symmetry of ER propagating through the dielectric layers in the xy-plane. However, the term $\exp(ik_z z)\vec{u}_{j,\vec{k}_\parallel,k_z}(z)$ in Equation 6 arises from Bloch's theorem and the discrete translational symmetry imposed in the z-direction by the periodicity of the dielectric constant of the photonic crystal 200, given by:

$$\in(\vec{r})=\in(\vec{r}+\vec{R})$$

where $R=a\hat{z}$, a is a lattice constant determined by the regular pattern of the dielectric layers, and l is an integer.

The magnetic fields $\vec{H}_{j,k_\parallel,k_z}(\vec{r})$ are periodic for integral multiples of $2\pi/a$. As a result, the associated angular frequencies are also periodic:

$$\omega_j(k_z) = \omega_j\left(k_z + \frac{m2\pi}{a}\right) \quad \text{Equation 7}$$

Differences in the dielectric pattern of a photonic crystal creates one or more range of frequencies $\omega_j$, referred to as "photonic bandgaps," for which ER is prevented from propagating in the photonic crystal. The photonic bandgap also corresponds to an electromagnetic energy range and a range of wavelengths, denoted by $\lambda_j$, for which the differences between the dielectrics prevents ER absorption and ER propagation. The wavelength $\lambda_j$ of ER transmitted through a photonic crystal is related to the angular frequency $\omega_j$:

$$\lambda_j = \frac{2\pi v}{\omega_j}$$

where v is the velocity of ER in the photonic crystal. Certain ER frequency ranges are not transmitted through a photonic crystal because high-frequency harmonic modes tend to concentrate electromagnetic energy in dielectric regions with a low dielectric constant, while low-frequency harmonic modes tend to concentrate electromagnetic energy in dielectric regions with a high dielectric constant. The electromagnetic energy, W, can be determined from the variational principle as follows:

$$W(\vec{H}) = \frac{1}{2(\vec{H}, \vec{H})} \int d\vec{r} \frac{1}{\varepsilon(\vec{r})} |\nabla \times \vec{H}(\vec{r})|^2$$

where $(\vec{H},\vec{H}) = \int d\vec{r} \vec{H}(\vec{r})^* \vec{H}(\vec{r})$, and "*" represents the complex conjugate. The electromagnetic energy is lower for harmonic modes propagating in regions with a high dielectric constant than for modes propagating in regions of a photonic crystal with a low dielectric constant.

The size of and range of frequencies within a photonic bandgap of a one-dimensional photonic crystal depends on the relative difference between the dielectric constants of the dielectrics comprising a photonic crystal. One-dimensional photonic crystals with large relative differences between the dielectric constants of the materials comprising the photonic crystal have larger photonic bandgaps at higher frequency ranges than photonic crystals with smaller relative differences between the dielectric constants.

Figure 4A:
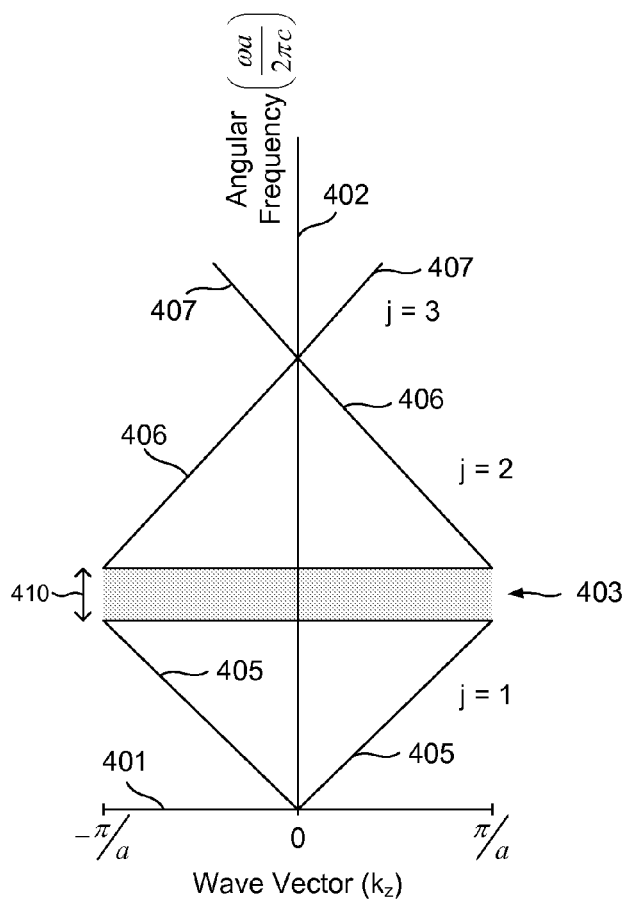
FIGS. 4A-4B are hypothetical plots of frequency versus wave vector z-component for a first one-dimensional photonic crystal and a second one-dimensional photonic crystal, respectively.
Figure 4B:
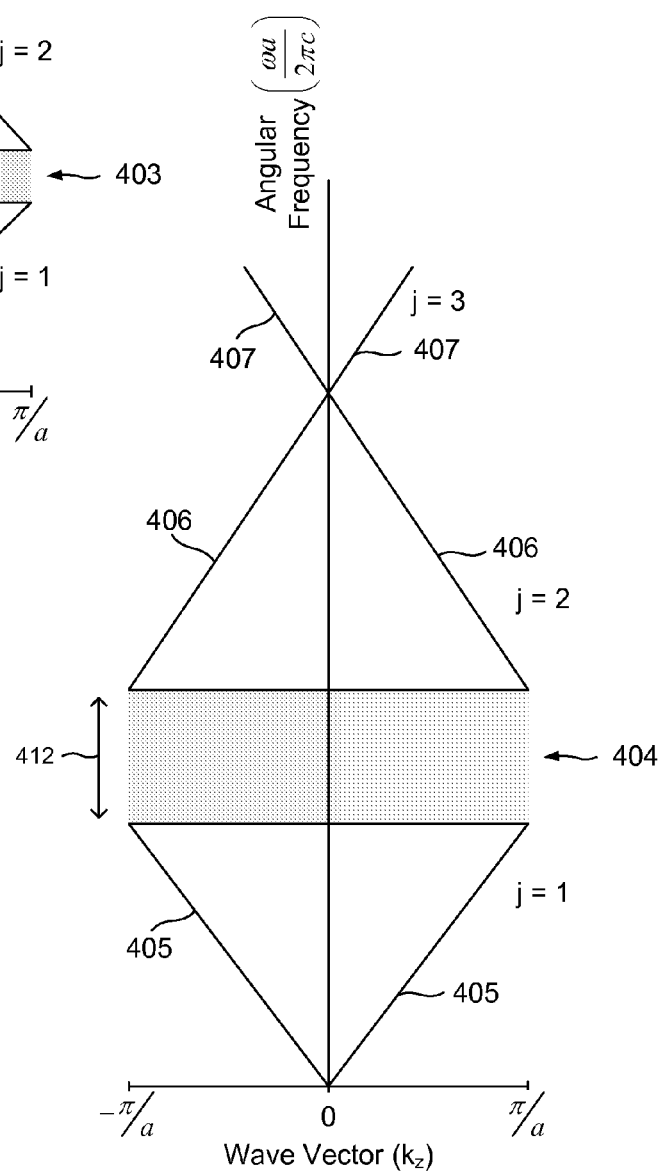

FIGS. 4A-4B are hypothetical plots of frequency ($\omega a/2\pi c$) versus wave vector z-component, $k_z$, for a first one-dimensional photonic crystal and a second one-dimensional photonic crystal, respectively. In FIGS. 4A-4B, horizontal axes, such as horizontal axis 401, correspond to wave vector z-component $k_z$, and vertical axes, such as vertical axis 402, correspond to the frequency. Because the frequencies $\omega_j$ are periodic, as described above with reference to Equation 7, frequencies ($\omega_j a/2\pi c$) are plotted with respect to wave vector z-component range $-\pi/a$ and $\pi/a$ for angular frequency bands j equal to 1, 2, and 3. The photonic bandgaps are identified by shaded regions 403 and 404. Lines 405, 406, and 407 correspond to the first, second, and third angular frequency bands (j=1, 2, and 3). The width 410 of the photonic bandgap 403, in FIG. 4A, is smaller than the width 412 of the photonic bandgap 404, in FIG. 4B, because the relative difference between the dielectric constants of the materials comprising the first photonic crystal is smaller than the relative difference between the dielectric constants of materials comprising the second photonic crystal. Also, the photonic bandgap 403 covers a lower range of frequencies than the range of frequencies covered by photonic bandgap 404.

Figure 5:
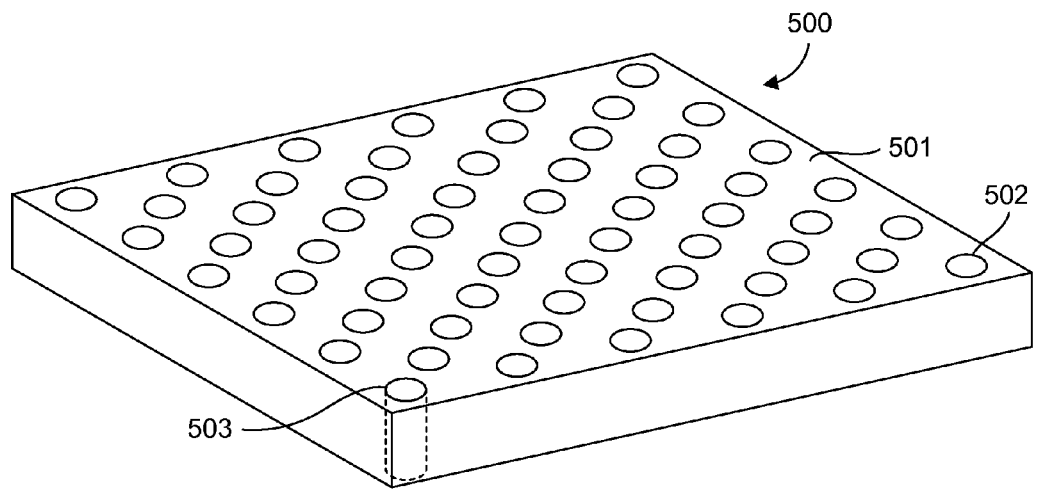
FIGS. 5-6 illustrate perspective views of two two-dimensional photonic crystals.
Figure 6:
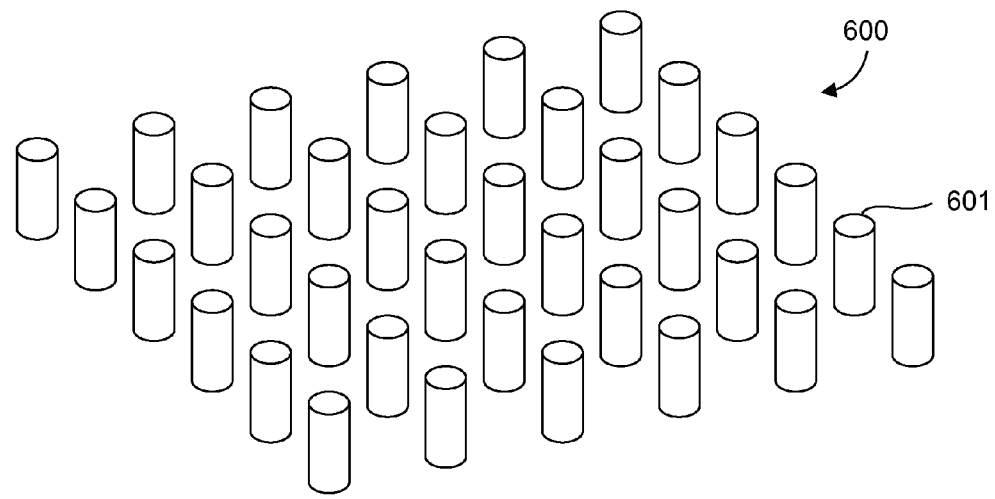

Two-dimensional photonic crystals can be composed of a regular lattice of cylindrical columns fabricated in a dielectric slab. The cylindrical columns can be air holes or holes filled with a dielectric material different from the dielectric material of the photonic slab. FIG. 5 illustrates a perspective view of a two-dimensional photonic crystal. In FIG. 5, a photonic crystal 500 is composed of a dielectric slab 501 with a regular lattice of embedded cylindrical columns, such as column 502. The cylindrical columns extend from the top surface to the bottom surface of the slab 501, as indicated by a cylindrical column 503, and can be holes filled with air or any other material having a dielectric constant different from the dielectric constant of the slab 501. Two-dimensional photonic crystals can also be composed of a regular lattice arrangement of cylindrical columns surrounded by a gas or a liquid. FIG. 6 illustrates a two-dimensional photonic crystal 600 having a regular square lattice of solid cylindrical columns, such as a cylindrical column 601, surrounded by fluid, such as gas or liquid, with a dielectric constant different from the cylindrical columns.

Figure 7A:
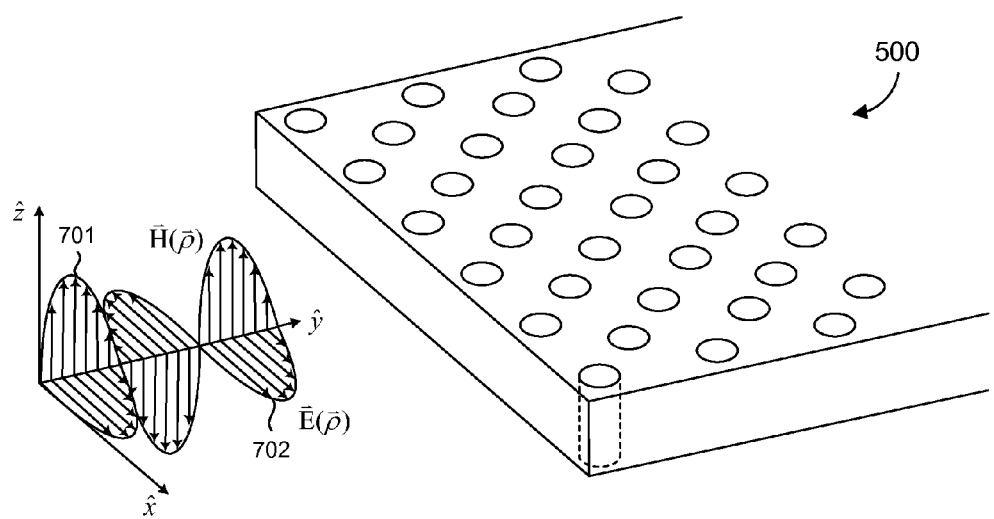
FIGS. 7A-7B illustrate propagation of a transverse electric field and magnetic field modes in the two-dimensional photonic crystal shown in FIG. 5.
Figure 7B:
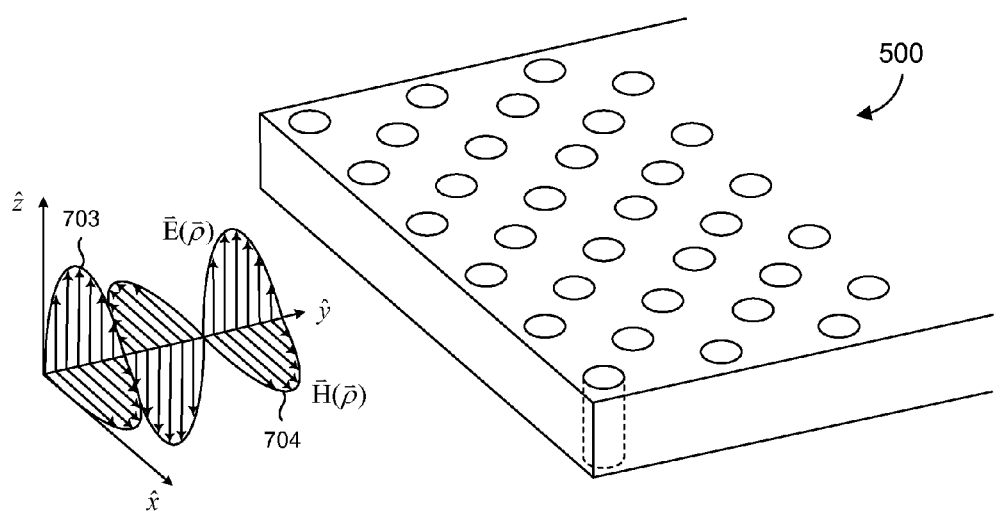

Two-dimensional photonic crystals polarize ER propagating in the periodic plane of the photonic crystal, and the electric and magnetic fields can be classified into two distinct polarizations: (1) the transverse electric-field ("TE") modes; and (2) the transverse magnetic-field ("TM") modes. The TE have $\vec{H}(\vec{p})$ directed normal to the periodic plane of the photonic crystal and $\vec{E}(\vec{p})$ directed in the periodic plane of the photonic crystal, while the TM have $\vec{E}(\vec{p})$ directed normal to the periodic plane of the photonic crystal and $\vec{H}(\vec{p})$ directed in the periodic plane of the photonic crystal. FIGS. 7A-7B illustrate propagation of TE and TM modes in the two-dimensional photonic crystal shown in FIG. 5. The periodic plane of the photonic crystal 500 lies in the xy-plane, the cylindrical columns are parallel to the z-direction, and ER propagates through the photonic crystal 500 in the y-direction. In FIG. 7A, an oscillating curve 701 represents the $\vec{H}(\vec{p})$ mode directed normal to the xy-plane, and an oscillating curve 702 represents the orthogonal $\vec{E}(\vec{p})$ mode directed in the xy-plane. In FIG. 7B, an oscillating curve 703 represents the $\vec{E}(\vec{p})$ mode directed normal to the xy-plane, and an oscillating curve 704 represents the orthogonal $\vec{H}(\vec{p})$ mode directed in the xy-plane.

FIG. 8 illustrates a photonic band structure of TM and TE modes of an ER propagating in the photonic crystal shown in FIG. 5. In FIG. 8, a vertical axis 801 represents the angular frequency of ER propagating in the photonic crystal 500, and a horizontal axis 802 represents the ER propagation paths between lattice points labeled Γ, M, and K in a photonic crystal segment 803 of the photonic crystal 500, shown in FIG. 5. Solid lines, such as solid line 804, represent TM modes, and dashed lines, such as dashed line 805, represent the TE modes. A shaded region 806 identifies a photonic bandgap in which neither the TE nor TM modes are permitted to propagate in the photonic crystal 500.

The width and the frequency range covered by photonic bandgaps in two-dimensional photonic crystal slabs, such as the photonic bandgap 806, depends on the periodic spacing of the cylindrical columns, represented by lattice constant a, and the relative difference between the dielectric constant of the slab and the dielectric constant of the cylindrical columns. Also, the frequency range covered by photonic bandgap 806 can be shifted to a higher frequency range for larger relative differences between the dielectric constant of the slab and the dielectric constant of the cylindrical columns, while the photonic bandgap 806 can be shifted to a lower frequency range for smaller relative differences between the dielectric constant of the slab and the dielectric constant of the cylindrical columns.

Two-dimensional photonic crystals can be designed to reflect ER within a specified frequency band. As a result, a two-dimensional photonic crystal can be designed and fabricated as a frequency-band stop filter to prevent the propagation of ER having frequencies within the photonic bandgap of the photonic crystal. Generally, the size and relative spacing of cylindrical columns control which wavelengths of ER are prohibited from propagating in the two-dimensional photonic crystal. However, defects can be introduced into the lattice of cylindrical columns to produce particular localized optical components. In particular, a point defect, also referred to as a "resonant cavity," can be fabricated to provide a resonator that temporarily traps a narrow range of frequencies or wavelengths of ER. A line defect, also referred to as a "waveguide," can be fabricated to transmit ER with frequency ranges or wavelengths that lie within a frequency range of a photonic bandgap. As a result, a three-dimensional photonic crystal slab can be thought of as two-dimensional crystal having a refractive index n that depends on the thickness of the slab.

Figure 9:
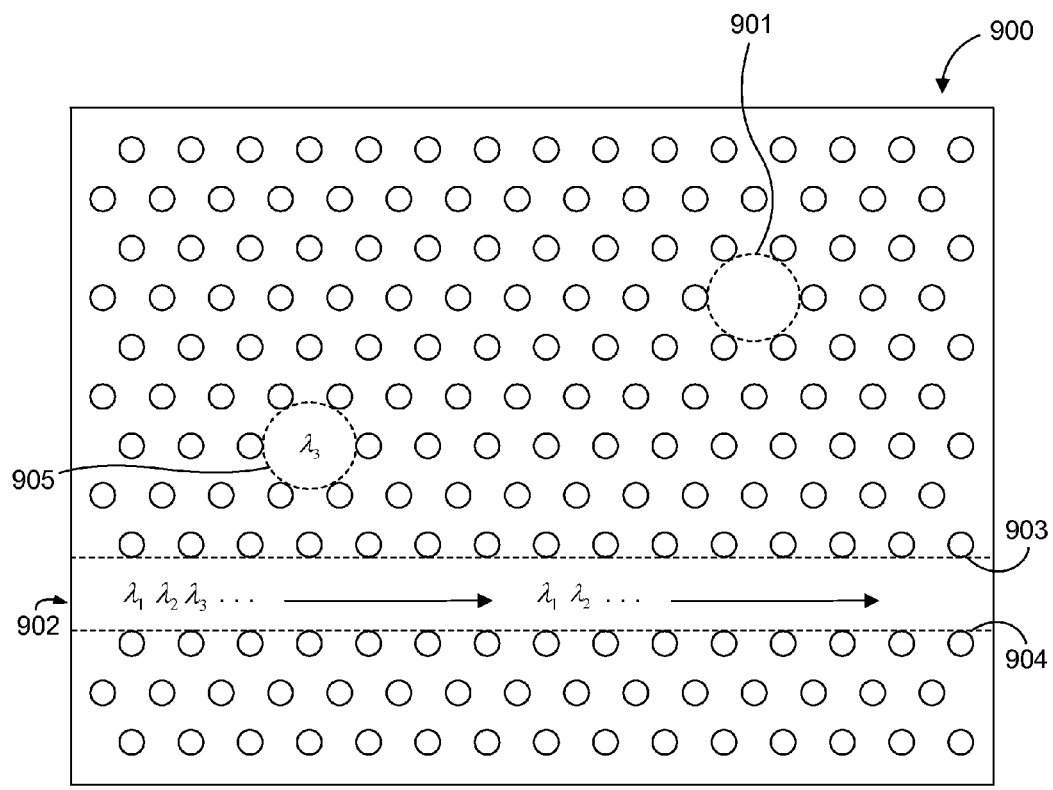
FIG. 9 illustrates an example of a photonic crystal with two resonant cavities and a waveguide.

FIG. 9 illustrates an example of a photonic crystal with two resonant cavities and a waveguide. A resonant cavity can be created in a two-dimensional photonic crystal slab by omitting, increasing, or decreasing the size of a select cylindrical column. For example, a resonant cavity 901 is created in a photonic crystal 900 by omitting a cylindrical column, as indicated by the empty region surrounded by a dashed-line circle. Resonant cavities 901 and 905 are surrounded by effectively reflecting walls that temporarily trap ER in the frequency range of the photonic bandgap. Resonant cavities can channel ER within a narrow frequency band in a direction perpendicular to the plane of the photonic crystal. For example, the resonant cavity 901 can trap localized TM modes and TE modes within a narrow frequency band of the photonic bandgap. Unless the photonic crystal 900 is sandwiched between two reflective plates or dielectrics that create total internal reflection, the ER resonating in the resonant cavity 901 can escape in the direction perpendicular to the periodic plane of the photonic crystal 900. Each resonant cavity has an associated quality ("Q") factor that provides a measure of how many oscillations take place in a cavity before the ER diffuses into the region surrounding the resonant cavity.

Waveguides are optical transmission paths that can be used to direct ER within a particular frequency range of the photonic bandgap from a first location in a photonic crystal to a second location in the photonic crystal. Waveguides can be fabricated by changing the diameter of certain cylindrical columns within a column or row of cylindrical columns, or by omitting rows of cylindrical columns. For example, in the photonic crystal 900, a dielectric waveguide 902 is created by omitting an entire row of cylindrical columns during fabrication of the photonic crystal 900, as indicated by the empty region between dashed lines 903 and 904. The dielectric waveguide 902 transmits ER with wavelengths $\lambda_0$ and $\lambda_1$ along a single path. Networks of branching waveguides can be used to direct ER in numerous different pathways through the photonic crystal. The diameter of an optical signal propagating along a waveguide can be as small as $\lambda/3n$, where n is the refractive index of the waveguide, while a harmonic mode volume of a resonant cavity can be as small as $2(\lambda/3n)^3$.

Waveguides and resonant cavities may be less than 100% effective in preventing ER from escaping into the area immediately surrounding the waveguides and resonant cavities. For example, ER within a frequency range in the photonic bandgap propagating along a waveguide also tends to diffuse into the region surrounding the waveguide. ER entering the area surrounding a waveguide or a resonant cavity experiences an exponential decay in amplitude, a process referred to as "evanescence." As a result, a resonant cavity can be located within a short distance of a waveguide to allow certain wavelengths of ER carried by the waveguide to be extracted by the resonant cavity. In effect, resonant cavities are filters that can be used to extract a fraction of a certain wavelength of ER propagating in the waveguide. Depending on a resonant cavity Q factor, an extracted ER can remain trapped in a resonant cavity and resonate for a time before evanescing into the surroundings or backscattering into the waveguide. For example, in FIG. 9, the resonant cavity 901 is located too far from the waveguide 902 to extract a mode with particular wavelength of ER. However, the resonant cavity 905 is able to extract a fraction of ER with wavelength $\lambda_3$ propagating along the waveguide 902. Thus, a smaller fraction of ER with wavelength $\lambda_3$ may be left to propagate in the waveguide 902 along with ER of wavelengths $\lambda_1$ and $\lambda_2$.

Figure 10:
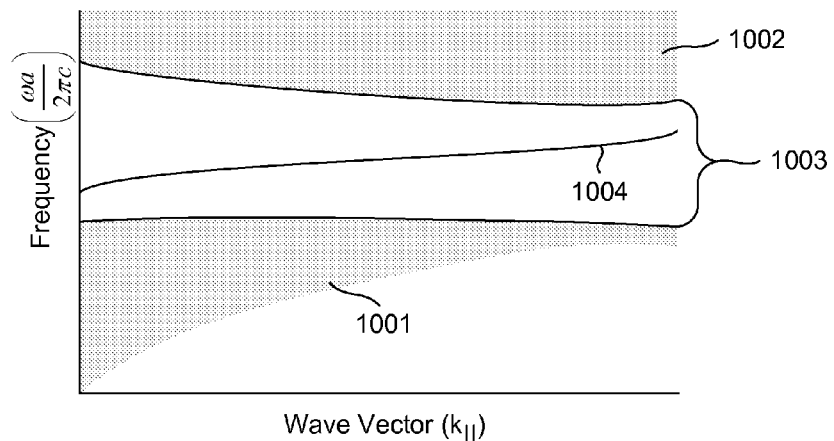
FIG. 10 is a hypothetical plot of frequency versus wavevector for the waveguide of the photonic crystal shown in FIG. 9.

FIG. 10 is a hypothetical plot of frequency versus the magnitude of wave vector $\vec{k}_\parallel$ for the waveguide of the photonic crystal shown in FIG. 9. In FIG. 10, shaded regions 1001 and 1002 represent projected first and second band structures of the photonic crystal 900 in the absence of the waveguide 902, shown in FIG. 9. A region 1003 identifies the photonic bandgap created by the photonic crystal 900. Line 1004 identifies a band of frequencies permitted to propagate in the waveguide 902. The number of frequency bands permitted to propagate in waveguide 902 can be increased by increasing the size of the waveguide 902.

For three-dimensional photonic crystals, the three-dimensional lattice parameters, the difference between dielectric constants, and the dimensions of the inclusions determine the frequency range of photonic bandgaps. Waveguides and resonant cavities can also be fabricated in three-dimensional photonic crystals by selectively removing or changing the dimensions of certain inclusions.

EMBODIMENTS OF THE PRESENT INVENTION

Figure 11:
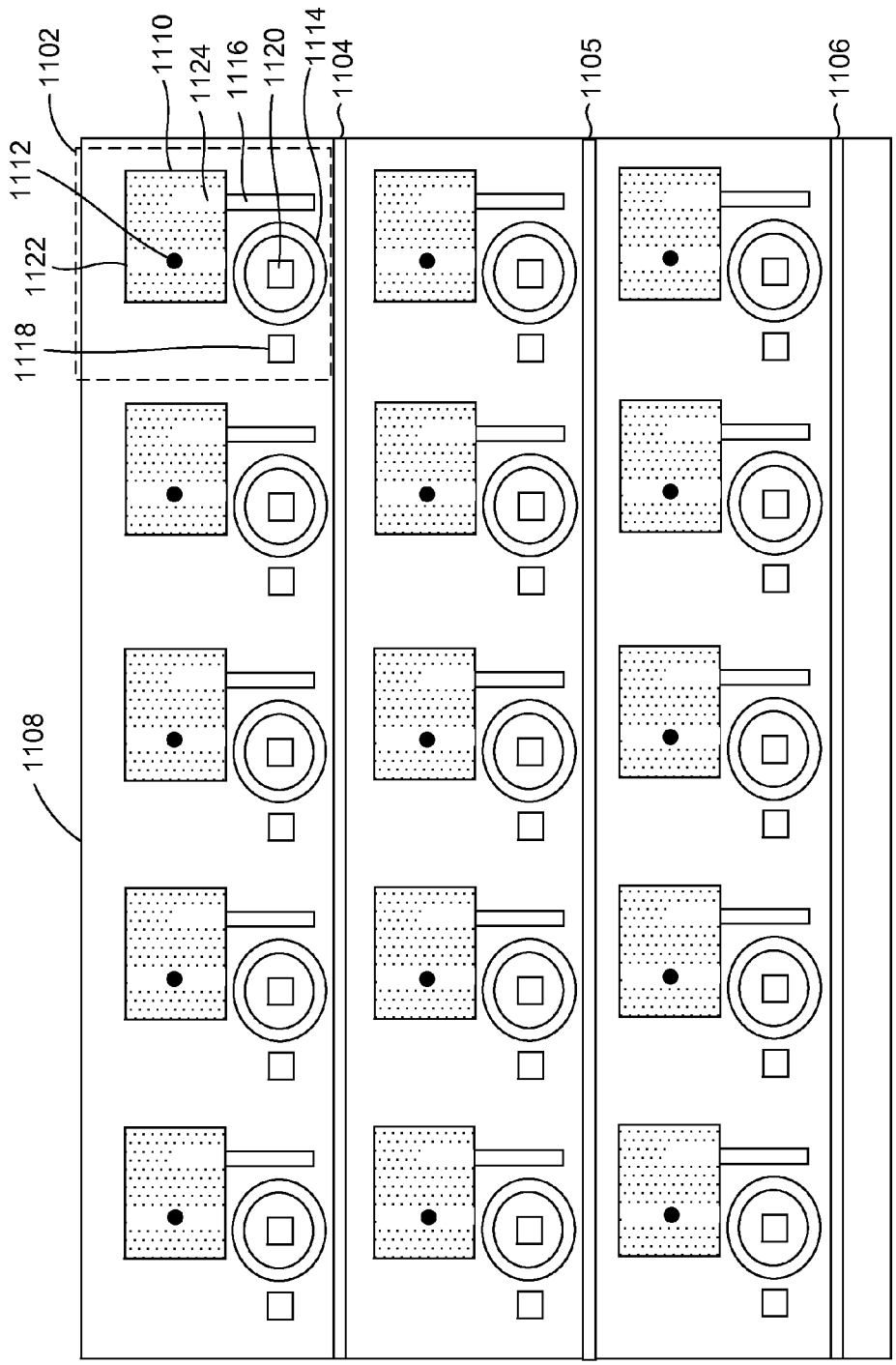
FIG. 11 illustrates an example of a first color-center based photonic chip that represents an embodiment of the present invention.

FIG. 11 illustrates an example of a first color-center based photonic chip 1100 that represents an embodiment of the present invention. The photonic chip 1100 comprises a photonic network of 15 identically configured nodes, such as node 1102, and 3 bus ridge waveguides 1104-1106 that are located on the top surface of a substrate 1108. The node 1102 comprises a photonic crystal 1110 coupled to a color center, represented by a dot 1112, a microring 1114, and a ridge waveguide 1116. The microring 1114 is coupled to a first electrode 1118 and a second electrode 1120. The photonic crystal 1110 includes a first waveguide 1122 and a second waveguide 1124. The first waveguide transmits electromagnetic waves to, and from, the color center 1112. The second waveguide 1124 is coupled to the ridge waveguide 1116 and can be used to transmit electromagnetic waves to, and from, the photonic crystal 1110 via a vertically coupled photonic device (not shown), such as an optical fiber. The color centers can be atomic-vacancy centers, such as the NV center described above with reference to FIG. 1C, a Ni vacancy center, or a Si vacancy center. The color centers are coupled to resonant cavities (not shown) that are located within the first waveguides of the photonic crystals.

The photonic chip 1100 is an example of a quantum computing architecture that can be operated as a processor, memory array, or any other device for quantum computing, quantum information processing, and storing quantum information. Each color center can be used to store a quantum bit of information. The waveguides 1104-1106 transmit information encoded in electromagnetic waves to, and from, the nodes and can be separately coupled to optical fiber input/output couplers (not shown). Electrical signal lines (not shown) that extend perpendicular to the substrate 1108 surface can transmit current to operate each electrode.

At each node, an electromagnetic wave is transmitted between a bus waveguide and a node color center via evanescent coupling. For example, an electromagnetic wave transmitted along the bus waveguide 1104 can be transmitted by evanescent coupling to the microring 1114. The electromagnetic wave resonates in the microring 1114 and can again be transmitted by evanescent coupling to the waveguide 1122 of the photonic crystal 1110 and/or to the waveguide 1124 by evanescent coupling with the ridge waveguide 1116. When the energy of the electromagnetic wave is large enough, the color center may absorb the energy by undergoing an electronic state change, as described above with reference to FIG. 1C. Also, when the color center 1112 undergoes electronic state transition, an electromagnetic wave emitted from the color center 1122 can be transmitted from the first waveguide 1122 to the microring 1114, and from the microring 1114 to the bus waveguide 1106 via evanescent coupling.

The dimensions of each microring can be different and/or each microring can be patterned with holes of different arrangements and sizes so that each microring can maintain resonance of an electromagnetic wave of a particular wavelength. As a result, the microring of each node can serve as drop/add filter by extracting an electromagnetic wave of a particular wavelength out of numerous electromagnetic waves transmitted in an adjacent bus waveguide and by placing an electromagnetic wave of a particular wavelength into the adjacent bus waveguide. Tuning of microring drop/add structure is well-known in the art. See e.g., Y. Kokubun, *IEICE Trans. Electron.*, E88-C, 349 (2005).

The microring and the first and second electrodes of each node comprise a switch that can be used to selectively turn each node "on" or "off." For example, each switch can be used to turn off a node by changing the microring resonance frequency. Consider in FIG. 11, a switch comprising the microring 1114, the first electrode 1118, and the second electrode 1120. An appropriate positive, or negative, voltage applied between the first electrode 1118 and the second electrode 1120 changes the refractive index of the microring 1114. By changing the refractive index of the microring 1114, the resonance frequency of the microring 1114 is shifted away from the absorption and/or emission frequency of the color center 1112. As a result, the color center 1112 and the bus waveguide 1104 are no longer coupled. In an alternate embodiment of the present invention, thermal refractive index tuning can be used to supply heat via the electrodes that changes the refractive index of the coupled microring. In an alternate embodiment of the present invention, electrooptic modulation of the switch microrings can also be used. In an alternate embodiment of the present invention, the photonic chip 1100 may exclude the electrodes coupled to the microrings. Individual nodes can be turned "on" or "off" by changing the refractive index of a switch microring using an incident electromagnetic wave of a particular wavelength.

FIGS. 12-14 illustrate three different materials and node-configuration embodiments for a photonic chip, such as the photonic chip 1100 described above with reference to FIG. 11.

In a first materials and node-configuration embodiment of the present invention, the photonic devices of the photonic chip are patterned into a transmission layer comprising a III-V, a II-VI, a Group IV semiconductor or a high refractive index dielectric. The transmission layer is embedded between top and bottom cladding layers comprising a relatively lower refractive index material, such as silica ($SiO_2$). The Roman numerals II, III, IV, V, and VI refer to the Group Two, Group Three, Group Four, Group Five, and Group Six elements in the Periodic Table of Elements, respectively. For example, the microrings and the bus waveguides of the photonic chip 1100 can be a III-V semiconductor, such as GaP, which comprises equal quantities of Ga, a Group Three element, and P, a Group Five element. The II-VI and the III-V semiconductors are not limited to equal quantities of just one Group Two element and one Group Six element, or one Group Three element and one Group Five element. The semiconductors can have a quantity of two or more different Group Two elements and an equal quantity of two or more different Group Six elements, or a quantity of two or more different Group Three elements and an equal quantity of two or more different Group Five elements. For example, the transmission layer can be comprised of a III-V semiconductor comprising a quantity of Al and Ga, both Group Three elements, and an equal quantity of P, a Group Five element.

Figure 12A:
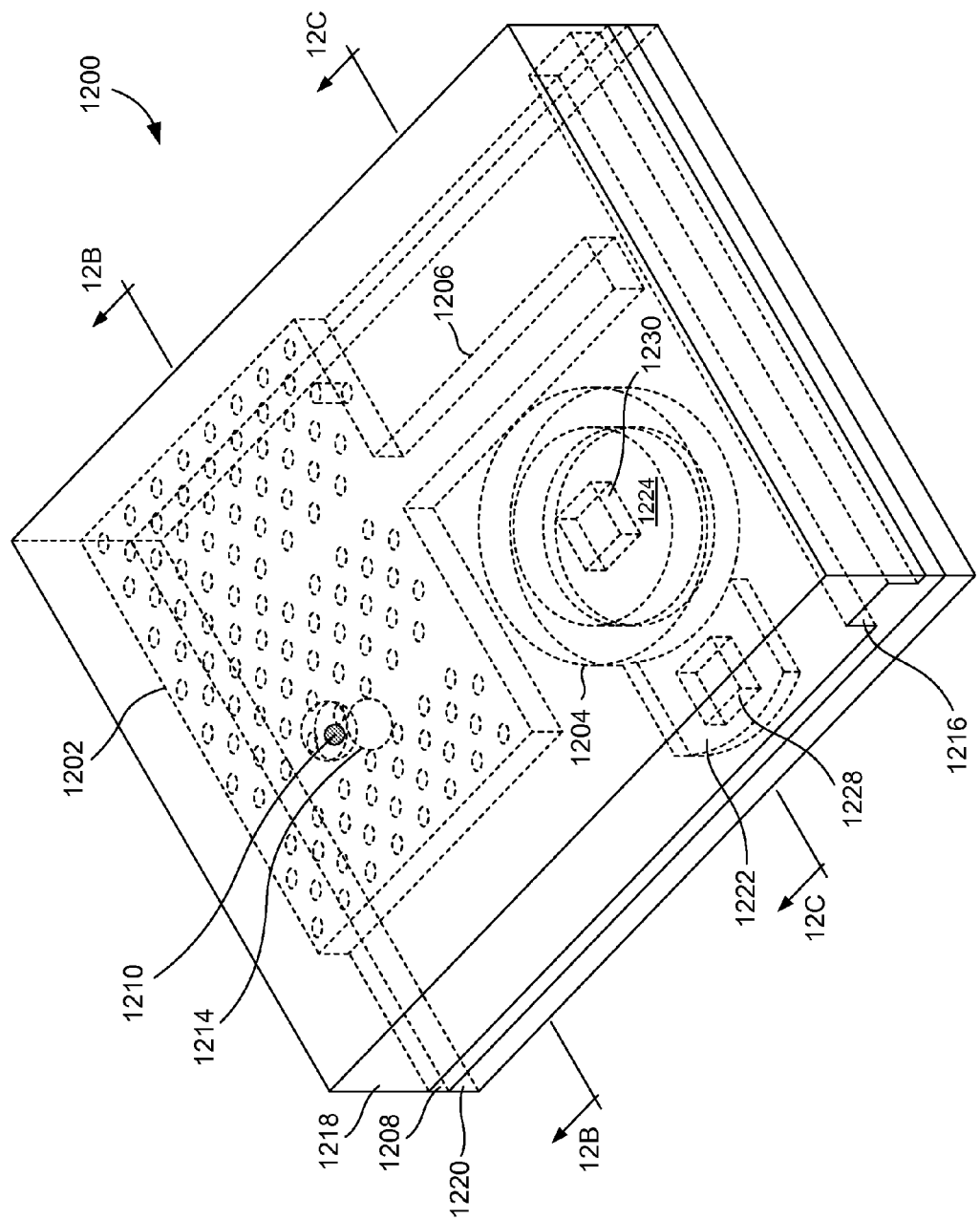
FIG. 12A illustrates a perspective view of a photonic-chip node of the photonic chip shown in FIG. 11 that represents a first materials and node-configuration embodiment of the present invention.
Figure 12B:
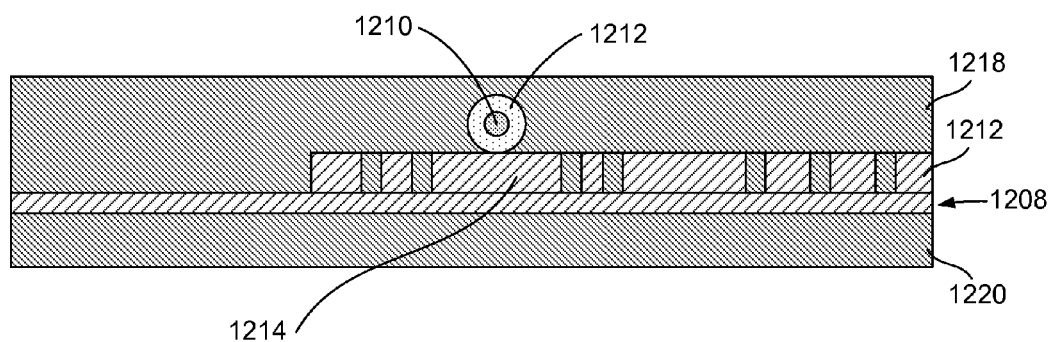
FIG. 12B illustrates a first cross-sectional view of the photonic-chip node shown in FIG. 12A that represents an embodiment of the present invention.

FIG. 12A illustrate a perspective-view of a photonic-chip node that represents the first materials and node-configuration embodiment of the present invention. As shown in FIG. 12A, a node 1200 comprises a photonic crystal 1202, microring 1204, and a ridge waveguide 1206 patterned in a transmission layer 1208. A color center 1210 is surrounded by a diamond layer 1212 and located on top of a resonant cavity 1214 of the photonic crystal 1202. The transmission layer 1208 also includes a bus waveguide 1216 that is adjacent to the microring 1204. The diamond layer 1212 and the transmission layer 1208 are embedded between a top cladding layer 1218 and a bottom cladding layer 1220. The node 1200 also includes a negatively-doped region ("n-region") 1222 and a positively doped region ("p-region") 1224. A first electrode 1228 is located on the top surface of the n-region 1222, and a second electrode 1230 is located on the top surface of the p-region 1224. The n-region 1222 and the p-region 1224 are separated by the intrinsic transmission layer 1208 material to form a "p-i-n junction." FIG. 12B illustrates a first cross-sectional view of the node 1200 that represents an embodiment of the present invention. In FIG. 12B, the color center 1210 surrounded by the diamond layer 1212 is located above the resonant cavity 1214. The top cladding layer 1218 covers the diamond layer 1212 and fills the cylindrical holes in the photonic crystal 1212. The bottom cladding layer 1220 supports the transmission layer 1208.

Figure 12C:
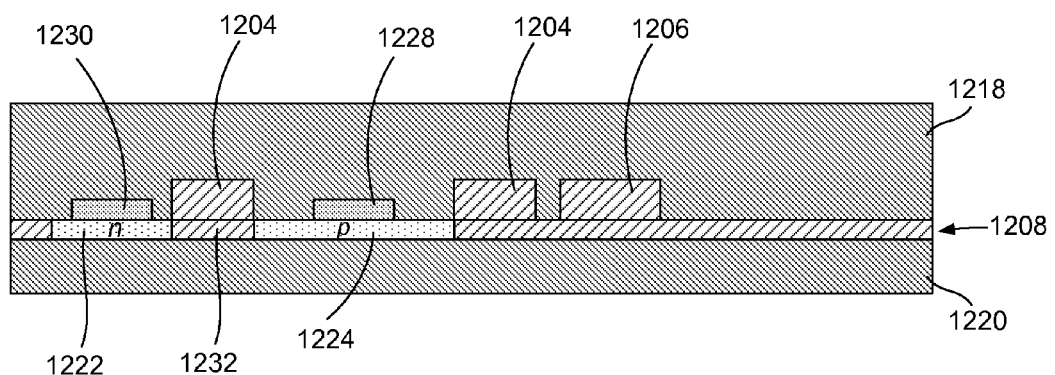
FIG. 12C illustrates a second cross-sectional view of the photonic-chip node shown in FIG. 12A that represents an embodiment of the present invention.

FIG. 12C illustrates a second cross-sectional view of the node 1200 that represents an embodiment of the present invention. As shown in FIG. 12C, the n-region 1222 and the p-region 1224 penetrate the transmission layer 1208, and are separated by intrinsic transmission layer material 1232.

Figure 13A:
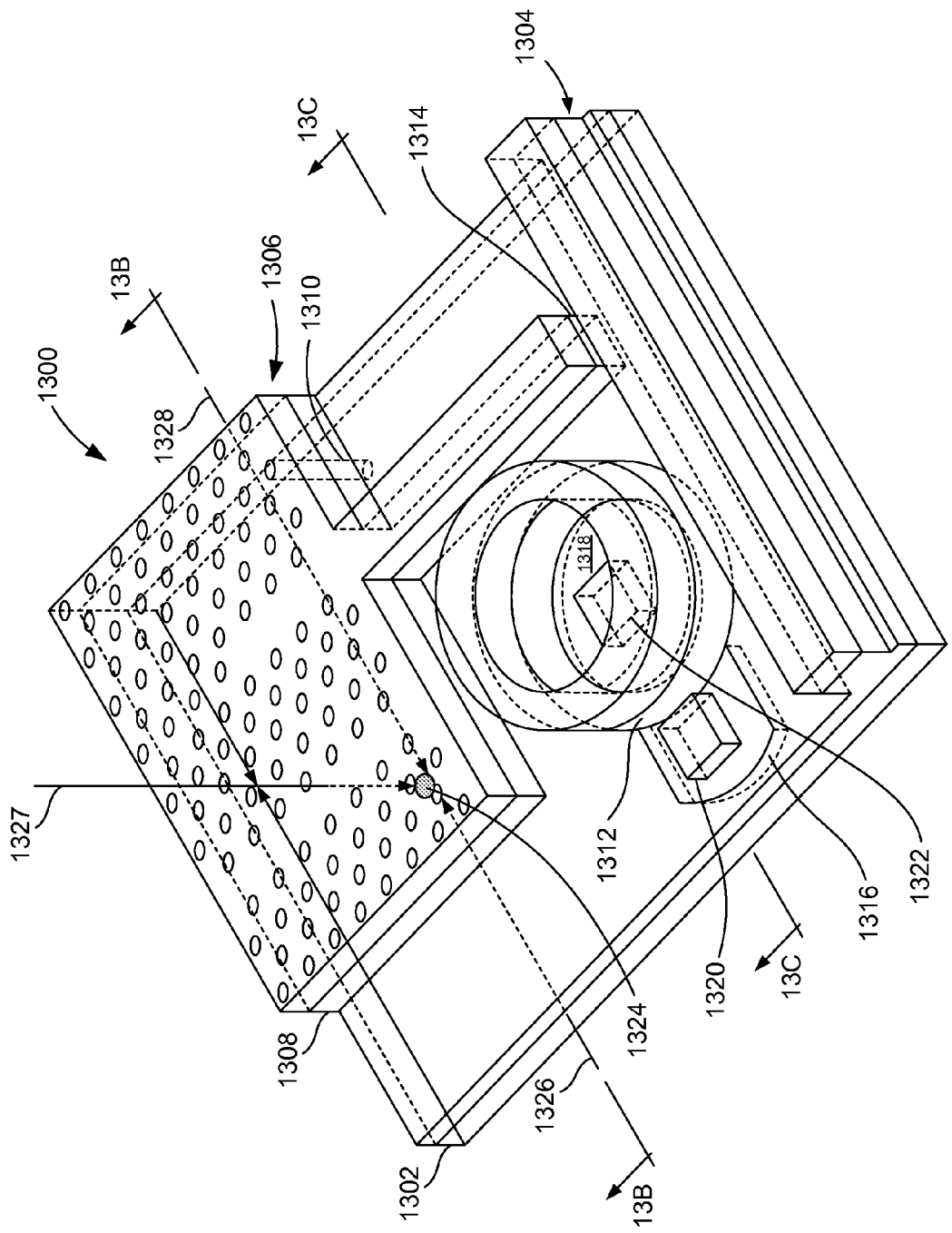
FIG. 13A illustrates a perspective-view of a photonic-chip node of the photonic chip shown in FIG. 11 that represents a second materials and node-configuration embodiment of the present invention.

In a second materials and node-configuration embodiment of the present invention, a photonic chip comprises a bottom diamond layer, an intermediate transmission layer comprising a II-VI, a III-V, a Group IV semiconductor, or a high refractive index dielectric, and a top $TiO_2$/SiN layer. The top TiO$_2$/SiN layer has about the same index of refraction as the bottom diamond layer. FIG. 13A illustrates a perspective-view of a photonic-chip node 1300 that represents the second materials and node-configuration embodiment of the present invention. The node 1300 comprises a bottom diamond layer 1302, a transmission layer 1304, and a top TiO$_2$/SiN layer 1306. The node-photonic devices are patterned into both the transmission layer 1304 and the top TiO$_2$/SiN layer 1306, and the cylindrical holes comprising a photonic crystal 1308 are patterned in all three layers, as indicated by a hole 1310. The photonic devices patterned in the transmission layer 1304 transmit electromagnetic waves, as described above with reference to FIG. 11, and the bottom diamond layer 1302 and the top TiO$_2$/SiN layer layers serve as bottom and top cladding layers. The photonic devices patterned in the transmission layer 1304 include the photonic crystal 1308, a microring 1312, and a ridge waveguide 1314. The transmission layer 1304 also includes an n-region 1316 and a p-region 1318 that form a p-i-n junction, as described above with reference to FIG. 12. A first electrode 1320 is located on the top surface of the n-region 1316, and a second electrode 1322 is located on the top surface of the p-region 1318. A color center 1324 is embedded in the bottom diamond layer 1302 near the bottom surface of a resonant cavity (not shown) in the photonic crystal 1308, as indicated by directional arrows 1326-1328.

FIG. 13B illustrates a first cross-sectional view of the node 1300 that represents an embodiment of the present invention. As shown in FIG. 13B, the color center 1324 is located within the diamond layer 1302 and just below a resonant cavity 1330 in the photonic crystal 1308. The cylindrical holes defining the photonic crystal 1310 extend part way into the diamond layer 1302.

FIG. 13C illustrates a second cross-sectional view of the node 1300 that represents an embodiment of the present invention. As shown in FIG. 13C, the n-region 1316 and the p-region 1318 penetrate the transmission layer 1304 and are separated by intrinsic transmission 1332 material.

Figure 14A:
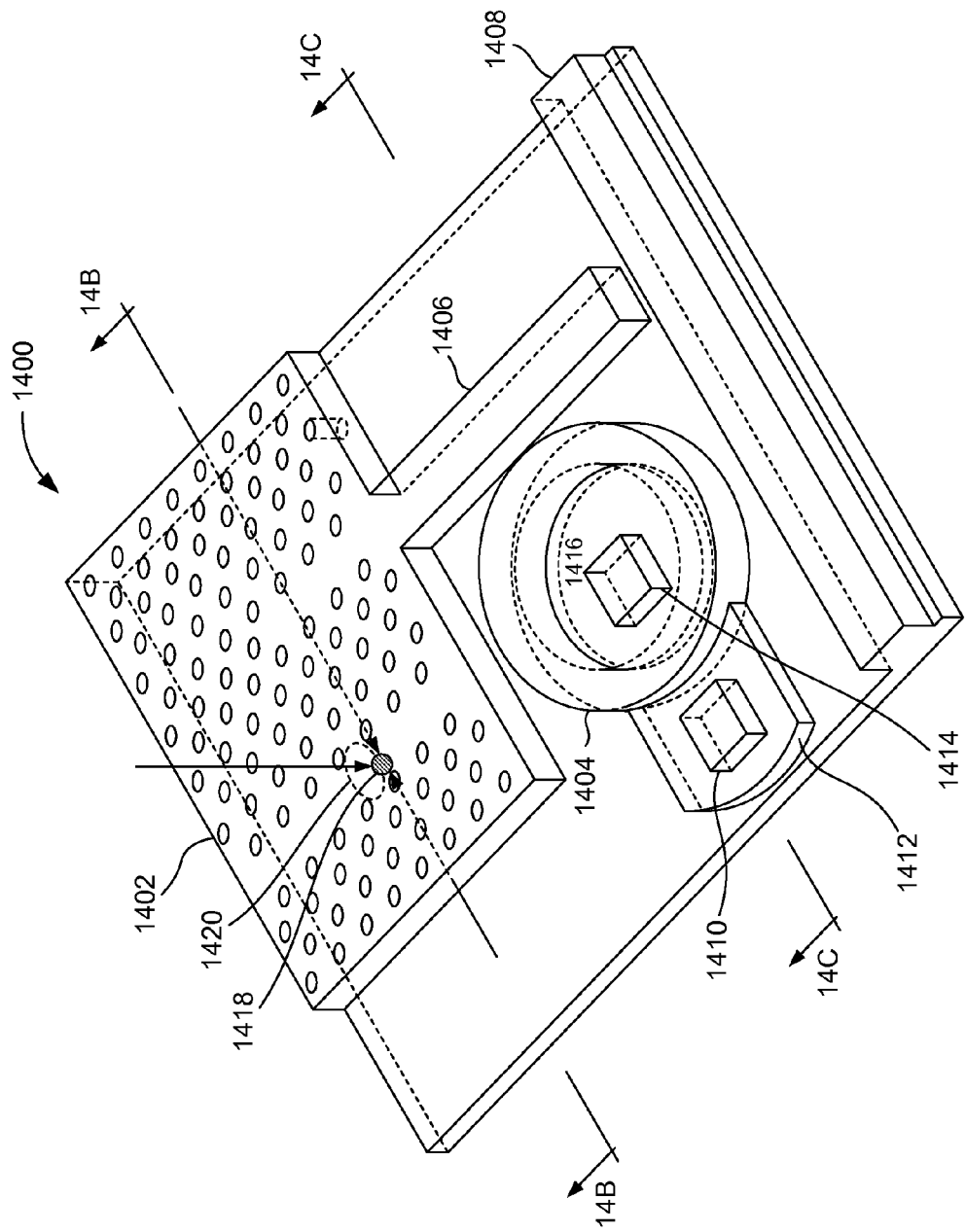
FIG. 14A illustrates a perspective-view of a photonic-chip node of the photonic chip shown in FIG. 11 that represents a third materials and node-configuration embodiment of the present invention.

In a third materials and node-configuration embodiment of the present invention, a photonic chip comprises photonic devices fabricated in a high-quality, single, bulk diamond layer. FIG. 14A illustrates a perspective-view of a photonic-chip node 1400 that represents the third materials and node-configuration embodiment of the present invention. The node 1400 comprises a photonic crystal 1402, a microring 1404, and a ridge waveguide 1406. The photonic crystal 1402, the microring 1404, the ridge waveguide 1406 and an adjacent bus waveguide 1408 are created in a single diamond layer. The node 1400 switch comprises a first electrode 1410 located on the top surface of negatively doped, electro-optic material 1412 and a second electrode 1414 located on the top surface of positively doped, electro-optic material 1416. A color center 1418 is embedded in a resonant cavity 1420 near the top surface of the photonic crystal 1402.

FIG. 14B illustrates a first cross-sectional view of the node 1400 that represents an embodiment of the present invention. The color center 1418 is embedded in the resonant cavity 1420 of the photonic crystal 1402.

FIG. 14C illustrates a second cross-sectional view of the node 1400 that represents an embodiment of the present invention. As shown in FIG. 14C, the n-region 1412 and the p-regions 1414 are located on the top surface of the node 1400 and are separated by a portion of the mirroring 1404 in order to form a p-i-n junction.

Figure 15:
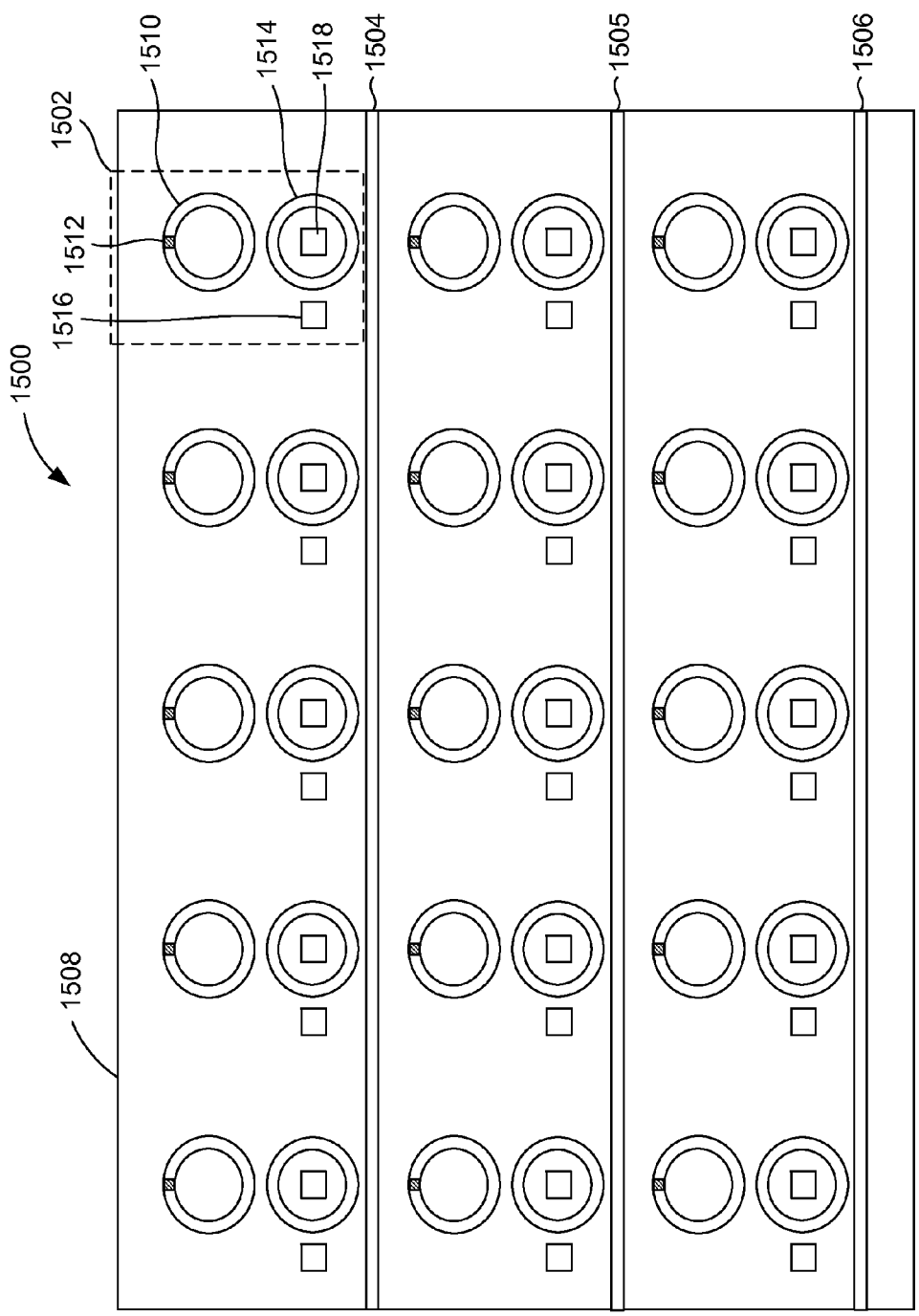
FIG. 15 illustrates an example of a second color-center based photonic chip that represents an embodiment of the present invention.

FIG. 15 illustrates an example of a second color-center based photonic chip 1500 that represents an embodiment of the present invention. The photonic chip 1500 comprises a photonic network of 15 identically configured nodes, such as node 1502, and 3 bus ridge waveguides 1504-1506 that are located on the top surface of a substrate 1508. The node 1502 comprises a first microring 1510 coupled to a color center 1512, and a second microring 1514. The second microring 1514 is coupled to a first electrode 1516 and a second electrode 1518. The color centers of each node can be atomic-vacancy centers, such as the NV center described above with reference to FIG. 1C, a Ni vacancy center, or a Si vacancy center.

The photonic chip 1500 is an example of a quantum computing architecture that can be operated as a processor, memory array, or any other device for quantum computing, quantum information processing, and storing quantum information. In particular, each color center can be used to store a quantum bit of information. The waveguides 1504-1506 transmit information encoded in electromagnetic waves to, and from, the nodes and can be separately coupled to optical fiber input/output couplers (not shown). Electrical signal lines (not shown) are in electrical contact with the electrodes and can extend perpendicular to the substrate 1508 surface.

At each node, an electromagnetic wave is transmitted between a bus waveguide and the second microring via evanescent coupling. For example, an electromagnetic wave transmitted along the bus waveguide 1504 can be transmitted by evanescent coupling to the second microring 1514. The electromagnetic wave resonates in the second microring 1514 and can again be transmitted by evanescent coupling to the first microring 1510. When the energy of the electromagnetic wave is large enough, the color center may absorb the energy by undergoing an electronic state change, as described above with reference to FIG. 1C. Also, when the color center 1512 undergoes an electronic state transition, emitted electromagnetic radiation can be transmitted via evanescent coupling from the first microring 1510 to the second microring 1514 and from the second microring 1514 to the bus waveguide 1505.

The dimensions of the microrings of each node can be varied and/or be patterned with holes of different arrangements and sizes so that the microrings can maintain resonance of an electromagnetic wave with a particular wavelength. The second microring of each node can serve as a drop/add filter, as described above with reference to FIG. 11. The second microring and the first and second electrodes of each node comprise a switch that can be used to turn a node "on" or "off," as described above with reference to FIG. 11.

FIGS. 16-18 illustrate three additional node-configuration embodiments in accordance with the photonic chip 1500 described above with reference to FIG. 15, and correspond respectively to the three different materials embodiments described above with respect to FIGS. 12-14.

Figure 16A:
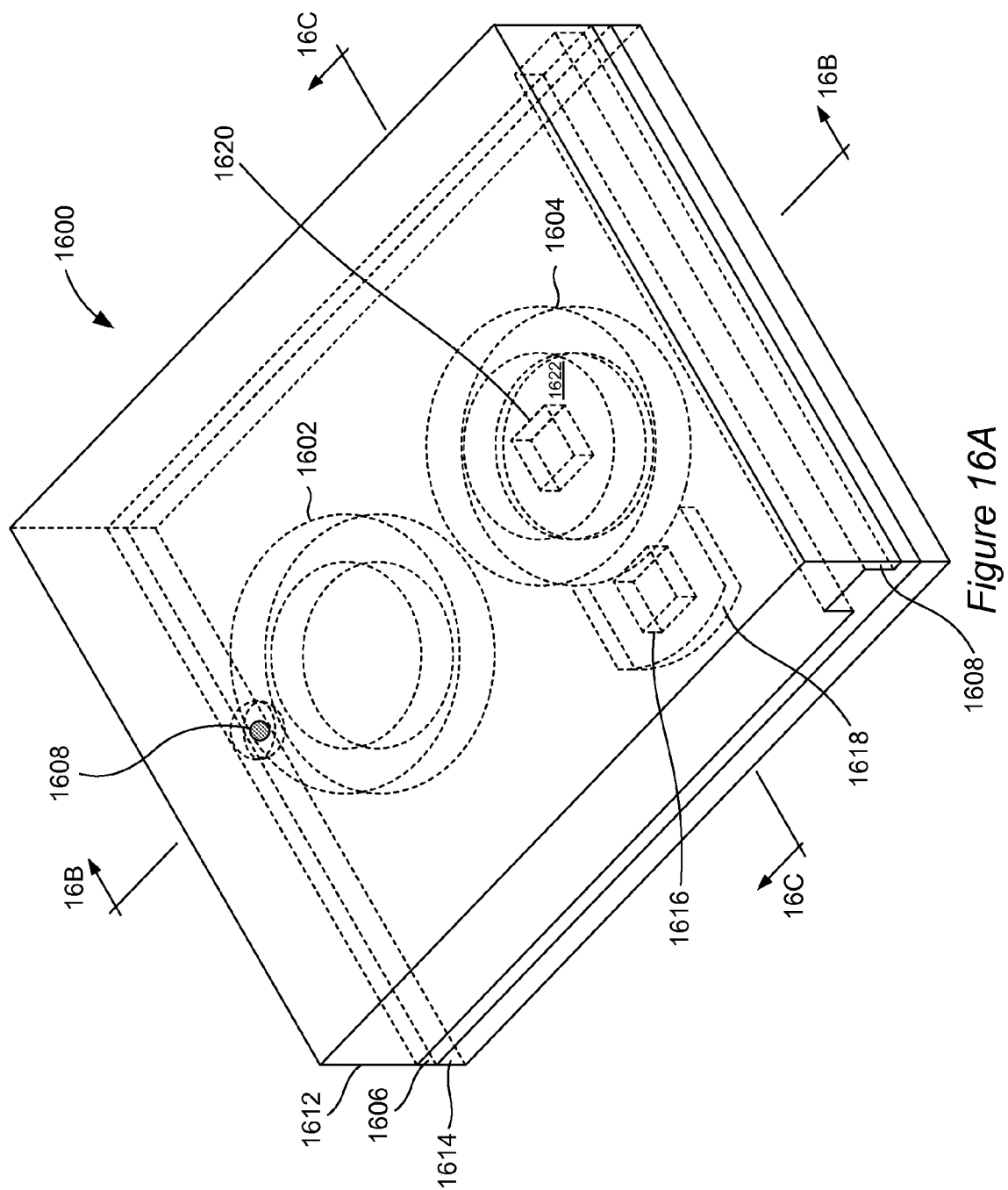
FIG. 16A illustrates a perspective-view of a photonic-chip node of the photonic chip shown in FIG. 15 that represents a fourth materials and node-configuration embodiment of the present invention.

In a fourth materials and node-configuration embodiment of the present invention, the photonic devices of the photonic chip 1500 are patterned into a transmission layer comprising a III-V, a II-VI, a Group IV semiconductor, or a high refractive index dielectric. The transmission layer is embedded between top and bottom cladding layers comprising a relatively lower refractive index material, such as silica. FIG. 16A illustrates a perspective-view of a photonic-chip node 1600 that represents the fourth materials and node-configuration embodiment of the present invention. The node 1600 comprises a first microring 1602 and a second microring 1604 patterned into a transmission layer 1606. The transmission layer 1606 also includes a bus waveguide 1608 that is adjacent to the second microring 1604. A color center 1608 is located on the top surface of the first microring 1602. The diamond layer 1610 and the transmission layer 1606 are embedded between a top cladding layer 1612 and a bottom cladding layer 1614. The node 1600 also includes a first electrode 1616 located on the top surface of an n-region 1618, and a second electrode 1620 located on the top surface of a p-region 1622. The n-region 1618 and the p-region 1622 are separated by a portion of intrinsic transmission layer 1606 material to form a "p-i-n junction," as described above with reference to FIG. 12A.

FIG. 16B illustrates a first cross-sectional view of the node 1600 that represents an embodiment of the present invention. As shown in FIG. 16B, the color center 1608 is surrounded by a diamond layer 1610 and located on the top surface of the microring 1602. The top cladding layer 1612 covers the diamond layer 1610, and the bottom cladding layer 1614 supports the transmission layer 1606.

FIG. 16C illustrates a second cross-sectional view of the node 1600 that represents an embodiment of the present invention. As shown in FIG. 16C, the n-region 1618 and the p-region 1622 penetrate the transmission layer 1606, and are separated by intrinsic transmission layer material 1624.

Figure 17A:
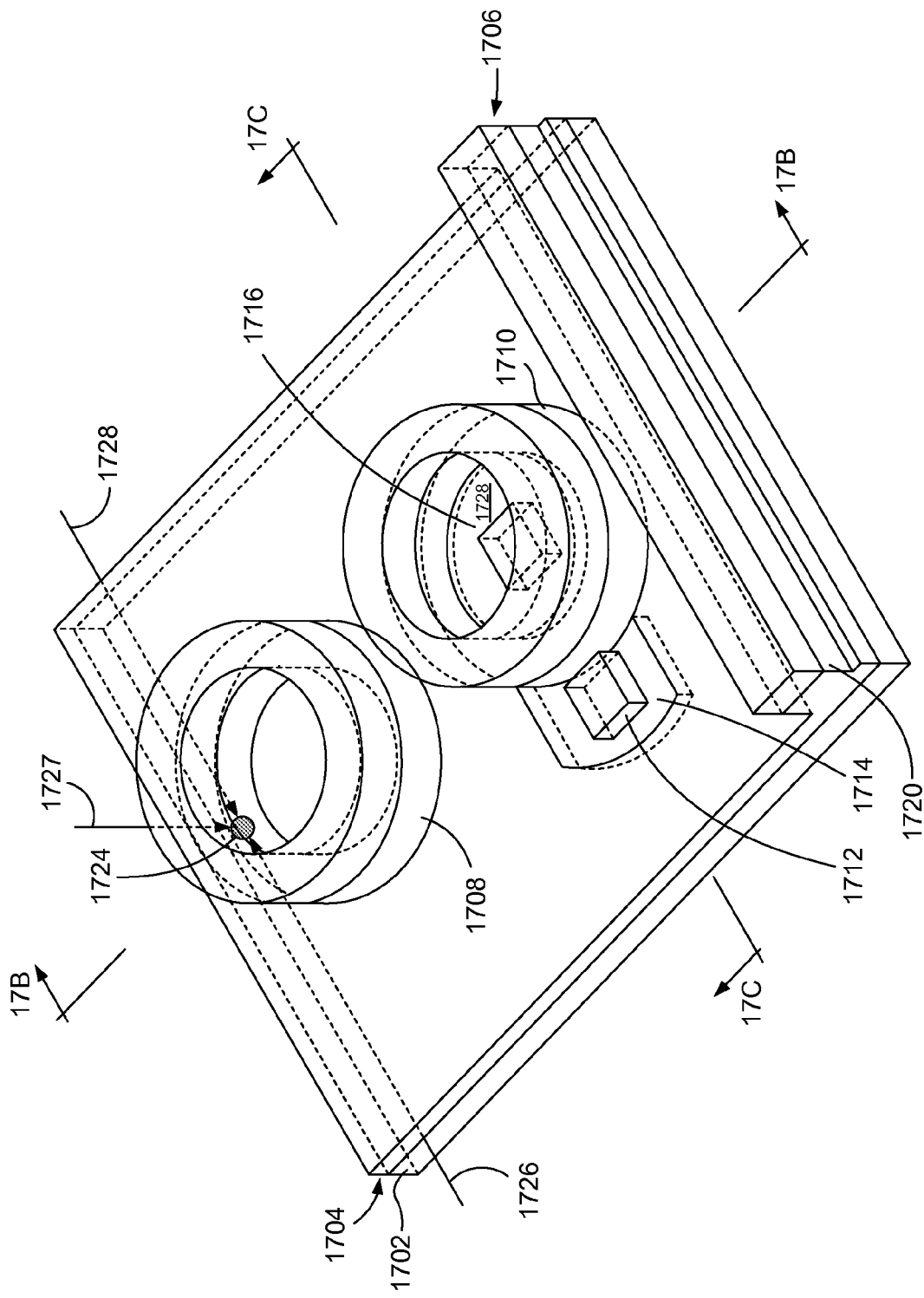
FIG. 17A illustrates a perspective-view of a photonic-chip node of the photonic chip shown in FIG. 15 that represents a fifth materials and node-configuration embodiment of the present invention.

In a fifth materials and node-configuration embodiment of the present invention, a photonic chip 1500 comprises a bottom diamond layer, an intermediate transmission layer comprising a II-VI, a III-V, a Group IV semiconductor, or a high refractive index dielectric, and a top TiO$_2$/SiN layer. The top TiO$_2$/SiN layer has about the same index of refraction as the bottom diamond layer. FIG. 17A illustrates a perspective-view of a photonic-chip node 1700 that represents the fifth materials and node-configuration embodiment of the present invention. The node 1700 comprises a bottom diamond layer 1702, a transmission layer 1704, and a top TiO$_2$/SiN layer 1706. The node-photonic devices are patterned into both the transmission layer 1304 and the top TiO$_2$/SiN layer 1706. A first microring 1708 and a second microring 1710 are node-photonic devices patterned in the transmission layer 1704 and transmit electromagnetic waves, as described above with reference to FIG. 11. The transmission layer 1704 also includes an adjacent bus waveguide 1720. The diamond layer 1702 and the top TiO$_2$/SiN layer 1706 serve as cladding layers for the photonic devices. Note that the top TiO$_2$/SiN layer 1706 is patterned in the shape of the photonic devices. The node 1700 includes a first electrode 1712 located on the top surface of an n-region 1714 and a second electrode 1716 located on the top surface of a p-region 1718. A color center 1724 is embedded near the top surface of the diamond layer 1302 and just below the first microring 1708, as indicated by directional arrows 1726-1728.

Figure 17B:
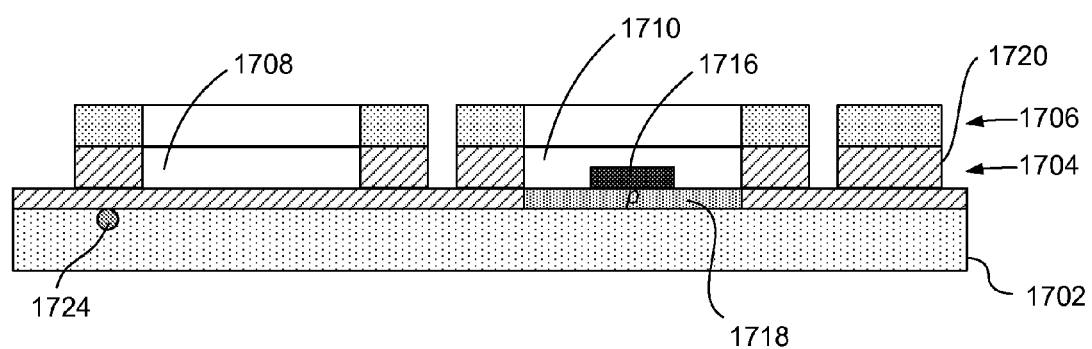
FIG. 17B illustrates a first cross-sectional view of the photonic-chip node shown in FIG. 17A that represents an embodiment of the present invention.

FIG. 17B illustrates a first cross-sectional view of the node 1700 that represents an embodiment of the present invention. As shown in FIG. 17B, the color center 1724 is located within the diamond layer 1702 just below the first microring 1708.

Figure 17C:
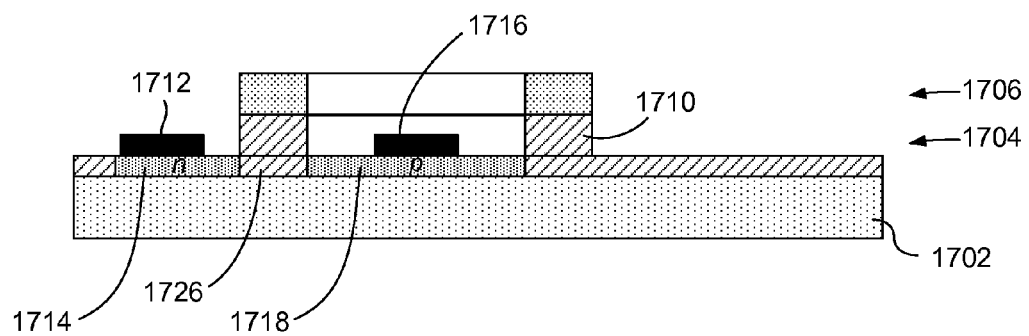
FIG. 17C illustrates a second cross-sectional view of the photonic-chip node shown in FIG. 17A that represents an embodiment of the present invention.

FIG. 17C illustrates a second cross-sectional view of the node 1700 that represents an embodiment of the present invention. In FIG. 17C, a p-i-n junction comprises the n-region 1714 and the p-region 1716 that both penetrate the transmission layer 1704 and are separated by intrinsic transmission layer material 1726.

Figure 18A:
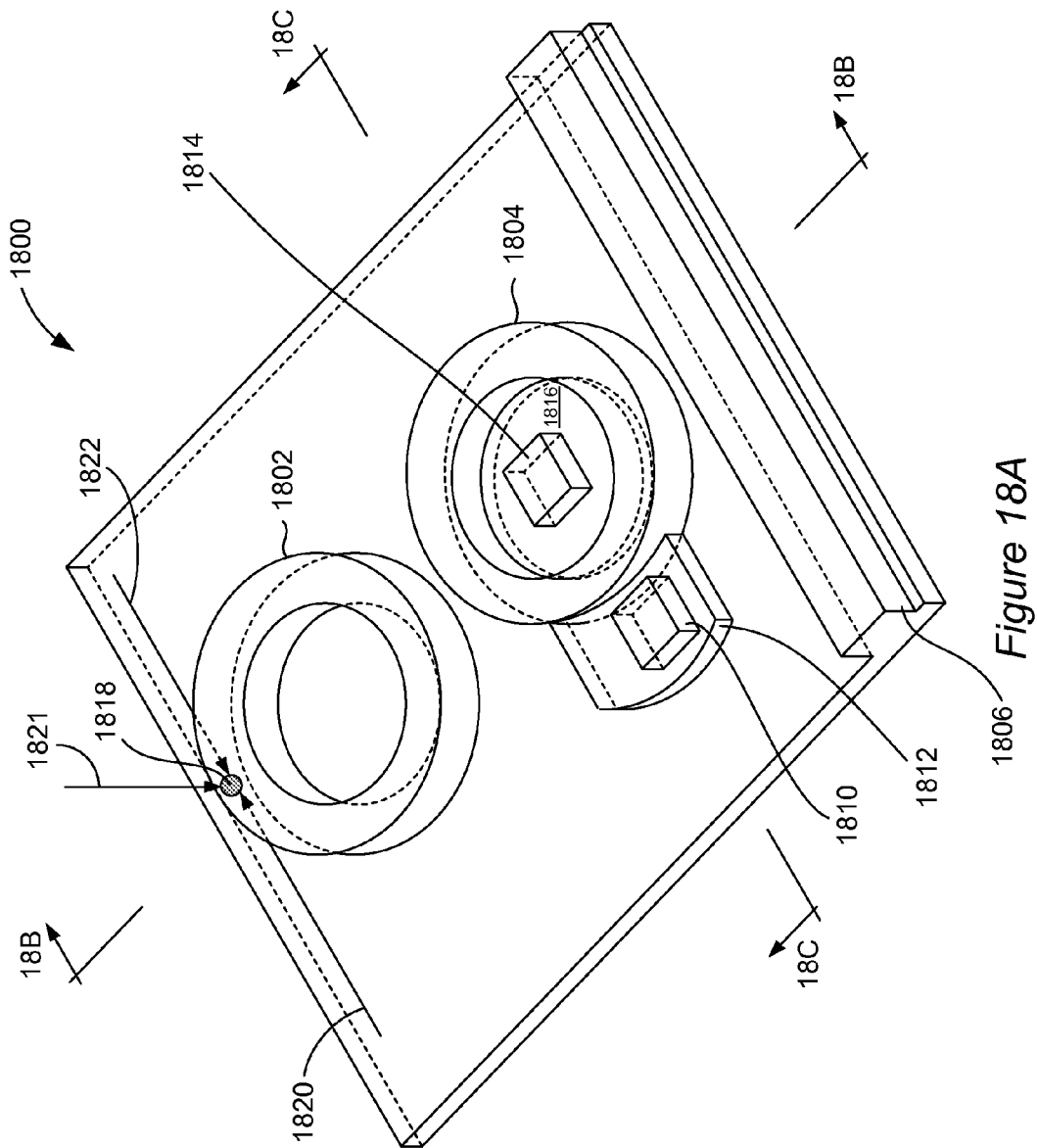
FIG. 18A illustrates a perspective-view of a photonic-chip node of the photonic chip shown in FIG. 15 that represents a sixth materials and node-configuration embodiment of the present invention.

In a sixth materials and node-configuration embodiment of the present invention, a photonic chip comprises photonic devices created in a high-quality, single, bulk diamond layer. FIG. 18A illustrates a perspective-view of a photonic-chip node 1800 that represents the sixth materials and node-configuration embodiment of the present invention. The node 1800 comprises a first microring 1802 and a second microring 1804. The first microring 1802 the second microring 1804, and an adjacent bus waveguide 1806 are created in a single diamond layer and service as photonic devices for transmitting electromagnetic waves. The node 1800 includes a switch comprising a first electrode 1810 located the top surface of a negatively doped, electro-optic material 1812 and a second electrode 1814 located on the top surface of positively doped, electro-optic material 1816. A color center 1418 is embedded near the top surface of the first microring 1802, as indicated by directional arrows 1820-1822.

Figure 18B:
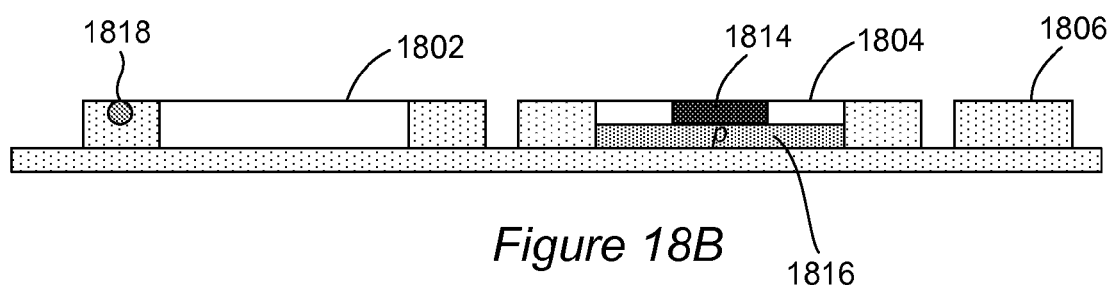
FIG. 18B illustrates a first cross-sectional view of the photonic chip node shown in FIG. 18A that represents an embodiment of the present invention.

FIG. 18B illustrates a first cross-sectional view of the node 1800 that represents an embodiment of the present invention. The color center 1818 is embedded near the top surface of the first microring 1802.

Figure 18C:
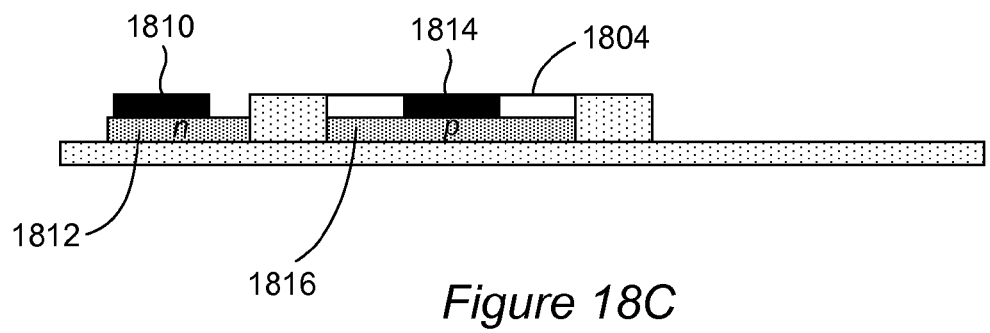
FIG. 18C illustrates a second cross-sectional view of the photonic chip node shown in FIG. 18A that represents an embodiment of the present invention.

FIG. 18C illustrates a second cross-sectional view of the node 1800 that represents an embodiment of the present invention. As shown in FIG. 18C, the n-region 1812 and the p-region 1816 are located on the top surface of the node 1800 and are separated by a portion of the second mirroring 1804 in order to form a p-i-n junction.

Note that the node-configuration embodiments of the present invention described above with reference to FIGS. 11-18 are not limited to locating the p-junctions within the microrings and locating the n-regions outside the microrings. In alternate embodiments of the present invention, the location of the n- and p-regions can be switched. In other words, the n-regions can be located within the openings of the microrings and the p-regions can be located outside the microrings.

A first method embodiment for fabricating color-center-based quantum computer architectures is described below with reference to FIGS. 19-23 and can be used to fabricate color-centers-based quantum computer architectures, as described above with reference to FIGS. 12 and 16. The first fabrication-method embodiment is described below with reference to fabricating the photonic-chip node 1200 described above with reference to FIG. 12.

Figure 19A:
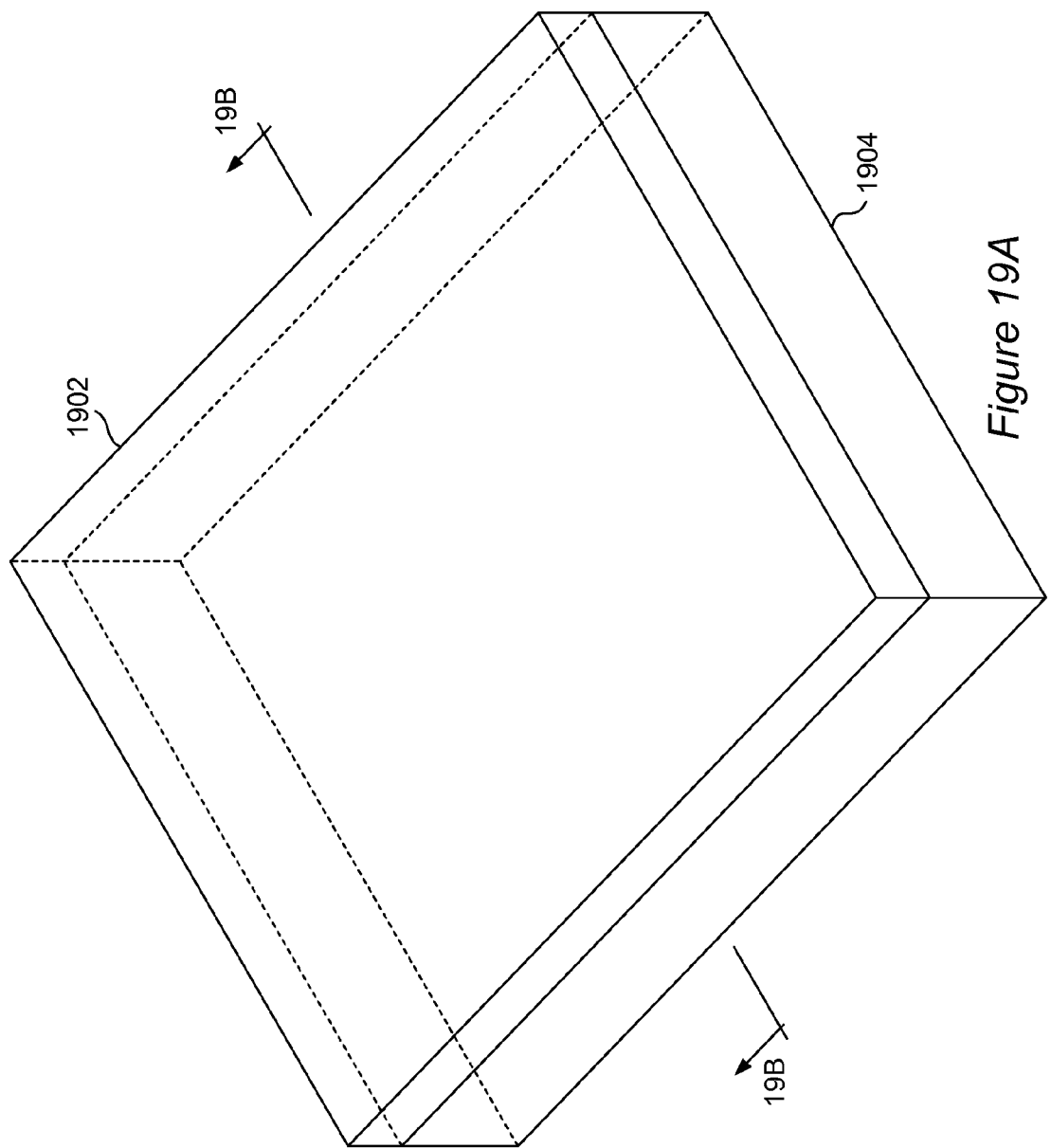
FIG. 19A illustrates a perspective view of a transmission layer deposited on the top surface of a substrate that represents an embodiment of the present invention.
Figure 19B:
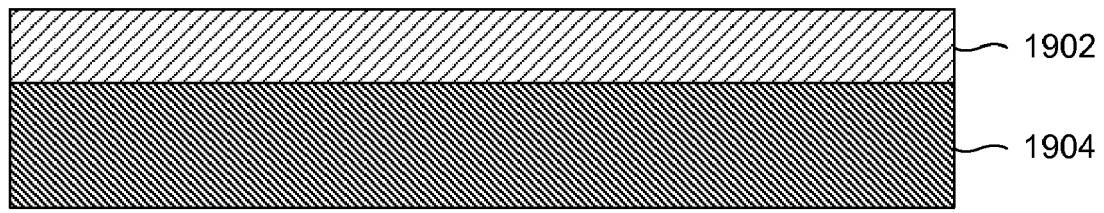
FIG. 19B illustrates a cross-sectional view of the transmission layer and the substrate shown in FIG. 19A that represents an embodiment of the present invention.

First, a transmission layer comprising a II-VI, a III-V, a Group IV semiconductor, or high refractive index dielectric material is deposited on the top surface of a substrate using either chemical vapor deposition ("CVD") or molecular beam epitaxy ("MBE"). CVD and MBE are well-known methods for depositing layers of materials in the art of fabricating microscale and nanoscale devices. FIG. 19A illustrates a perspective view of a transmission layer 1902 deposited on the top of a substrate 1904 that represents an embodiment of the present invention. FIG. 19B illustrates a cross-sectional view of the transmission layer 1902 deposited on the top surface of the substrate 1904 that represents an embodiment of the present invention.

Figure 20B:
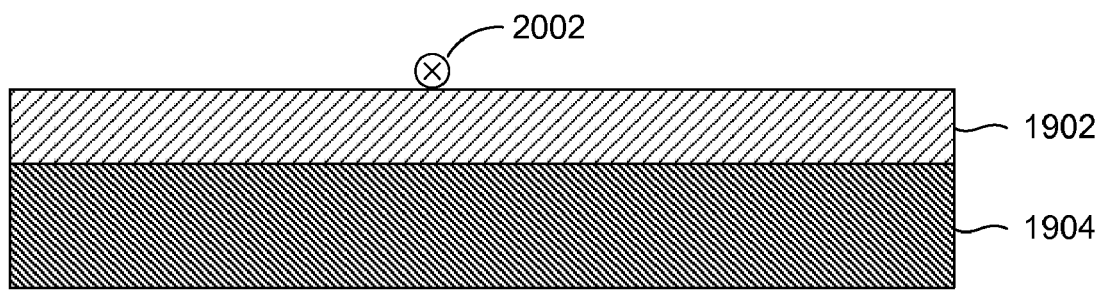
FIG. 20B illustrates a cross-sectional view of the color center and the transmission layer shown in FIG. 20A that represents an embodiment of the present invention.
Figure 20A:
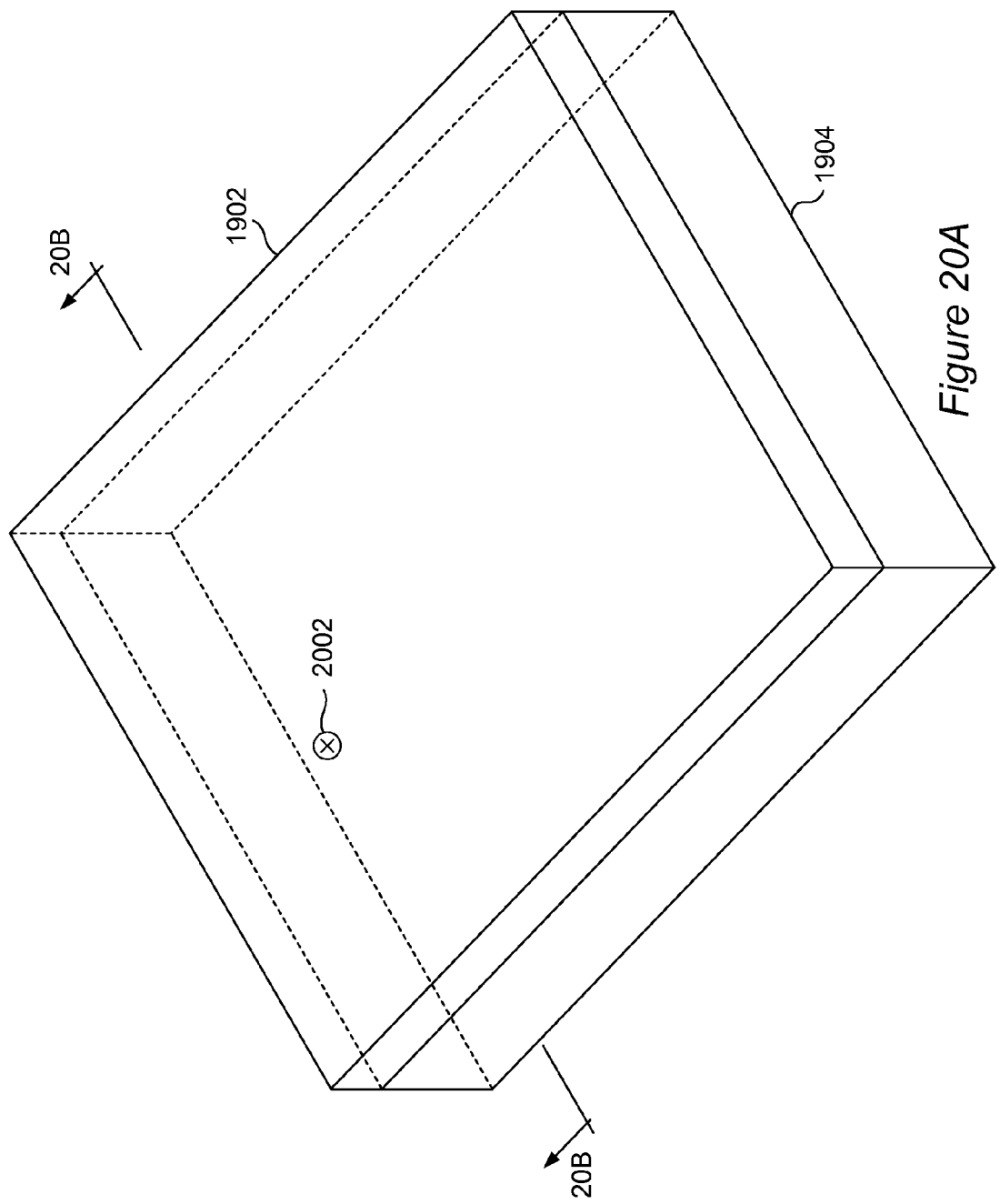
FIG. 20A illustrates a perspective view of a color center deposited at a specific location on the top surface of the transmission layer shown in FIG. 19 that represents and embodiment of the present invention.

Next, nucleation centers are deposited at specific locations on the transmission layer 1902 using semiconductor fabrication methods, such as lithography, evaporation, deposition, and liftoff. A nucleation center can be Ni, Pt, or a diamond seed crystal with or without color centers or another seed material. Lithography, evaporation, deposition, and liftoff are well-known methods for depositing atoms at specific locations on a surface of a substrate. FIG. 20A illustrates a perspective view of a nucleation center 2002 deposited at a specific location on the top surface of the transmission layer 1902, in FIG. 19, that represents an embodiment of the present invention. FIG. 20B illustrates a cross-sectional view of the nucleation center 2002 deposited on the top surface the transmission layer 1902 that represents an embodiment of the present invention.

Next, a network of high resolution (nm scale feature size) photonic devices, such as photonic crystals, microrings and ridge waveguides, can be patterned into the transmission layer using various well-know ion etching processes, lithographic etching, and/or nanoimprint lithography. For example, method embodiments of the present invention may employ one or more well-known ion etching processes, such as reactive ion etching, focused ion beam etching, and chemically assisted ion-beam etching, in order to pattern the photonic devices into the transmission layer. Methods of the present invention may also employ well-known photolithographic and/or electron beam ("e-beam") lithographic processes in order to pattern the photonic devices in the transmission layer. The photonic devices can also be fabricated on the nanoscale using nanoimprint lithography. Nanoimprint lithography is a high resolution lithography methods that involves first defining a master template of a pattern of microrings and waveguides that is transferred to transmission layer. Nanoimprint lithography can be used to achieve feature sizes as small as approximately 10 nm or less. See S. Y. Chou et al., *J. Vac. Sci. Technol. B* 15, 2897 (1997).

Figure 21A:
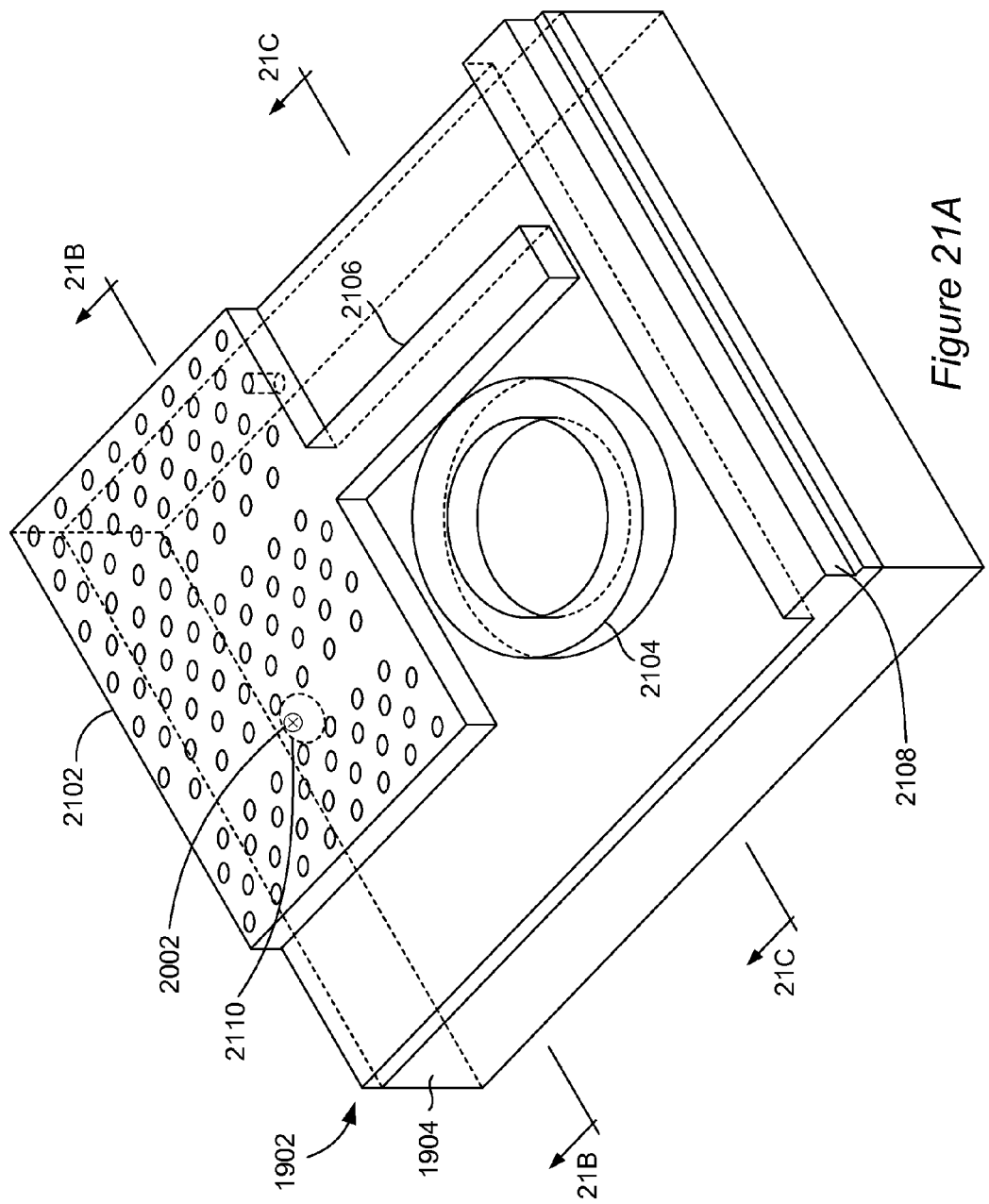
FIG. 21A illustrates a perspective view of a network of photonic devices patterned into the transmission layer shown in FIG. 20 that represents an embodiment of the present invention.
Figure 21B:
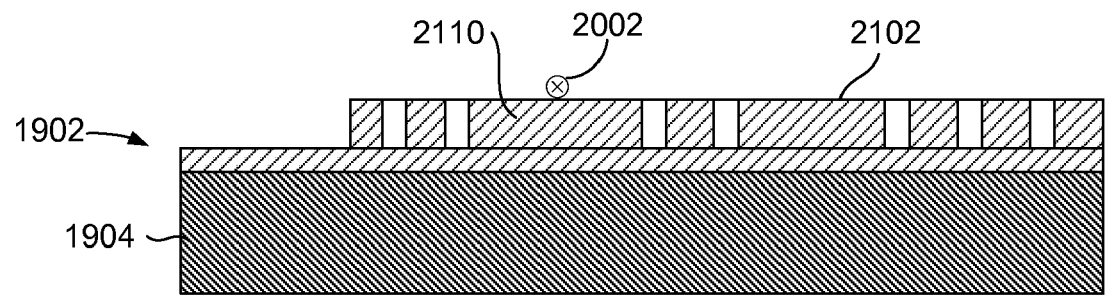
FIG. 21B illustrates a first cross-sectional view of the network of photonic devices shown in FIG. 21A that represents an embodiment of the present invention.
Figure 21C:
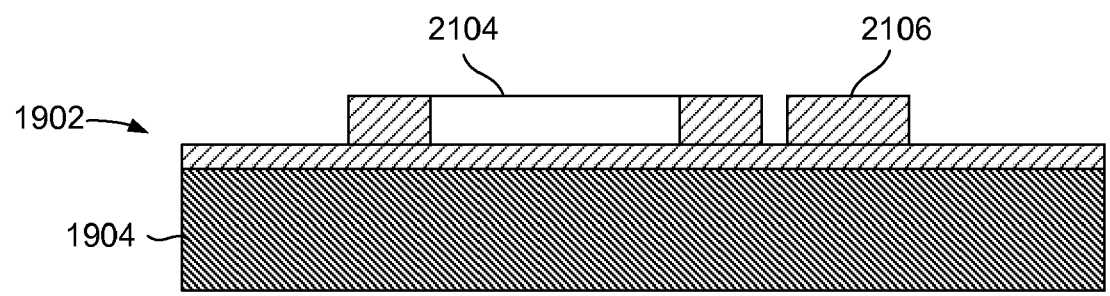
FIG. 21C illustrates a second cross-sectional view of the network of photonic devices shown in FIG. 21A that represents an embodiment of the present invention.

FIG. 21A illustrates a perspective view of a network of photonic devices patterned into the transmission layer 1902, in FIG. 19, that represents an embodiment of the present invention. As shown in FIG. 21A, the network of photonic devices comprises a photonic crystal 2102, a microring 2104, a ridge waveguide 2106, and a portion of bus waveguide 2108. The photonic crystal 2102, the microring 2104, and the ridge waveguide 2106 comprise are the photonic devices of a node, such as the node 1200 shown in FIG. 12. The nucleation center 2002 is located on the top surface of a resonant cavity 2110. The resonant cavity 2110 can be created by fabricating a number of cylindrical holes with diameters that are either smaller, or larger, than the cylindrical holes of the rest of the photonic crystal 2002. The resonant cavity 2110 can also be fabricated with cylindrical holes that are the same shape and size as the cylindrical holes comprising the rest of the photonic crystal 2002, but the locations of the holes defining the resonant cavity 2110 can be shifted, such as shifting the holes away from, or toward, the center of the resonant cavity. Note that the size, shape, and/or location of the holes used to fabricate resonant cavities in other photonic crystals of the quantum computer architecture can be varied in order to trap electromagnetic waves of particular wave lengths. FIG. 21B illustrates a first cross-sectional view of the network shown in FIG. 21A that represents an embodiment of the present invention. As shown in FIG. 21B, the nucleation center 2002 is located on the top surface of the resonant cavity 2110. FIG. 21C illustrates a second cross-sectional view of the network shown in FIG. 21A that represents an embodiment of the present invention.

Figure 22A:
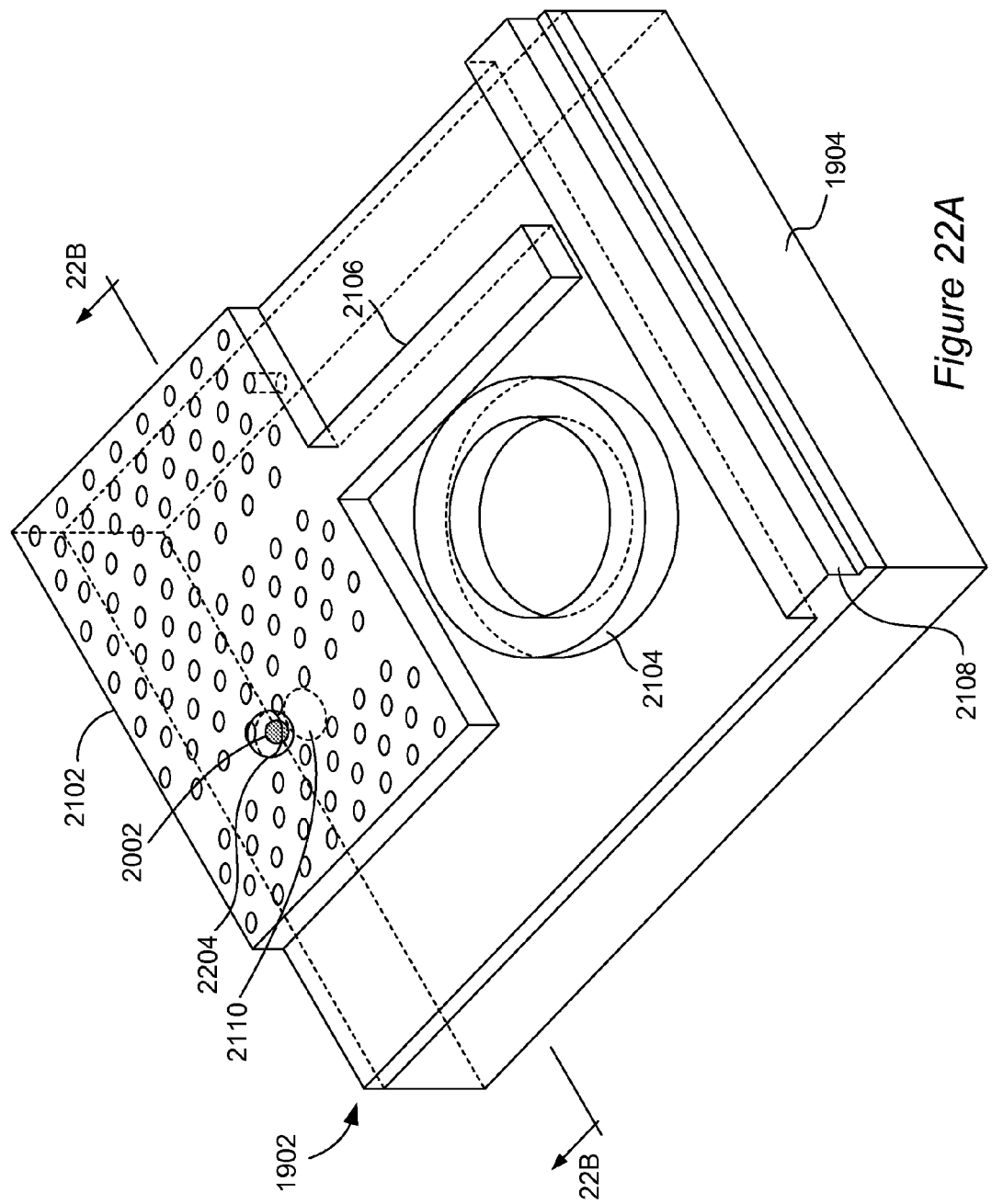
FIG. 22A illustrates a perspective view of a diamond layer surrounding the color center shown in FIG. 21 that represents an embodiment of the present invention.
Figure 22B:
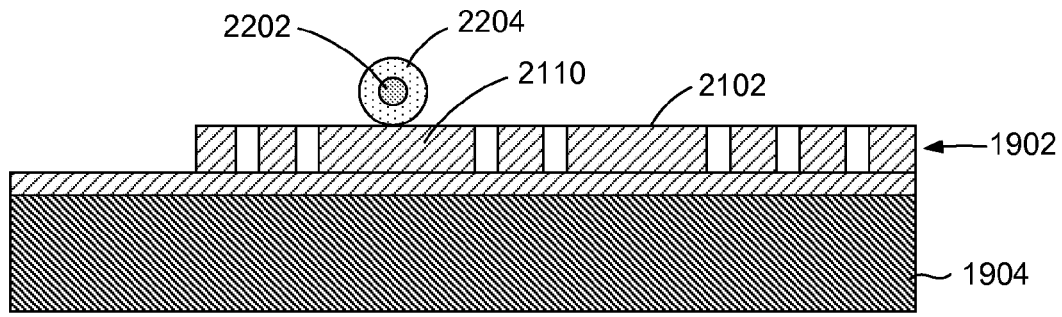
FIG. 22B illustrates a cross-sectional view of the diamond layer surrounding the color center shown in FIG. 22A that represents an embodiment of the present invention.

Next, CVD is used to grow color centers with a diamond layer on each nucleation center. FIG. 22A illustrates a perspective view of a color center 2202 and a diamond layer 2204 that represents an embodiment of the present invention. FIG. 22B illustrates a cross-sectional view of the color center 2202 and the diamond layer 2202 shown in FIG. 22A that represents an embodiment of the present invention.

Figure 23B:
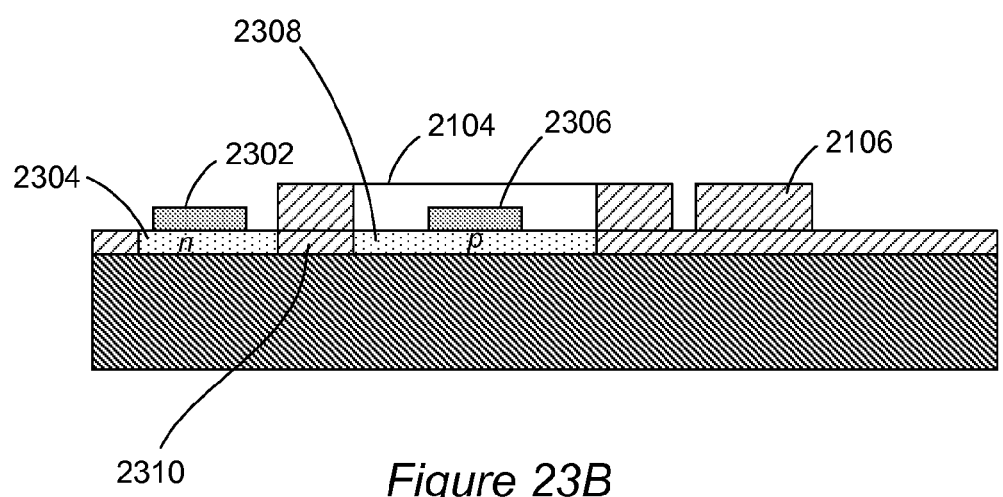
FIG. 23B illustrates a cross-sectional view of the switch shown in FIG. 23A that represents an embodiment of the present invention.
Figure 23A:
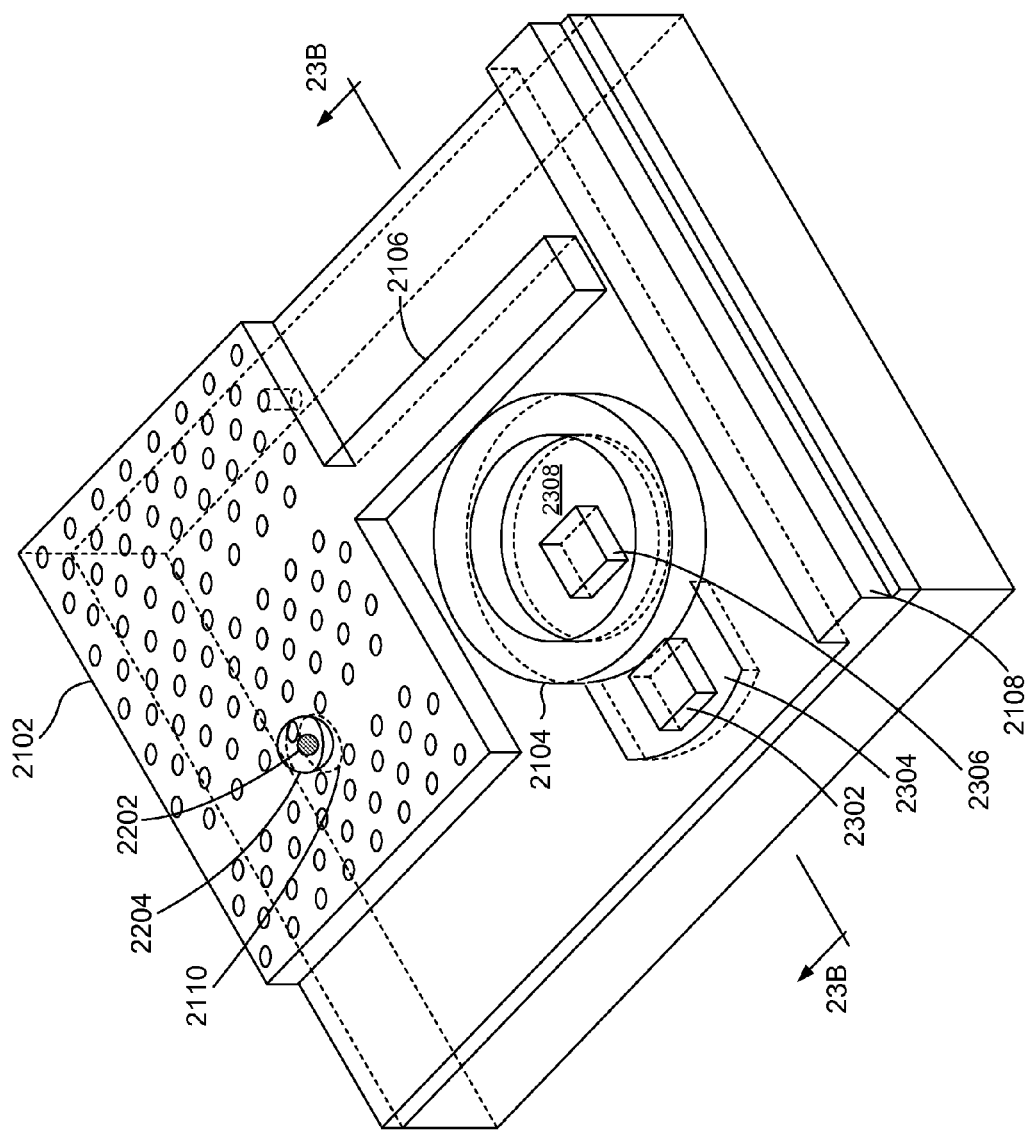
FIG. 23A illustrates a perspective view of a switch fabricated in the transmission layer shown in FIG. 22 that presents an embodiment of the present invention.

Next, using lithographic methods, a switch can be created at each photonic-chip node by implanting in the transmission layer 1902 electron donating atoms, such as P, to create an n-region and electron hole donating atoms, such as B, to create a p-region. Again, using lithography, the electrodes can be deposited on the top surfaces of the n- and p-regions. FIG. 23A illustrates a perspective view of a switch created in the patterned transmission layer shown in FIG. 22A that presents an embodiment of the present invention. The switch comprises a first electrode 2302 located the top surface of an n-region 2304, and a second electrode 2306 located on the top surface of an n-region 2308. FIG. 23B illustrates a cross-sectional view of the switch shown in FIG. 23A that represents an embodiment of the present invention. As shown in FIG. 23B, the n-region 2304, the p-region 2308, and intrinsic transmission layer material 2310 form a p-i-n junction.

Next, the patterned transmission layer with color centers are removed from the substrate in a well-known process called "lift off" and the transmission layer and color center are embedded between a bottom cladding layer and a top cladding layer using CVD. In alternate embodiments of the present invention, after the photonic network and color center have been fabricated, the top cladding layer can be deposited using CVD followed by lift off and then the bottom cladding layer can be deposited using CVD. In alternate embodiments of the present invention, before the transmission layer is patterned, the transmission layer and nucleation center can be transferred to the bottom cladding layer, and after the photonic network is patterned in the transmission layer, the top cladding layer is deposited. Methods for depositing the top and bottom cladding layers are well-known in the art.

A second method embodiment for fabricating color-center-based quantum computer architectures is described below with reference to FIGS. 19 and 25-29 and can also be used to fabricate color-centers-based quantum computer architectures described above with reference to FIGS. 12 and 16. The second fabrication-method embodiment is described below with reference to fabricating the photonic-chip node 1200 described above with reference to FIG. 12.

Figure 24A:
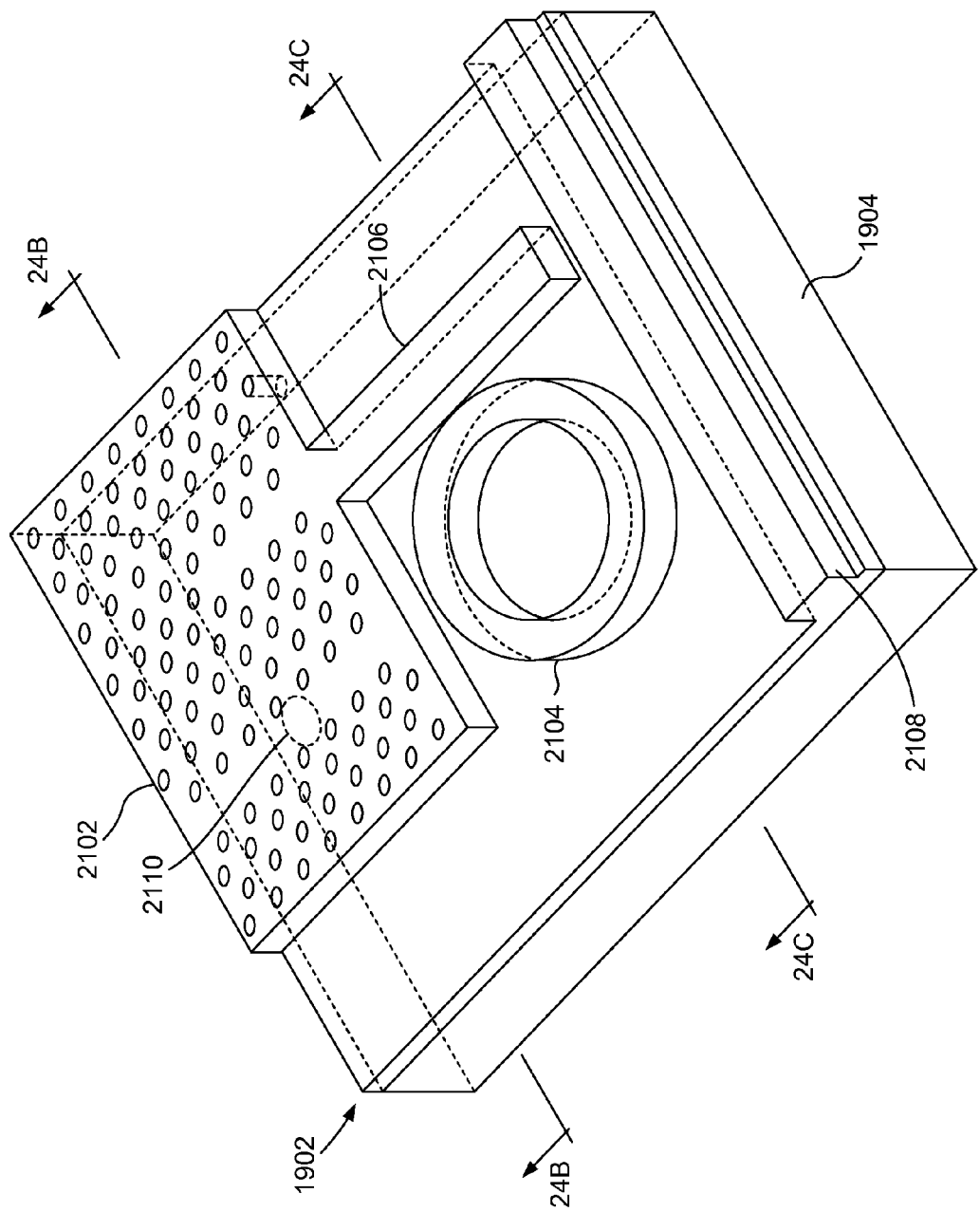
FIG. 24A illustrates a perspective view of a network of photonic devices patterned into the transmission layer shown in FIG. 19 that represents an embodiment of the present invention.
Figure 24B:
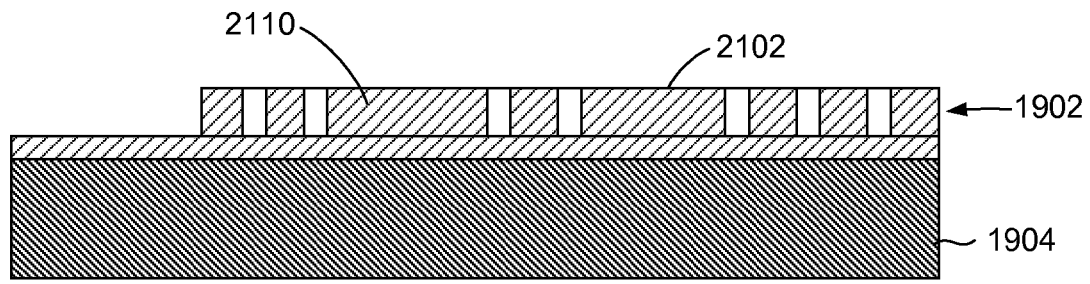
FIG. 24B illustrates a first cross-sectional view of the network of photonic devices shown in FIG. 24A that represents an embodiment of the present invention.
Figure 24C:
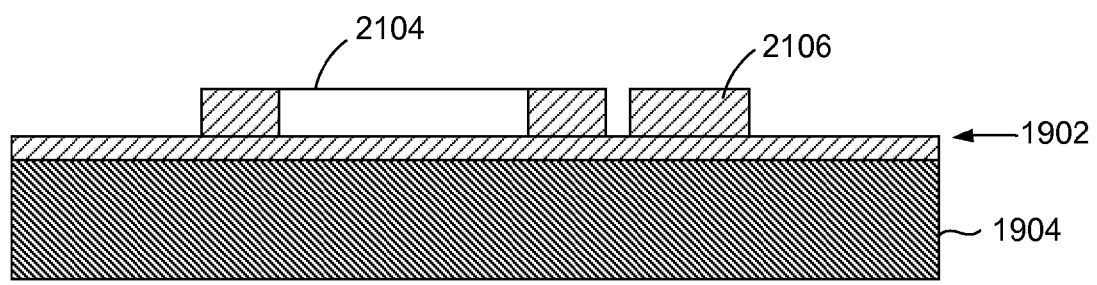
FIG. 24C illustrates a second cross-sectional view of the network of photonic devices shown in FIG. 24A that represents an embodiment of the present invention.

First, a transmission layer is deposited on the top surface of a substrate, as described above with reference to FIG. 19. Next, a network of photonic devices is patterned into the transmission layer using the various well-known ion etching, lithographic, and/or nanoimprint lithographic methods described above with reference to FIG. 21. FIG. 24A illustrates a perspective view of a network of photonic devices patterned into the transmission layer 1902, in FIG. 19, that represents an embodiment of the present invention. As shown in FIG. 24A, the network of photonic devices comprises the photonic crystal 2102, the microring 2104, the ridge waveguide 2106, and the portion of bus waveguide 2108, as described above with reference to FIG. 21, where the photonic crystal 2102, the microring 2104, and the ridge waveguide 2106 comprise the photonic devices of a node, such as the node 1200 shown in FIG. 12. The photonic crystal 2102 also includes a resonant cavity 2110 that can be created by fabricating cylindrical holes that are smaller, or larger, than the rest of the cylindrical holes created in the photonic crystal 2102. FIGS. 24B and 24C illustrate first and second cross-sectional views of the photonic network shown in FIG. 24A, respectively, that represents an embodiment of the present invention.

Figure 25A:
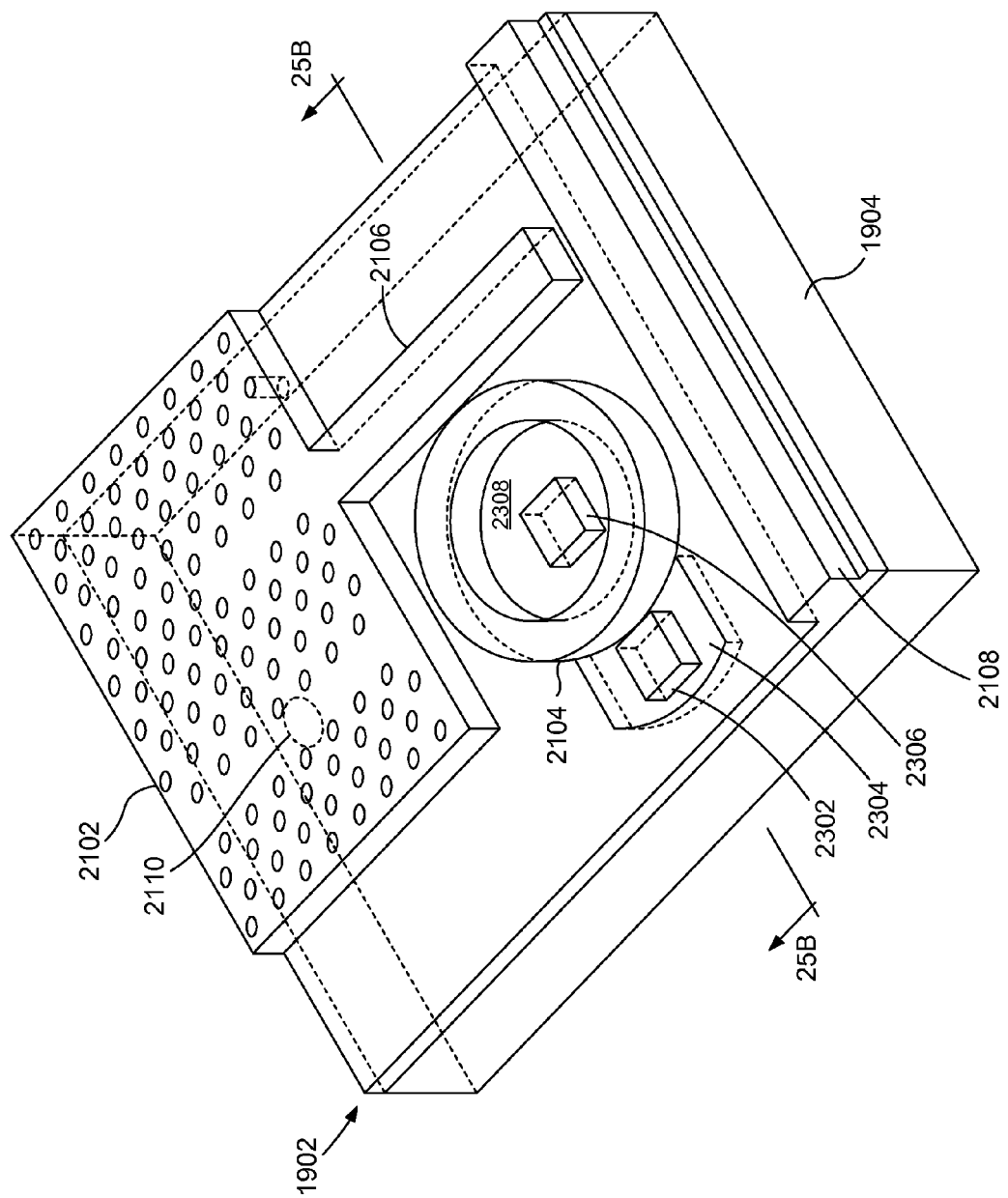
FIG. 25A illustrates a perspective view of a switch fabricated in the transmission layer shown in FIG. 24 that presents an embodiment of the present invention.
Figure 25B:
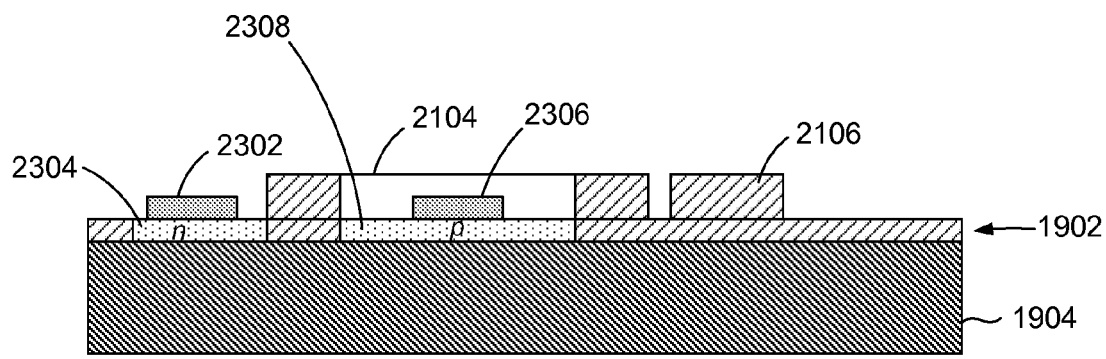
FIG. 25B illustrates a cross-sectional view of the switch shown in FIG. 25A that represents an embodiment of the present invention.

Next, a switch can be fabricated at each photonic-chip node by implanting in the transmission layer 1902 with electron donating atoms to create an n-region and implanting electron hole donating atoms to create a p-region, and the electrodes can be deposited on the top surfaces of the n- and p-regions lithography, as described above with reference to FIG. 23. FIG. 25A illustrates a perspective view of a switch fabricated in the patterned transmission layer shown in FIG. 24 that presents an embodiment of the present invention. The switch comprises a first electrode 2302 located the top surface of an n-region 2304, and a second electrode 2306 located on the top surface of an n-region 2308. FIG. 25B illustrates a cross-sectional view of the switch shown in FIG. 25A that represents an embodiment of the present invention.

Figure 26B:
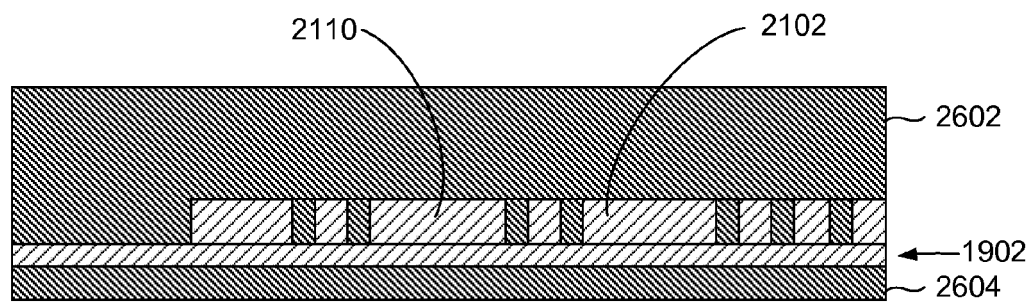
FIG. 26B illustrates a first cross-sectional view of the network of photonic devices shown in FIG. 26A that represents an embodiment of the present invention
Figure 26C:
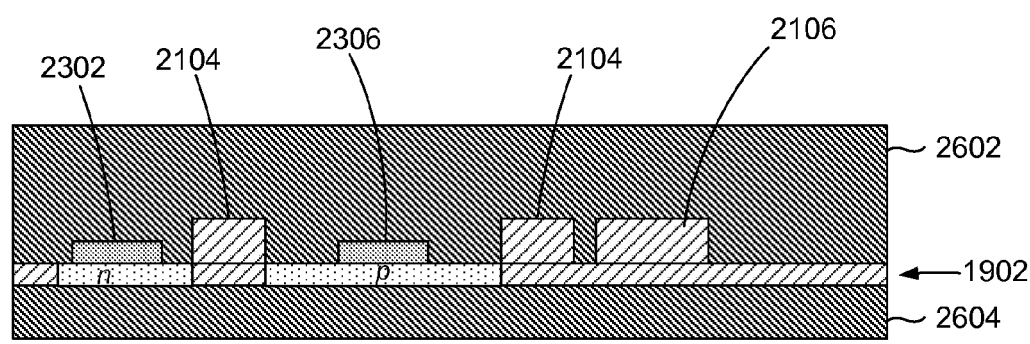
FIG. 26C illustrates a second cross-sectional view of the network of photonic devices shown in FIG. 26A that represents an embodiment of the present invention.
Figure 26A:
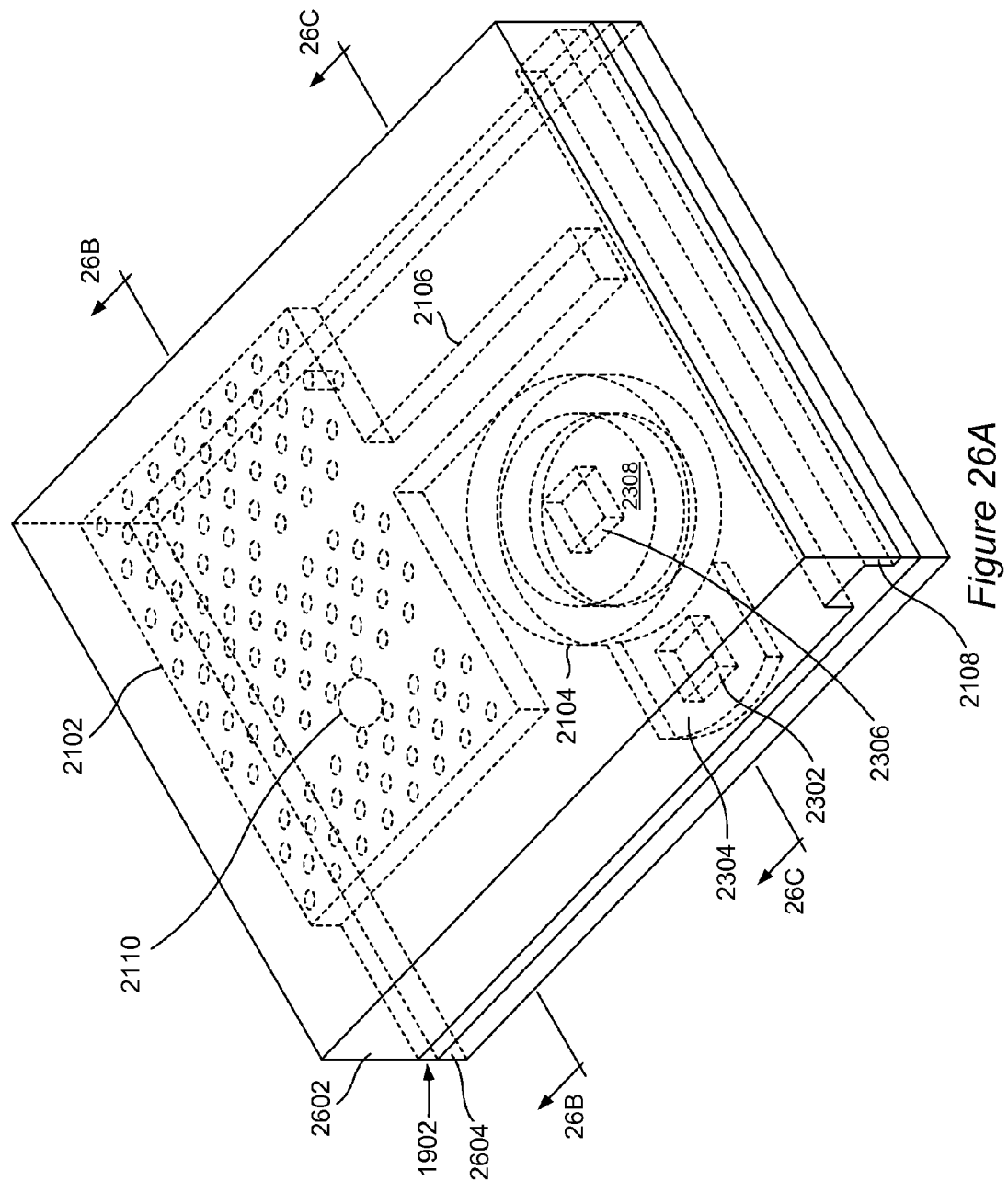
FIG. 26A illustrates a perspective view of the patterned transmission layer shown in FIG. 25 embedded between a top cladding layer and a bottom cladding layer that represents an embodiment of the present invention.

Next, the patterned transmission layer, shown in FIG. 25, is embedded between top and bottom cladding layers as described above with reference to FIG. 23. FIG. 26A illustrates a perspective view of the patterned transmission layer 1902, shown in FIG. 26, embedded between a top cladding layer 2602 and a bottom cladding layer 2604 that represents an embodiment of the present invention. FIGS. 26B and 26C illustrate first and second cross-sectional views of the network shown in FIG. 26A, respectively, that represents an embodiment of the present invention.

Figure 27A:
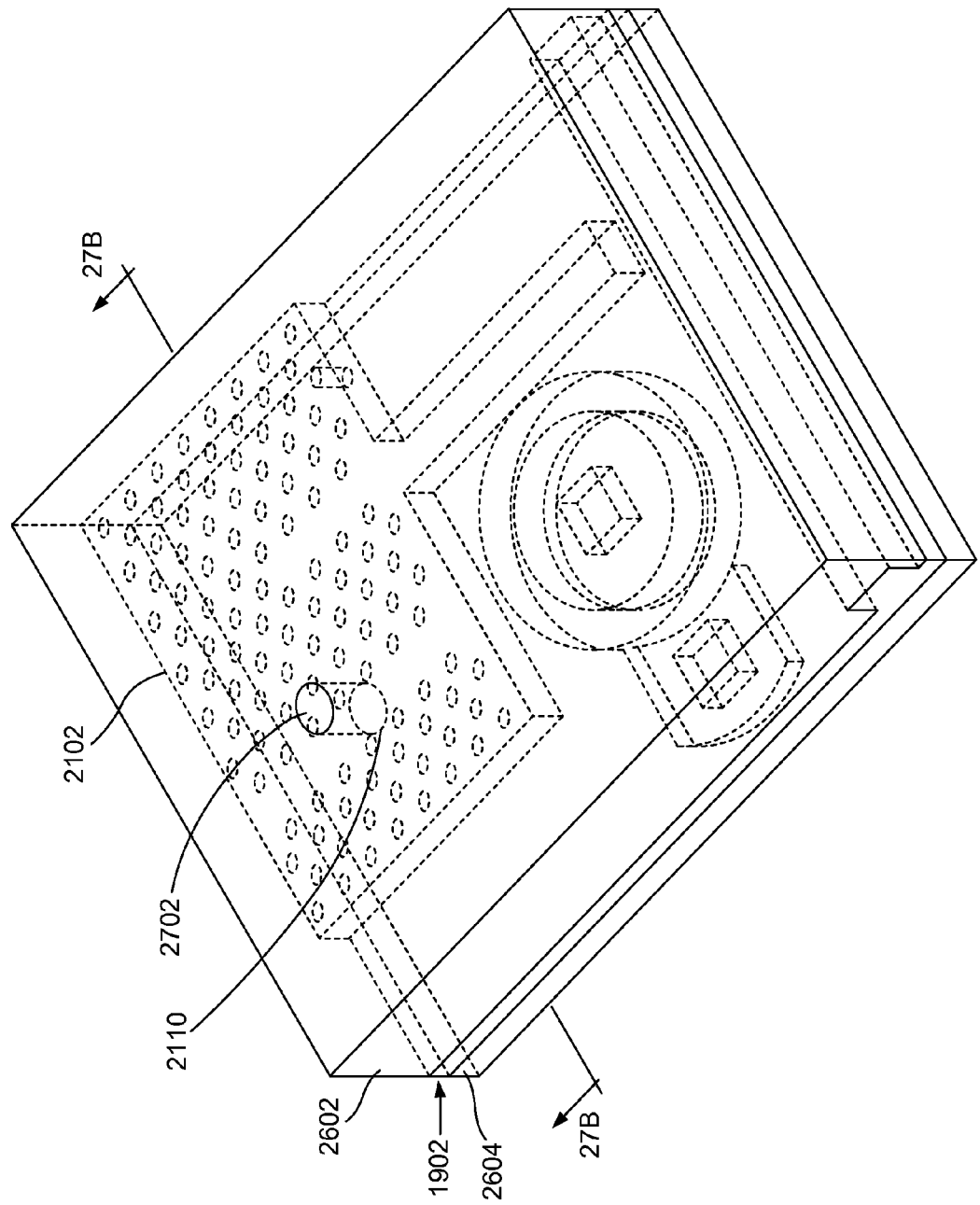
FIG. 27A illustrates a perspective view of a hole etched in the top cladding layer shown in FIG. 26 that represents an embodiment of the present invention.
Figure 27B:
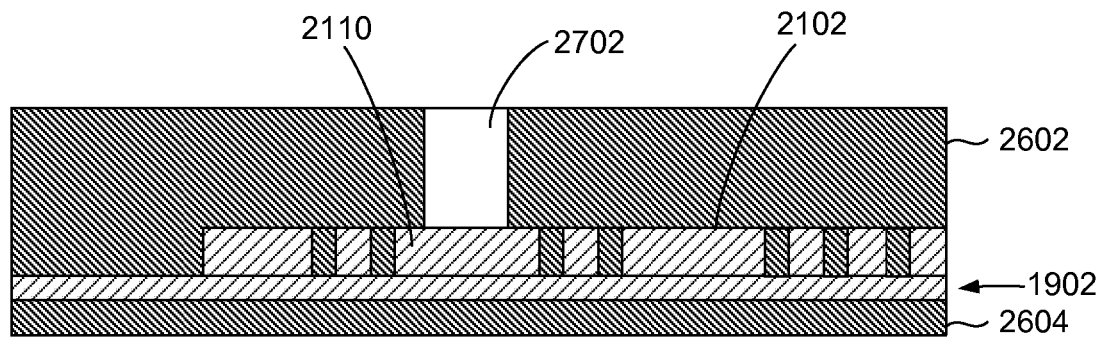
FIG. 27B illustrates a cross-sectional view of the hole shown in FIG. 27A that represents an embodiment of the present invention.

Next, holes are etched in the top cladding layer using various ion etching and/or lithographic methods. The holes expose a portion of a photonic device below. FIG. 27A illustrates a perspective view of a hole 2702 etched in the top cladding layer 2602 shown in FIG. 26 that represents an embodiment of the present invention. As shown in FIG. 27A, the hole 2702 exposes a portion of the top surface of the resonant cavity 2110. FIG. 27B illustrates a cross-sectional view of the hole 2702 in the top cladding layer shown in FIG. 27A that represents an embodiment of the present invention.

Figure 28B:
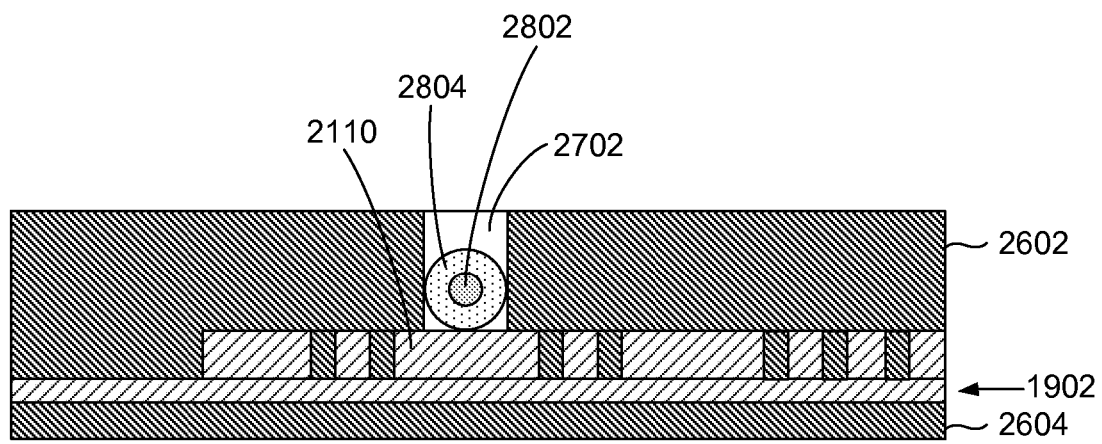
FIG. 28B illustrates a cross-sectional view of the color center with the diamond layer shown in FIG. 28A that represents an embodiment of the present invention.
Figure 28A:
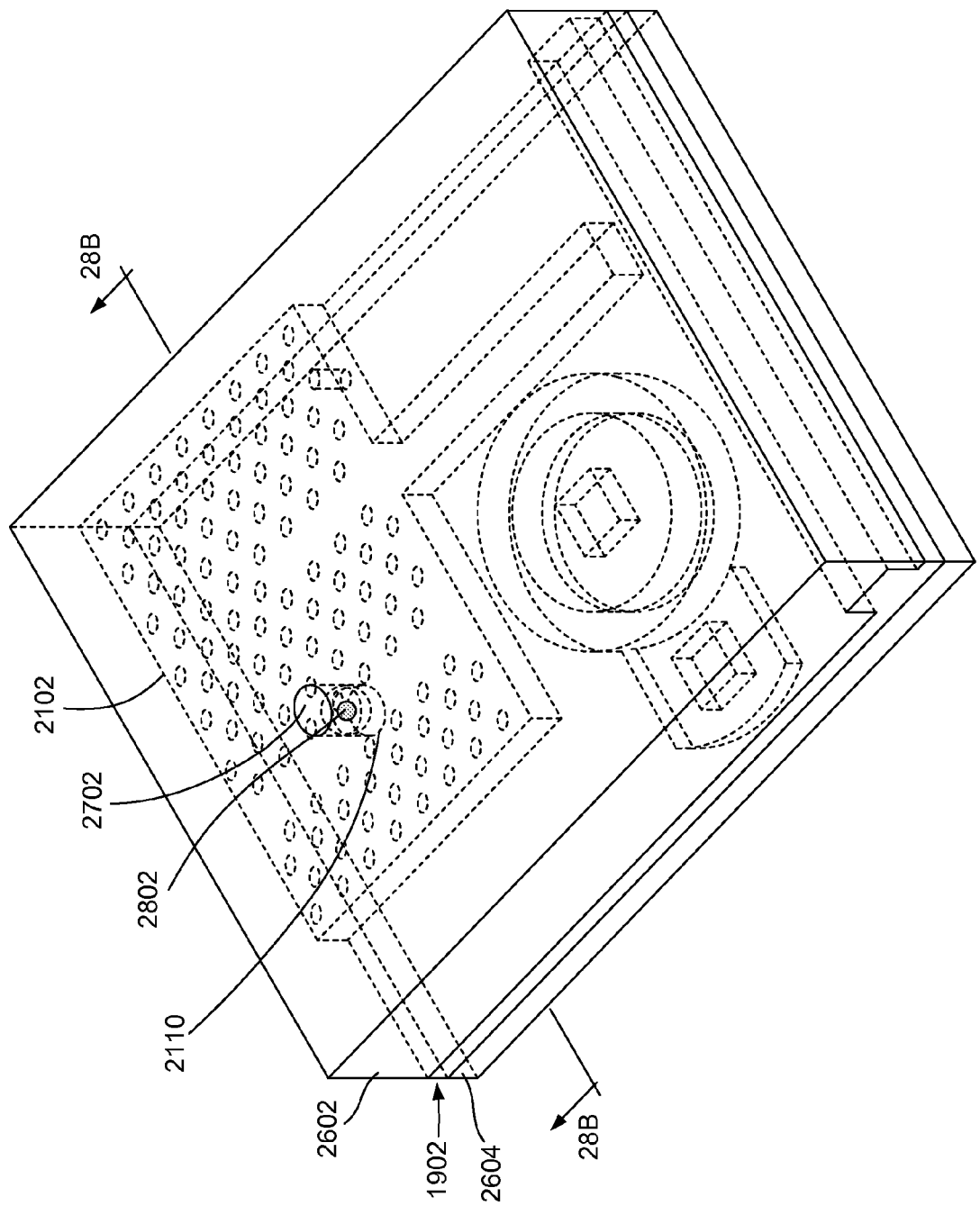
FIG. 28A illustrates a perspective view of a color center with a diamond layer placed in the hole shown FIG. 27 that represents an embodiment of the present invention.

Next, prefabricated color-centers are placed in the holes. The color center can prefabricated by depositing the nucleation centers on a suitable substrate and depositing diamond layer using CVD. FIG. 28A illustrates a perspective view of a color center 2802 placed in the hole 2702 that represents an embodiment of the present invention. FIG. 28B illustrates a cross-sectional view of the color center 2802 placed in the hole 2702 that represents an embodiment of the present invention. As shown in FIGS. 28A and 28B, the color center 2802 with a surrounding diamond layer 2804 is located on the top surface of the resonant cavity 2110. Next, the hole 2702 is filled with silica in order to obtain the photonic-chip node 1200, described above with reference to FIG. 12. In alternate embodiments of the present invention, a color center can be grown in each hole by first depositing a seed material, such as Ni, Pt, or diamond seed crystal with or without color centers, using lithography followed by CVD to deposit diamond layer around the nucleation center.

A third method embodiment for fabricating color-center-based quantum computer architectures is described below with reference to FIGS. 29-32. The method can be used to fabricate color-centers-based quantum computer architectures described above with reference to FIGS. 13 and 17. The third fabrication-method embodiment is described below with reference to fabricating the photonic-chip node 1300.

First, a diamond layer containing an arrangement of color centers is fabricated using lithography and implantation. Color centers can be embedded in the diamond layer at predefined locations using a lithographically-defined mask and ion implantation. Fabricating the lithographically-defined mask and use of ion implantation to place the color-centers at the predefined locations of the diamond layer are well-known methods in the art. See A. Greentree et al., *J. Phys.: Condens. Matter* 18, S825 (2006). FIG. 29A illustrates a perspective view of a color center 2902 placed at a predefined location in a diamond layer that represents an embodiment of the present invention. Directional arrows 2906-2908 indicate that the color center is located just below the top surface of the diamond layer 2904. FIG. 29B illustrates a cross-sectional view of the color center 2902 embedded in the diamond layer 2904 that represents an embodiment of the present invention.

Figure 30A:
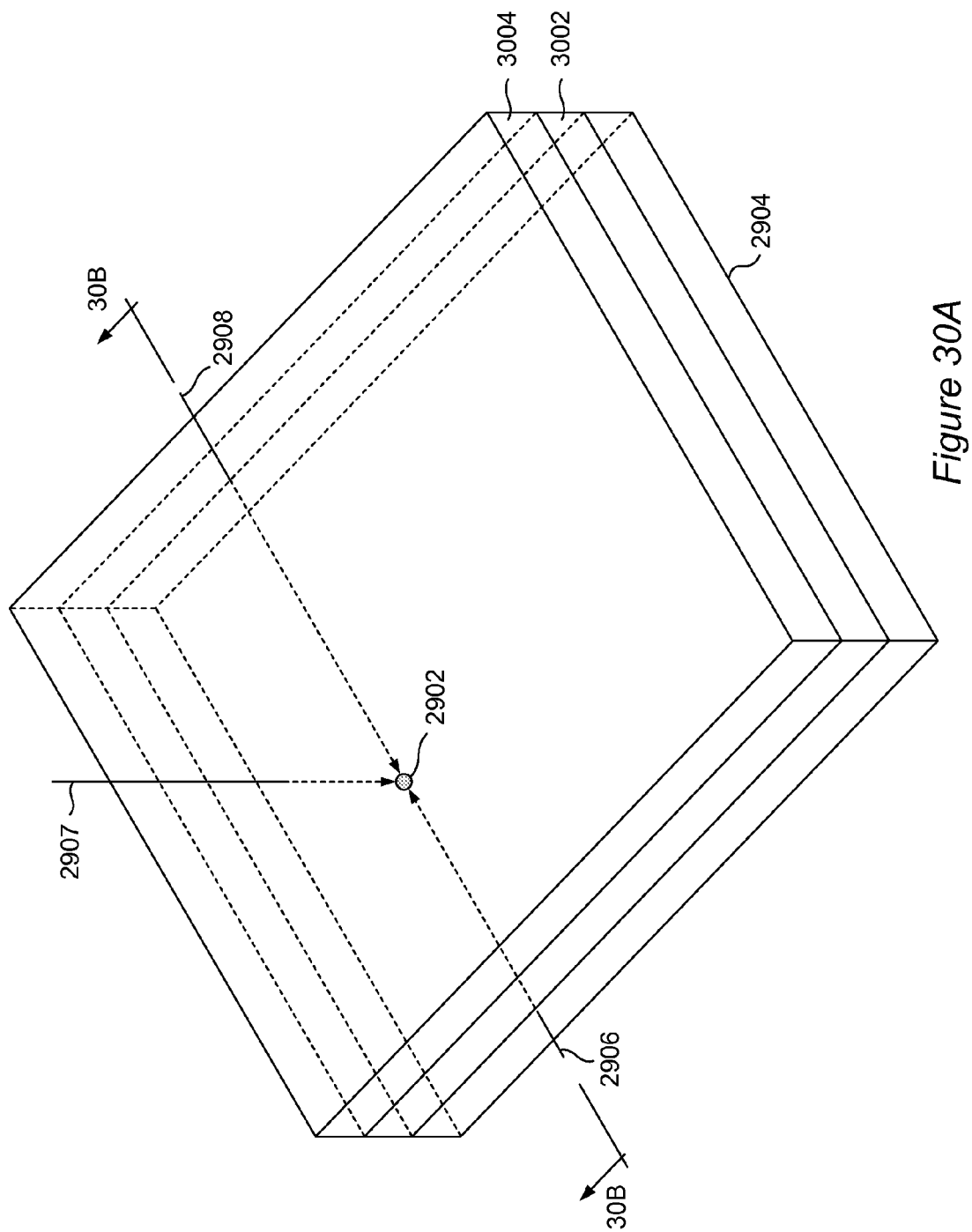
FIG. 30A illustrates a perspective view of an intermediate transmission layer and a top $TiO_2$/SiN layer deposited on the top surface of the diamond layer shown in FIG. 29 that represents an embodiment of the present invention.
Figure 30B:
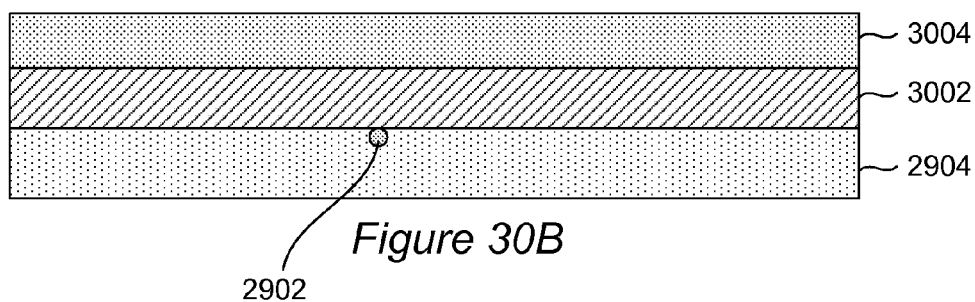
FIG. 30B illustrates a cross-sectional view of the three layers shown in FIG. 20A that represents an embodiment of the present invention.

Next, a transmission layer comprising a II-VI, a III-V, a Group IV semiconductor or high refractive index dielectric is deposited on the top surface of the diamond layer 2904, and a TiO$_2$/SiN layer is deposited on the top surface of the transmission layer. Note that transmission layer can be accomplished using wafer bonding. Both of the transmission and TiO$_2$/SiN layers can be deposited using CVD and/or MBE methods. FIG. 30A illustrates a perspective view of a transmission layer 3002 deposited on the top surface of the diamond layer 2904, and a TiO$_2$/SiN layer 3004 deposited on the surface of the transmission layer 3002 that represents an embodiment of the present invention. FIG. 30B illustrates a cross-sectional view of the diamond layer 2904, the transmission layer 3002, and the TiO$_2$/SiN layer 3004 that represents an embodiment of the present invention.

Figure 31B:
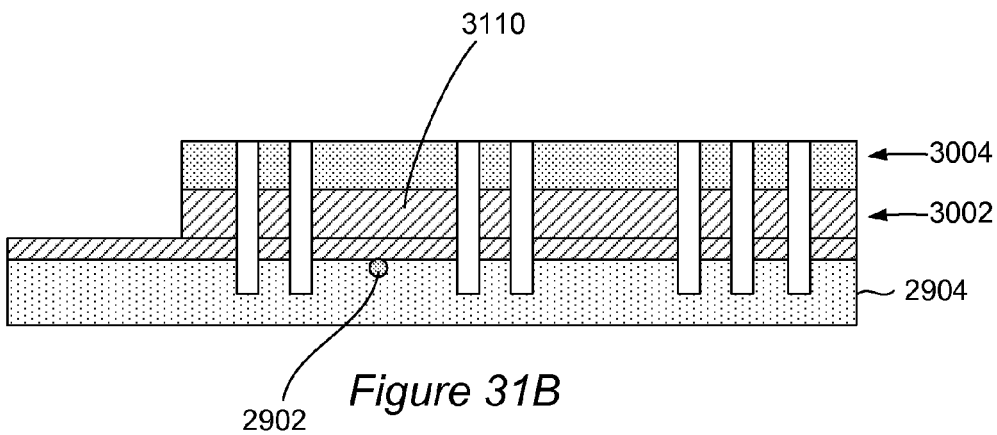
FIG. 31B illustrates a cross-sectional view of the network of photonic devices shown in FIG. 31A that represents an embodiment of the present invention.
Figure 31A:
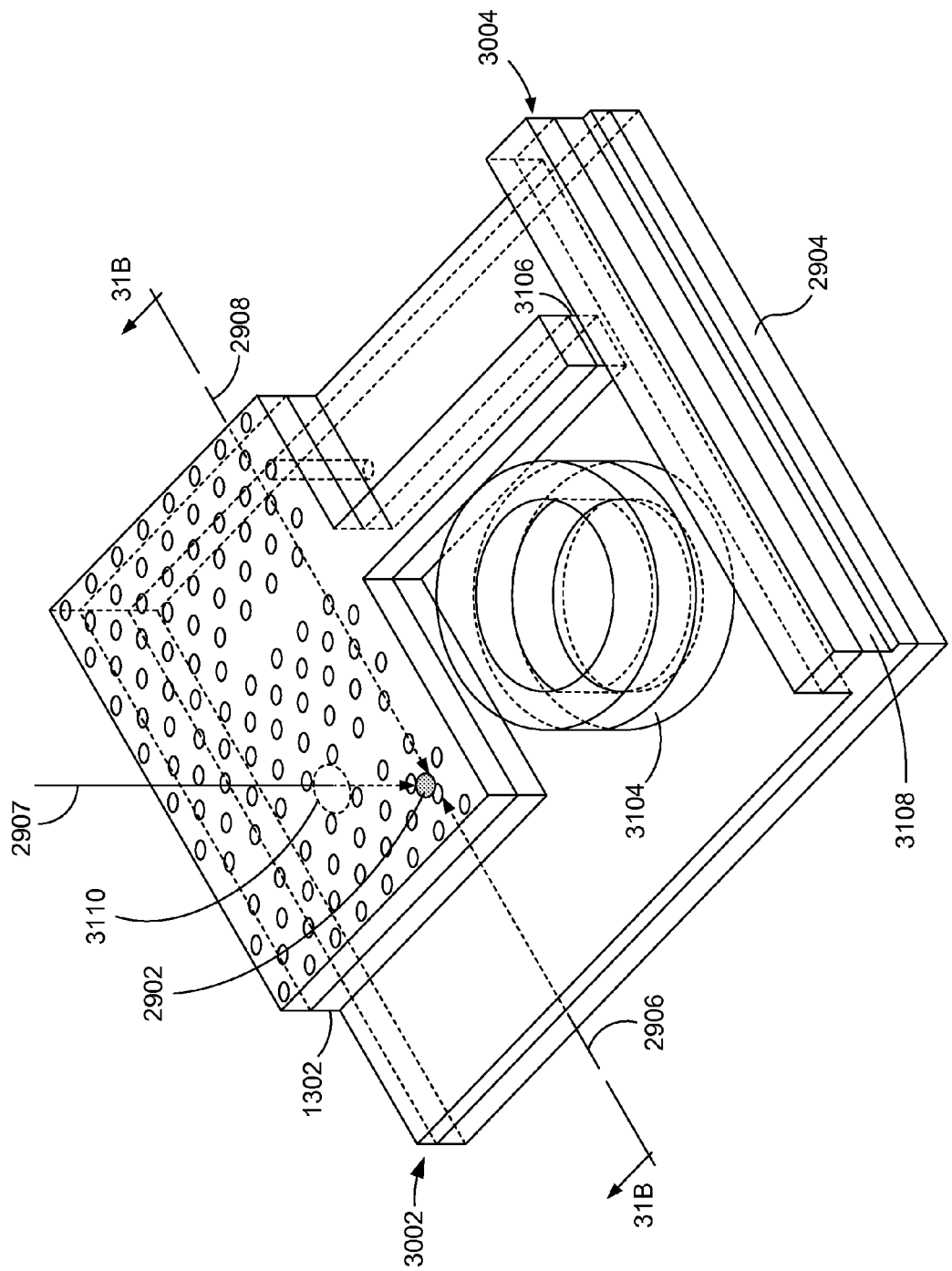
FIG. 31A illustrates a perspective view of a network of a photonic device fabricated in the transmission layer shown in FIG. 30 that represents an embodiment of the present invention.

Next, RIE, lithography, and/or nanoimprint lithography can be used to pattern photonic devices in the transmission layer. FIG. 31A illustrates a perspective view of photonic devices patterned in the transmission layer 3002 that represents an embodiment of the present invention. As shown in FIG. 31A, a photonic crystal 3102, a microring 3104, a ridge waveguide 3106, and a portion of a bus waveguide 3108 are fabricated in the transmission layer 3002. The photonic crystal 3102 includes a resonant cavity 3110 that can be created by etching cylindrical holes that are smaller, or larger, than the rest of the holes used to define the photonic crystal 3102. The resonant cavity 2110 can also be fabricated with cylindrical holes that are the same shape and size as the cylindrical holes comprising the rest of the photonic crystal 2002, but the locations of the holes defining the resonant cavity are shifted, as described above with reference to FIG. 21. The resonant cavity 3110 is located directly above the color center 2902. The etching and lithographic methods leave a similarly configured layer of TiO$_2$/SiNi on top of each photonic device. Note that the cylindrical holes used to define the photonic crystal 3102 extend into the diamond layer 2904. FIG. 31B illustrates a cross-sectional view of the color center 2902 located directly beneath the resonant cavity 3110 that represents an embodiment of the present invention.

Figure 32B:
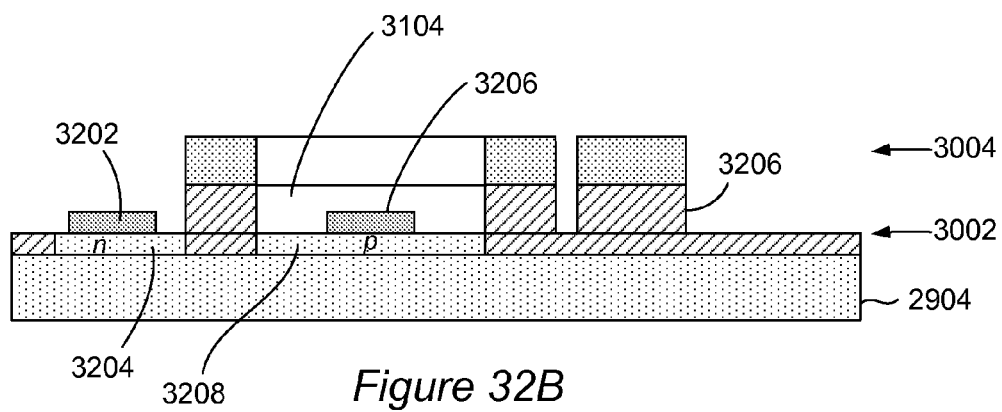
FIG. 32B illustrates a second cross-sectional view of the switch shown in FIG. 32A that represents an embodiment of the present invention.
Figure 32A:
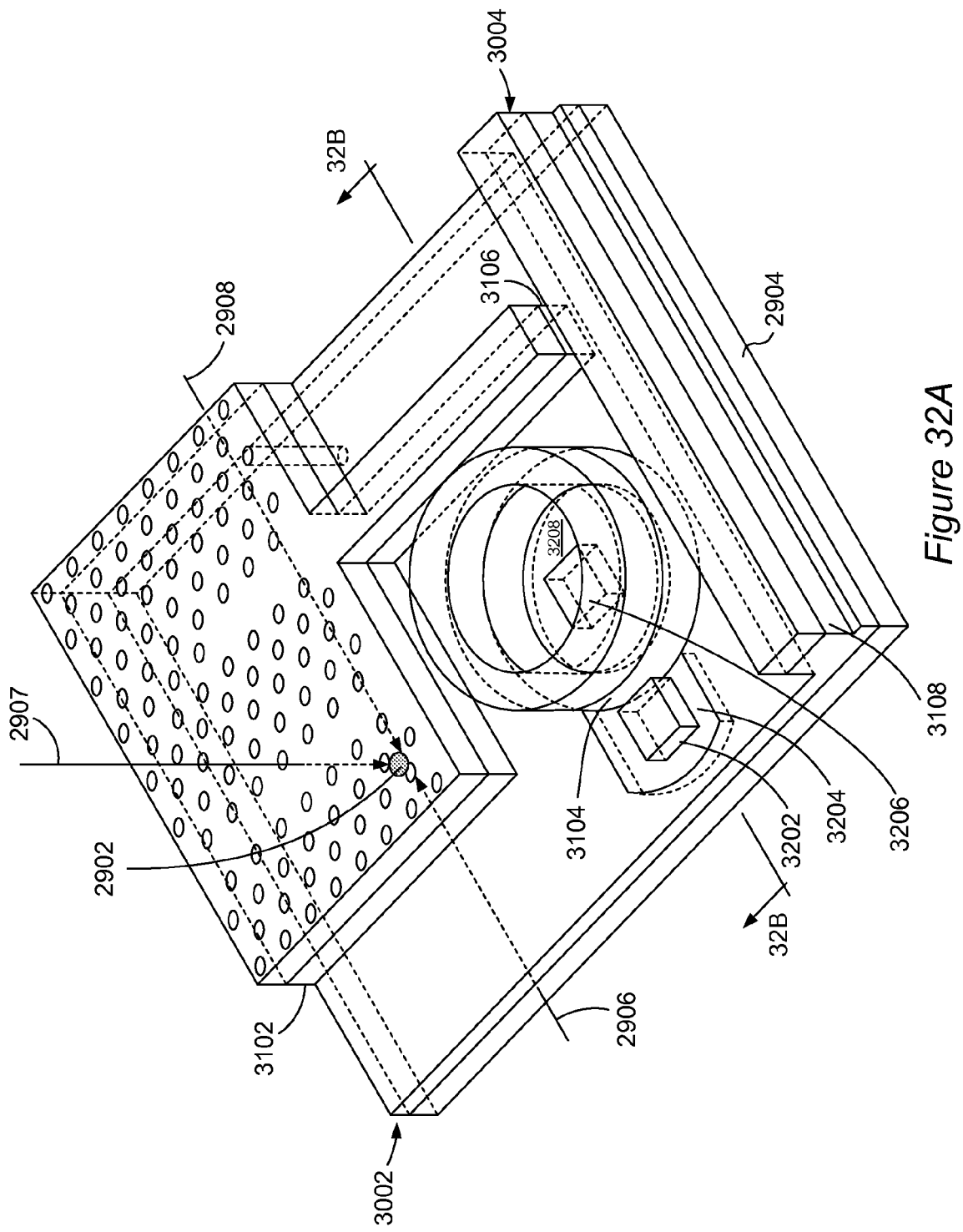
FIG. 32A illustrates a perspective view of a switch fabricated in the transmission layer shown in FIG. 31A that presents an embodiment of the present invention.

Next, using lithographic methods, a switch can be created at each photonic-chip node by implanting in the transmission layer 3102 electron donating atoms to create an n-region and electron hole donating atoms to create a p-region, and by fabricating the electrodes on the top surfaces of the n- and p-regions, as described above with reference to FIG. 23. FIG. 32A illustrates a perspective view of a switch created in the patterned transmission layer shown in FIG. 31A that presents an embodiment of the present invention. The switch comprises a first electrode 3202 located the top surface of an n-region 3204, and a second electrode 3206 located on the top surface of an n-region 3208. FIG. 32B illustrates a second cross-sectional view of the switch shown in FIG. 32A that represents an embodiment of the present invention.

Figure 33:
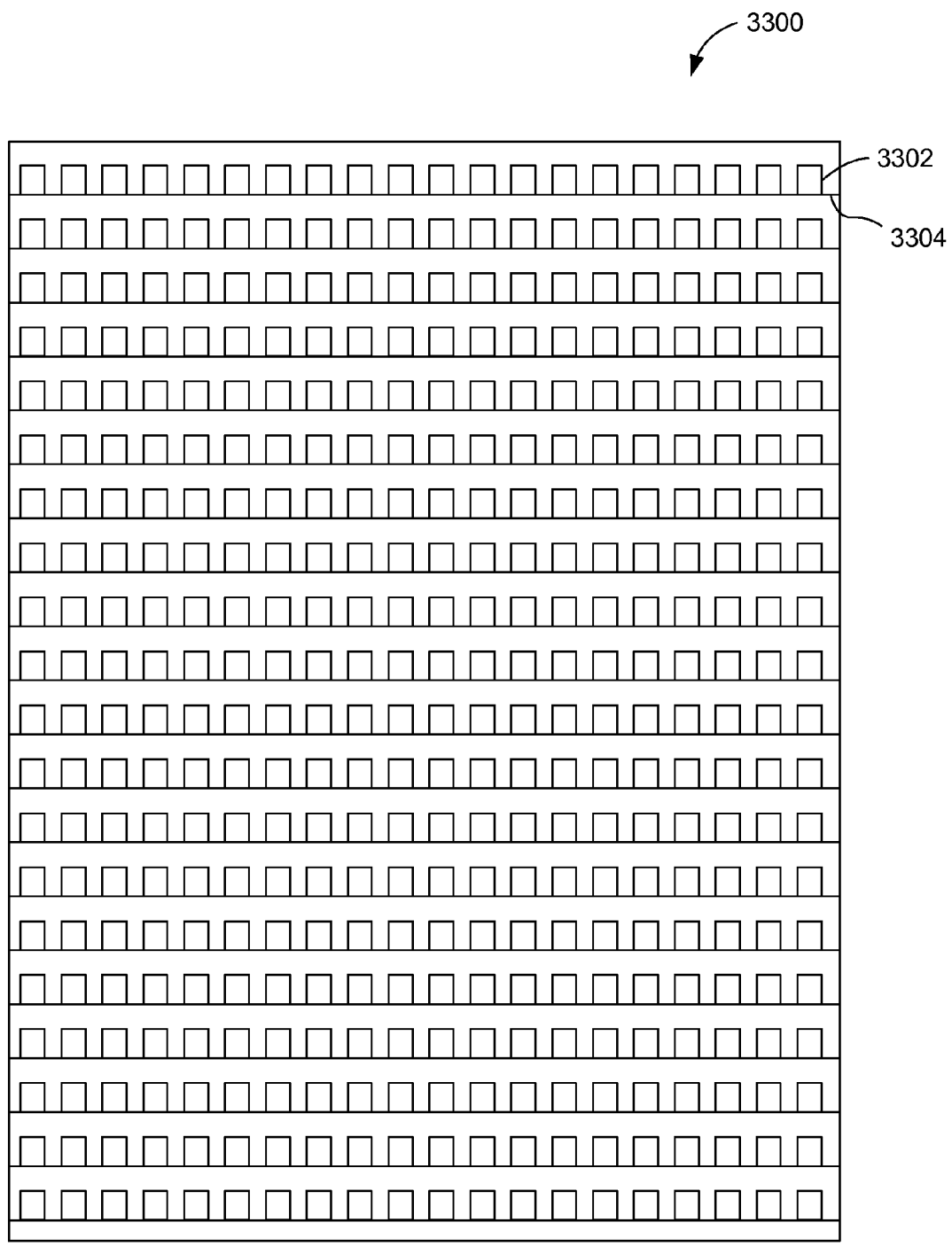
FIG. 33 illustrates a hypothetical photonic chip with an array of 400 nodes that represents an embodiment of the present invention.

The quantum computer architectures, such as the photonic chips 1100 and 1500, described above with reference to FIGS. 11 and 15, are scalable. In other words, the photonic chips 1100 and 1500 can be made to provided more (or less) computational power, memory, or amount of mass storage by configuring each chip with a larger (or smaller) number of nodes. For example, methods of the present invention can be used to configure quantum computer architectures with an unlimited number of nodes. FIG. 33 illustrates a hypothetical photonic chip 3300 with an array of 400 nodes that represents an embodiment of the present invention. In FIG. 33, boxes, such as box 3302, represent nodes, such as node 1102, in FIG. 11, or node 1502, in FIG. 15. Horizontal lines, such as horizontal line 3304, represent bus waveguides that can be coupled to optical fiber input/output couplers.

Figure 34:
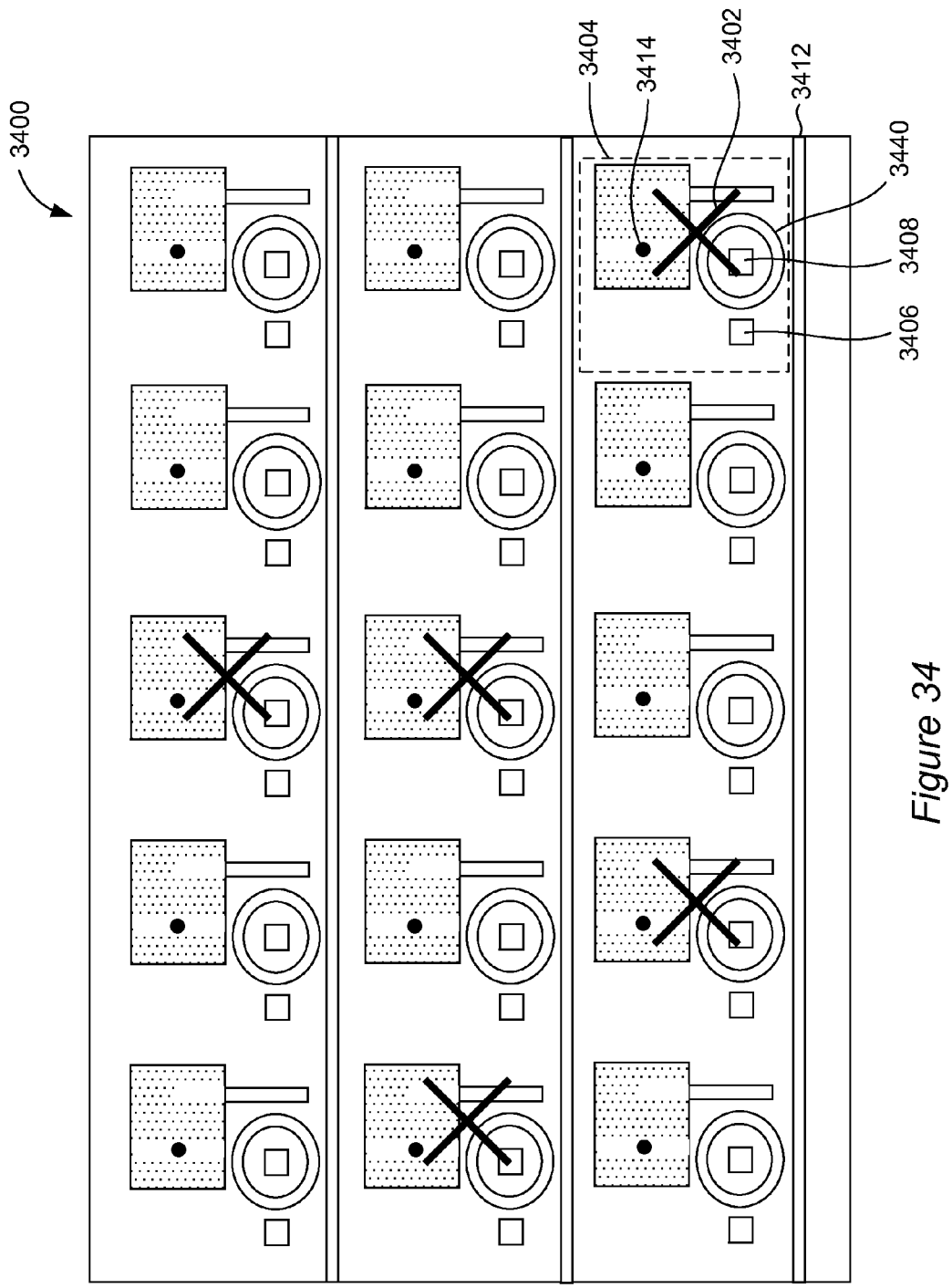
FIG. 34 illustrates the photonic chip with 5 defective nodes that represents an embodiment of the present invention.

The photonic chips 1100 and 1500 described above are also defect tolerant. In other words, the photonic chips 1100 and 1500 can be operated effectively even though a number of the nodes are not operational. Certain nodes may have defects, such as not having a color center, the cavity coupling is too weak, or their characteristics differ from that of the other nodes. The defective nodes can be turned off by changing the refractive index of each switch microring, as described above with reference to FIG. 11. FIG. 34 illustrates the photonic chip 3400 with 5 defective nodes that represents an embodiment of the present invention. In FIG. 34, defective nodes are identified by "Xs." For example, "X" 3402 identifies a defective node 3404. Applying an appropriate voltage bias between a first electrode 3406 and a second electrode 3408 changes the resonance frequency of a microring 3410 so that an electromagnetic wave cannot be transmitted by evanescent coupling between the bus waveguide 3312 and the color center 3414.

Figure 35:
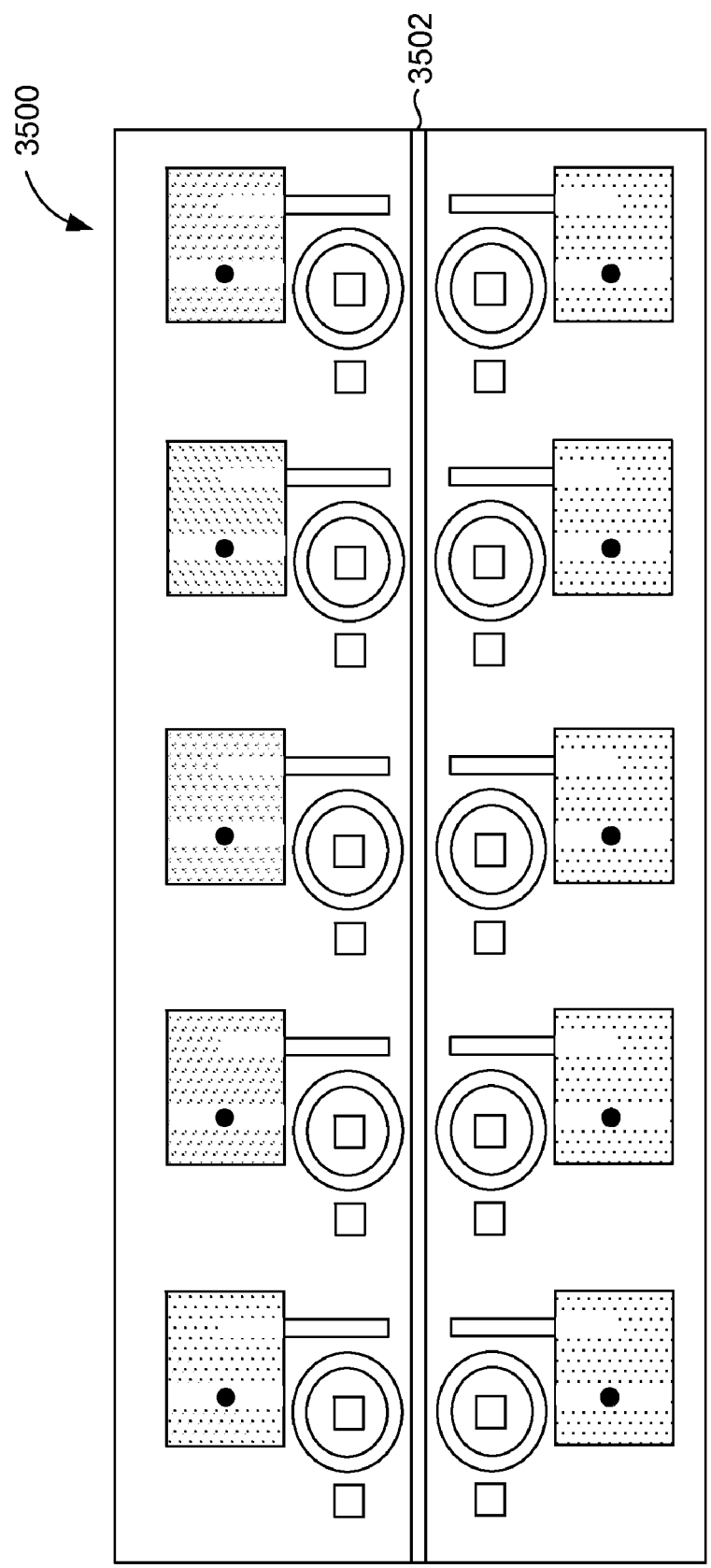
FIG. 35 illustrates a photonic chip with a single bus waveguide coupled two rows of nodes that represents an embodiment of the present invention.
Figure 36:
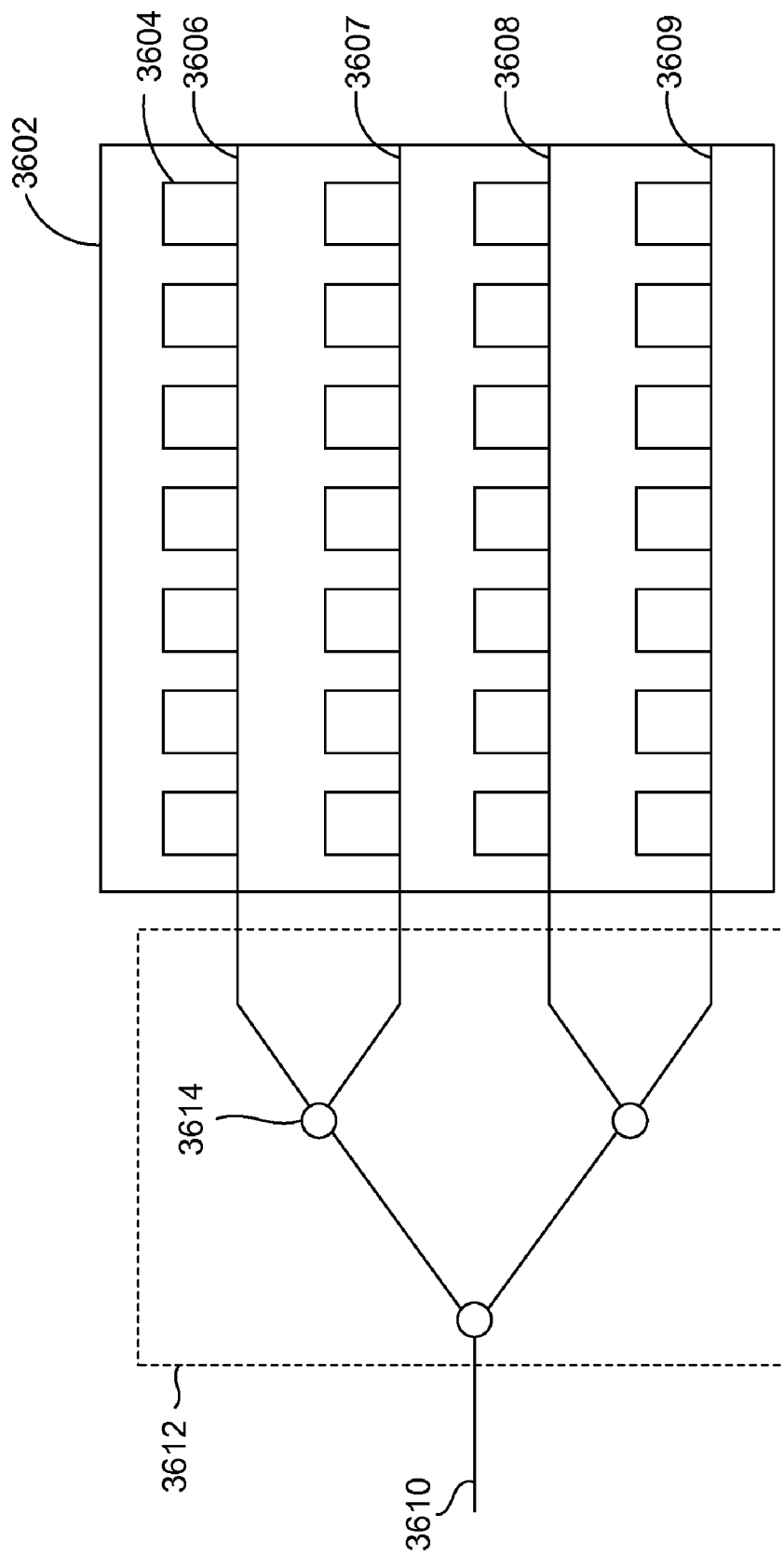
FIG. 36 illustrates a photonic chip connected to a single optical fiber via a photonic mutliplexer/demultiplexer that represents an embodiment of the present invention.

Although the present invention has been described in terms of particular embodiments, it is not intended that the invention be limited to these embodiments. Modifications within the spirit of the invention will be apparent to those skilled in the art. For example, in an alternate embodiment of the present invention, rather than coupling a single bus waveguide to a single row of nodes, as shown in FIGS. 11 and 15, the photonic device of a row of nodes can be rearranged so that a single bus waveguide can be couple to two rows of nodes. For example, FIG. 35 illustrates a photonic chip 3500 with a single bus waveguide 3502 that is coupled to two rows of nodes that represents an embodiment of the present invention. In an alternate embodiment of the present invention, the photonic crystal 1110 in the photonic chip 1500 can be replaced with a one-dimensional photonic crystal that includes Fabry-Perot cavities. In alternate embodiments of the present invention, the photonic network associated with the node configurations described above with reference to FIGS. 13, 17, and 31 can also be created by patterning through the entire structure, such as patterning through the top $TiO_2$, semiconductor, and diamond layers. In alternate embodiments of the present invention, the semiconductor material comprising the photonic devices may include high-index dielectrics, such as SiN. In an alternate embodiment of the present invention, an optical multiplexer/demultiplexer can be used to connect a single optical fiber input/output connection to numerous bus waveguides in a photonic chip. FIG. 36 illustrates a photonic chip 3602 comprising 28 nodes, such as node 3604 and 4 bus waveguides 3606-3609 connected to a single optical fiber 3610 via a photonic mutliplexer/demultiplexer ("MUX/DEMUX") 3612 that represents an embodiment of the present invention. The MUX/DEMUX 3612 can be comprised of waveguides or resonators in a photonic crystal, or optical fibers, that are controlled by electronic/optical switches, such as a series of directional couplers or add/drop resonators as represented in circle 3614, and each bus waveguide is connected to a waveguide of the MUX/DEMUX 3612. The switches can be individually controlled so that particular electromagnetic waves can be selectively directed into the bus waveguide 3606-3609. For example, switch 3614 can be used to direct an electromagnetic wave to the bus waveguide 3606 and not to the bus waveguide 3607. In alternate embodiments of the present invention, an electrooptic material can be deposited directly on the surface of the switch microrings In each node a voltage applied by the electrodes causes a change in the refractive index of the microring.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A method for fabricating a defect-tolerant quantum computer architecture, the method comprising:
   depositing a transmission layer on a substrate surface;
   depositing a nucleation center at a particular location on the transmission layer;
   forming photonic devices in the transmission layer, the photonic devices configured to transmit electromagnetic waves;
   forming a color center in diamond at the nucleation center; and
   embedding the transmission layer and the color center between a top cladding layer and a bottom cladding layer.

2. The method of claim 1 wherein depositing the transmission layer further comprises one of:
   chemical vapor deposition;
   molecular beam epitaxy; or
   wafer bonding.

3. The method of claim 1 wherein depositing the nucleation center at the particular location further comprises using nanoimprint lithography.

4. The method of claim 1 wherein forming the photonic devices in the transmission layer further comprises one of:
   reactive-ion etching;
   focused ion-beam etching;
   chemically assisted ion-beam etching;
   electron beam lithography;
   photolithography; or
   nanoimprint lithography.

5. The method of claim 1 wherein forming the diamond layer at the nucleation center further comprises depositing carbon layers using chemical vapor deposition.

6. The method of claim 1 wherein embedding the transmission layer and the color center further comprises removal of the transmission layer from the substrate and applying a material having a lower refractive index to the transmission layer using one of:
   chemical vapor deposition; or
   molecular beam epitaxy.

7. The method of claim 1 wherein the color center further comprises an atomic-vacancy center.

8. The method of claim 7 wherein the atomic-vacancy center further comprises one of:
   a nitrogen-vacancy center;
   a nickel-vacancy center; or
   a silicon-vacancy center.

9. The method of claim 1 wherein the nucleation center further comprises one of:
   nickel;
   platinum; or
   a diamond crystal seed having a color center.

10. A method for fabricating a defect-tolerant quantum computer architecture, the method comprising:
   depositing a transmission layer on a substrate surface;
   forming a photonic device in the transmission layer, the photonic device configured to transmit electromagnetic waves;
   embedding the transmission layer between a top cladding layer and a bottom cladding layer;
   forming a hole in the top cladding layer, the hole configured to expose a portion of a surface of the photonic device; and
   depositing a prefabricated color center in the hole, the color center coupled to the photonic device.

11. The method of claim 10 wherein depositing the transmission layer further comprises one of:

chemical vapor deposition;
molecular beam epitaxy; or
wafer bonding.

12. The method of claim 10 wherein forming the photonic devices in the transmission layer further comprises one of:
reactive-ion etching;
focused ion-beam etching;
chemically assisted ion-beam etching;
electron beam lithography;
photolithography; or
nanoimprint lithography.

13. The method of claim 10 wherein forming the diamond layer that surrounds the nucleation center further comprises depositing carbon layers or the color center using chemical vapor deposition.

14. The method of claim 10 wherein embedding the transmission layer further comprises removal of the transmission layer from the substrate applying and applying a cladding layer using one of:
chemical vapor deposition; or
molecular beam epitaxy.

15. The method of claim 10 further comprising depositing a low index material to fill in the hole in the top cladding layer.

16. The method of claim 10 further comprising forming a switch in the transmission layer that includes:
implanting electron donating atoms in the transmission layer on a first side of a photonic device that couple the color center to a bus waveguide;
implanting electron hole donating atoms in the transmission layer on a second side of the photonic device;
forming a first electrode on the first side; and
forming a second electrode on the second side.

17. The method of claim 10 wherein the switch further comprises depositing electrooptic material on a photonic device that couples the color center to a bus waveguide.

18. The method of claim 10 wherein the color center further comprises an atomic-vacancy center.

19. The method of claim 18 wherein the atomic-vacancy center further comprises one of:
a nitrogen-vacancy center;
a nickel-vacancy center; or
a silicon-vacancy center.

20. A method for fabricating a defect-tolerant quantum computer architecture, the method comprising:
fabricating one or more color centers in a single diamond layer, each color center deposited at a predefined location within the diamond layer;
depositing a transmission layer on a surface of the diamond layer, wherein the transmission layer comprises a semiconductor material;
depositing a layer of $TiO_2$/SiN on the transmission layer; and
forming a network of photonic devices in the transmission layer, the network of photonic devices configured to transmit electromagnetic waves to and from the color centers.

21. The method of claim 20 wherein fabricating the one or more color centers in the single bulk diamond layer further comprises depositing the color centers using lithography and implantation.

22. The method of claim 20 wherein depositing the transmission layer of semiconductor material and the layer of $TiO_2$/SiN further comprises one of:
chemical vapor deposition;
molecular beam epitaxy; or
wafer bonding.

23. The method of claim 20 wherein forming the network of photonic devices further comprises one of:
reactive-ion etching;
focused ion-beam etching;
chemically assisted ion-beam etching;
electron beam lithography;
photolithography; or
nanoimprint lithography.

24. The method of claim 20 wherein the color center further comprises an atomic-vacancy center.

25. The method of claim 24 wherein the atomic-vacancy center further comprises one of:
a nitrogen-vacancy center;
a nickel-vacancy center; or
a silicon-vacancy center.

* * * * *